US012581291B2

(12) United States Patent
Liu et al.

(10) Patent No.: US 12,581,291 B2
(45) Date of Patent: Mar. 17, 2026

(54) AUTHENTICATION METHOD AND RELATED APPARATUS

(71) Applicant: HUAWEI TECHNOLOGIES CO., LTD., Shenzhen (CN)

(72) Inventors: Peng Liu, Shenzhen (CN); Huiming Wang, Xi'an (CN); Xuan Wei, Xi'an (CN); Jianjun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 466 days.

(21) Appl. No.: 18/331,948

(22) Filed: Jun. 9, 2023

(65) Prior Publication Data

US 2023/0319557 A1     Oct. 5, 2023

Related U.S. Application Data

(63) Continuation of application No. PCT/CN2021/136248, filed on Dec. 8, 2021.

(30) Foreign Application Priority Data

Dec. 18, 2020    (CN) .......................... 202011511834.0

(51) Int. Cl.
H04W 12/0431     (2021.01)
H04L 5/00     (2006.01)
H04W 12/037     (2021.01)

(52) U.S. Cl.
CPC ....... H04W 12/0431 (2021.01); H04L 5/0048 (2013.01); H04W 12/037 (2021.01)

(58) Field of Classification Search
CPC ........... H04W 12/0431; H04W 12/037; H04W 12/67; H04W 12/02; H04W 12/06; H04W 12/122; H04L 5/0048; H04B 17/309
See application file for complete search history.

(56) References Cited

U.S. PATENT DOCUMENTS

| | | | |
|---|---|---|---|
| 12,066,558 B2 * | 8/2024 | Sangle-Ferriere | .......................... G06Q 20/4015 |
| 2015/0146872 A1 * | 5/2015 | Baek | ....................... G06F 11/08 380/270 |

(Continued)

FOREIGN PATENT DOCUMENTS

| | | |
|---|---|---|
| CN | 102869013 A | 1/2013 |
| CN | 105873042 A | 8/2016 |

(Continued)

OTHER PUBLICATIONS

ETSI TS 133 501 V15.3.1 (Apr. 2019), 5G; Security architecture and procedures for 5G System(3GPP TS 33.501 version 15.3.1 Release 15), 183 pages.
Hanif Rahbari et al., Secrecy beyond encryption: obfuscating transmission signatures in wireless communications, IEEE Communications Magazine ( vol. 53, Issue: 12, Dec. 2015), 7 pages.
David Rupprecht et al., Breaking LTE on Layer Two, 2019 IEEE Symposium on Security and Privacy (SP), May 19-23, 2019, 16 pages.

(Continued)

*Primary Examiner* — Charles T Shedrick

(57)     ABSTRACT

This disclosure provides an authentication method and a related apparatus. The method includes: A terminal device receives a first received encrypted reference signal corresponding to a first sent encrypted reference signal that is generated by an access network device using a pilot key and a first reference signal and transmitted through a channel; the terminal device performs channel estimation by using the first received encrypted reference signal and the first sent encrypted reference signal, to obtain downlink channel state information; and the terminal device sends first information to the access network device, where the first information includes the downlink channel state information, to effectively defend against man-in-the-middle attacks.

20 Claims, 14 Drawing Sheets

(56) References Cited

U.S. PATENT DOCUMENTS

| | | | | |
|---|---|---|---|---|
| 2017/0279778 | A1* | 9/2017 | Lee | H04W 12/35 |
| 2017/0338956 | A1* | 11/2017 | Badawy | H04W 12/033 |
| 2018/0124598 | A1* | 5/2018 | Zeng | H04W 48/16 |
| 2019/0303071 | A1 | 10/2019 | Tsuji | |
| 2020/0044844 | A1 | 2/2020 | Sridhara et al. | |
| 2020/0322805 | A1* | 10/2020 | Wang | H04W 88/10 |
| 2021/0092592 | A1* | 3/2021 | Yunusov | H04L 5/0051 |
| 2021/0377728 | A1* | 12/2021 | Min | H04W 12/037 |
| 2023/0170956 | A1* | 6/2023 | Elshafie | H04B 7/10 |
| | | | | 370/255 |
| 2024/0340640 | A1* | 10/2024 | Elshafie | H04W 12/037 |
| 2025/0016558 | A1* | 1/2025 | Manolakos | H04W 72/12 |

FOREIGN PATENT DOCUMENTS

| | | | |
|---|---|---|---|
| CN | 107196920 | A | 9/2017 |
| CN | 109075934 | A | 12/2018 |
| CN | 107710801 | B | 4/2020 |
| CN | 111586687 | A | 8/2020 |

OTHER PUBLICATIONS

David Basin et al., A Formal Analysis of 5G Authentication, https://doi.org/10.1145/3243734.3243846, Oct. 2018, 14 pages.

3GPP TS 36.331 V16.1.1 (Jul. 2020), 3rd Generation Partnership Project; Technical Specification Group Radio Access Network; Evolved Universal Terrestrial Radio Access (E-UTRA); Radio Resource Control (RRC);Protocol specification, (Release 16), 1078 pages.

Daniel R. L. Brown, SEC 2: Recommended Elliptic Curve Domain Parameters, http://www.secg.org/sec2-v2.pdf., Jan. 27, 2010, 37 pages.

3GPP TS 38.211 V15.6.0 (Jun. 2019), 3rd Generation Partnership Project; Technical Specification Group Radio Access Network; NR; Physical channels and modulation (Release 15), 97 pages.

Reem Melki et al:"Physical layer security schemes for MIMO systems: an overview." Jun. 14, 2019. total 23 pages.

* cited by examiner

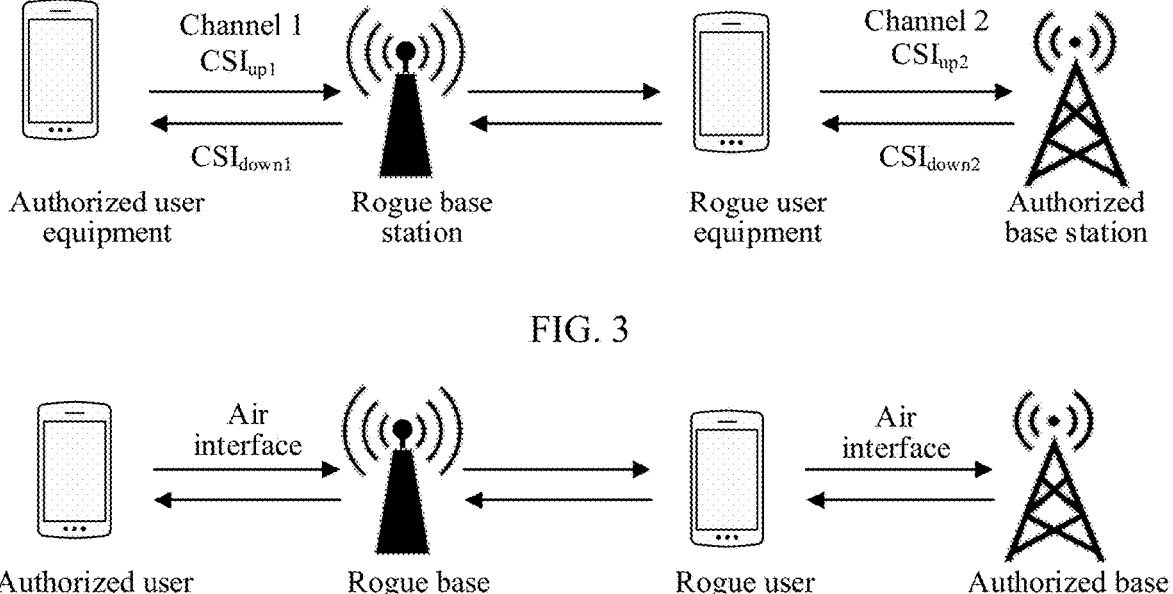

Channel 1
$CSI_{up1}$ $CSI_{down1}$

Authorized user
equipment

Rogue base
station

Rogue user
equipment

Channel 2
$CSI_{up2}$ $CSI_{down2}$

Authorized
base station

FIG. 3

Air
interface

Air
interface

Authorized user
equipment

Rogue base
station

Rogue user
equipment

Authorized base
station

Same visiting network

FIG. 4

Authorized
user equipment

Authorized
base station

Last authentication time: T1

Air
interface

Air
interface

Authorized user
equipment

Rogue base
station

Rogue user
equipment

Authorized
base station

Location A (Visiting Network A)

Location B (Visiting Network B)

FIG. 5

PRS1

| hash$_1$(E$_{AES}$(RS1)) | hash$_2$(E$_{AES}$(RS1)) | ... | hash$_i$(E$_{AES}$(RS1)) |

160

170

180

190

AUTHENTICATION METHOD AND RELATED APPARATUS

CROSS-REFERENCE TO RELATED APPLICATIONS

This application is a continuation of International Application No. PCT/CN2021/136248, filed on Dec. 8, 2021, which claims priority to Chinese Patent Application No. 202011511834.0, filed on Dec. 18, 2020. The disclosures of the aforementioned applications are hereby incorporated by reference in their entireties.

TECHNICAL FIELD

This disclosure relates to the communication field, and in particular, to an authentication method and a related apparatus.

BACKGROUND

In a man-in-the-middle attack model, an attacker acts as a malicious relay, mainly including a rogue base station and rogue user equipment. The attacker is capable of intercepting and sending a radio signal at a specific frequency. Man-in-the-middle attacks mainly include a transparent forwarding attack and a user location spoofing attack. The transparent forwarding attack is as follows: The rogue base station and the rogue user transparently forward authentication signaling between an authorized user and an authorized base station. The rogue base station can be authenticated by the authorized user. After the authorized user successfully accesses the rogue base station, the rogue base station can choose to discard some uplink or downlink messages to cause a denial of service (DoS) of the user, steal sensitive information such as an account and a password of the authorized user, and tamper with a domain name system (Domain Name System, DNS) messages to direct the authorized user to a malicious website or the like. The user location spoofing attack is as follows: An authorized user is in a geographical location A, a visiting network (visiting network) covered by the geographical location A is a visiting network A, and a visiting network covered by a geographical location B is a visiting network B. The authorized user of the visiting network A successfully accesses the visiting network B through a man-in-the-middle, and an operator considers that the user is in the geographical location B.

The currently used authentication method cannot defend against the man-in-the-middle attacks very well. As a result, it is necessary to study a solution that can defend against the man-in-the-middle attacks better.

SUMMARY

This disclosure provides an authentication method and a related apparatus, to defend against a man-in-the-middle attack.

According to a first aspect, an embodiment of this disclosure provides an authentication method, where the method includes: A terminal device receives a first received encrypted reference signal, where the first received encrypted reference signal includes a signal received by the terminal device when a first sent encrypted reference signal sent by an access network device is transmitted through a channel, the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device; the terminal device performs channel estimation by using the first received encrypted reference signal and the first sent encrypted reference signal, to obtain downlink channel state information; and the terminal device sends first information to the access network device, where the first information includes the downlink channel state information. The public key on the network device side may be a public key of the access network device, or may be a public key of a non-access stratum network device. The pilot key is a key for encrypting a pilot signal (that is, a reference signal).

The first sent encrypted reference signal sent by the access network device is obtained by using the pilot key and the first reference signal. In other words, the first sent encrypted reference signal can be generated only when the pilot key is known. The terminal device can obtain or generate a pilot key, but an attacker (for example, a rogue base station or a rogue terminal device) cannot obtain the pilot key. Therefore, the terminal device can perform channel estimation by using the received first received encrypted reference signal to obtain downlink channel state information. The downlink channel state information can accurately represent a status of a downlink channel between the access network device and the terminal device. However, because the attacker cannot obtain the pilot key, even if the attacker steals the first received encrypted reference signal, the attacker cannot implement channel estimation. In other words, the attacker cannot obtain the downlink channel state information that can accurately represent the status of the downlink channel between the access network device and the terminal device. It should be understood that if downlink channel state information sent by a terminal device can accurately represent a status of a downlink channel between an access network device and the terminal device, the terminal device is definitely an authorized terminal device instead of an attacker.

In this embodiment of this disclosure, the terminal device performs channel estimation by using the first sent encrypted reference signal and the first received encrypted reference signal, and sends downlink channel state information obtained by performing channel estimation, to prove that the terminal device is an authorized terminal device. Because the attacker cannot obtain the first sent encrypted reference signal, the attacker cannot obtain, through channel estimation, the downlink channel state information that can accurately represent the channel between the access network device and the terminal device. Therefore, the terminal device sends the downlink channel state information to the access network device, to effectively defend against a man-in-the-middle attack.

In a possible implementation, the terminal device and the access network device may pre-agree on a used encrypted reference signal, for example, a first sent encrypted reference signal. Specifically, the terminal device considers a reference signal in any signal sent by the access network device as the first sent encrypted reference signal by default. For example, the terminal device and the access network device pre-agree that the signal sent by the access network device carries the first sent encrypted reference signal, and the terminal device performs channel estimation by using the first sent encrypted reference signal (known) and a signal received by the terminal device when the first sent encrypted reference signal is transmitted through a channel. The terminal device may obtain, by using a preset interaction policy, the first sent encrypted reference signal sent by the access network device. Specifically, the access network device may send one piece of downlink indication information, and the downlink indication information indicates the first sent encrypted reference signal; or the access network device may indicate, to the terminal device by using signaling such as a master information block (master information block, MIB) message or radio resource control (radio resource control, RRC) signaling, that the reference signal in the signal sent by the access network device is the first sent encrypted reference signal. It should be understood that the terminal device may learn, in a plurality of manners, that the reference signal in the signal sent by the access network device is the first sent encrypted reference signal. This is not limited in this disclosure.

In a possible implementation, that the first sent encrypted reference signal is obtained by using a pilot key and a first reference signal includes: The first sent encrypted reference signal is obtained by encrypting the first reference signal using the pilot key, where the first sent encrypted reference signal includes at least two same first encrypted sequences, and the first encrypted sequence is obtained by encrypting the first reference signal using the pilot key; or the first sent encrypted reference signal includes a hash chain, the hash chain includes at least two binary sequences, a first binary sequence in the hash chain is a second encrypted sequence, and the second encrypted sequence is obtained by encrypting the first reference signal using the pilot key.

In this implementation, three manners of obtaining the first sent encrypted reference signal by using the pilot key and the first reference signal are listed, but this implementation is not limited to obtaining the first sent encrypted reference signal in the three manners. The first reference signal may be a demodulation reference signal (demodulation reference signal, DM-RS), a channel state information reference signal (channel state information reference signal, CSI-RS), a sounding reference signal (sounding reference signal, SRS), or another reference signal. The encrypting the first reference signal by using the pilot key may be: encrypting the first reference signal by using an encryption algorithm and using the pilot key as a key. The encryption algorithm may be any cryptographic algorithm, for example, an Advanced Encryption Standard (advanced encryption standard, AES) encryption algorithm. For example, RS1 represents the first reference signal, PRS1 represents the first sent encrypted reference signal, and $PRS1=E_{AES}(RS1)$; and $E_{AES()}$ is the AES encryption algorithm. In this example, the first reference signal is a binary sequence (for example, a rogue random sequence), that is, a sequence in a form of binary bits 0 and 1. The first sent encrypted reference signal is a binary sequence. The first encrypted sequence may be a binary sequence obtained by encrypting the first reference signal by using an encryption algorithm and using the pilot key as a key. The second encrypted sequence may be the same as the first encrypted sequence. In a possible implementation, a non-first binary sequence in the hash chain satisfies the following formula:

$$\text{hash}_i(E_{AES}(RS1))=\text{hash}_1^{i-1}(E_{AES}$$

where $\text{hash}_i(E_{AES}(RS1))$ represents an $i^{th}$ binary sequence in the hash chain, $\text{hash}_1^{i-1}(E_{AES}(RS1))$ represents a binary sequence obtained by performing $(i-1)$ times of hash operations on a first binary sequence $E_{AES}(RS1)$ in the hash chain, and i is an integer greater than 1.

In this implementation, the first sent encrypted reference signal is obtained by encrypting the first reference signal using the pilot key, and the first sent encrypted reference signal occupies few bits. A solution in which the first sent encrypted reference signal includes at least two same first encrypted sequences is highly reliable, and is applicable to a scenario with a low security requirement. A solution in which the first sent encrypted reference signal includes a hash chain has high security, and is applicable to a scenario with a high security requirement.

In a possible implementation, before the terminal device performs channel estimation by using the first received encrypted reference signal and the first sent encrypted reference signal, the method further includes: The terminal device generates, when working in a first security mode, the first sent encrypted reference signal including at least two same first encrypted sequences, where the first encrypted sequence is obtained by encrypting the first reference signal using the pilot key; and the terminal device generates, when working in a second security mode, the first sent encrypted reference signal including a hash chain, where the hash chain includes at least two binary sequences, a first binary sequence in the hash chain is a second encrypted sequence, the second encrypted sequence is obtained by encrypting the first reference signal using the pilot key, and security of the first security mode is lower than security of the second security mode.

The terminal device may work in at least two security modes with different security, for example, the first security mode and the second security mode. When the terminal device works in different security modes, sent signals carry different encrypted reference signals. Correspondingly, the access network device may also work in at least two security modes with different security, for example, the first security mode and the second security mode. The terminal device may freely switch between different security modes, for example, switch from the first security mode to the second security mode or switch from the second security mode to the first security mode. The access network device may indicate, to the terminal device by using the downlink control information, a security mode in which the access network device works.

In this implementation, the terminal device generates, when working in the first security mode, the first sent encrypted reference signal that includes at least two same first encrypted sequences, where a hash operation does not need to be performed, and a calculation amount is small, to be applicable to a scenario with high security; and the terminal device generates, when working in the second security mode, the first sent encrypted reference signal that includes at least a hash chain, where a plurality of times of hash operations are performed, and security is high, to be applicable to a scenario with low security.

In a possible implementation, that the first sent encrypted reference signal is obtained by using a pilot key and a first reference signal includes: The first sent encrypted reference signal is obtained by encrypting the first reference signal using the pilot key, where the pilot key is obtained by performing a one-way hash operation on a shared key, and the shared key is obtained by using the private key of the terminal device and the public key on the network device side.

The shared key $K_m$ may be derived from the public key $K_p^{HN}$ on the network device side and the private key $K_s^{UE}$ of the terminal device (that is, on the terminal device side): $K_m=\text{derive} (K_p^{HN}, K_s^{UE})$, and $\text{derive}(\bullet)$ is a key derivation method. The terminal device may derive the shared key by using the private key of the terminal device and the public key on the network device side. The access network device or the first network device may derive the shared key by using the public key of the terminal device and the private key on the network device side. For example, the first
network device, for example, a unified data management
(unified data management, UDM) derives the shared key
$K_m$=derive($K_p^{UE}$, $K_s^{HN}$) by using the public key $K_p^{UE}$ of the
terminal device and the private key $K_s^{HN}$ on the network
device side, and derive(•) is a key derivation method. In
other words, the terminal device may derive the shared key
by using the private key of the terminal device and the public
key on the network device side; and the access network
device or the first network device may derive the shared key
by using the private key on the network device side and the
public key of the terminal device. The terminal device and
the access network device may pre-agree on a used key
generation method. The terminal device may perform a
one-way hash function operation on the shared key $K_m$ to
obtain the pilot key $K_s$, that is, $K_s$=hash($K_m$), and hash (•) is
a hash function, and may obtain a pilot key of a required
length. A one-way hash function is a function that changes
an input message string of an arbitrary length into an output
string of a fixed length from which it is difficult to obtain the
input string. This output string is referred to as a hash value
of the message, and is generally for generating a message
digest and encrypting a key.

In this implementation, the pilot key is obtained by
performing a one-way hash operation on the shared key. In
this way, a key of a required length can be obtained, and a
difficulty of cracking the pilot key can be further increased.

In a possible implementation, the first information further
includes a second sent encrypted reference signal, and the
second sent encrypted reference signal is obtained by using
the pilot key and a second reference signal.

The second sent encrypted reference signal is used by the
access network device to perform channel estimation on an
uplink channel between the access network device and the
terminal device.

In this implementation, the second sent encrypted refer-
ence signal is carried in the first information, so that an
attacker cannot implement channel estimation, thereby
defending against a man-in-the-middle attack.

In a possible implementation, before the terminal device
receives the first received encrypted reference signal, the
method further includes: The terminal device receives first
indication information, where the first indication informa-
tion indicates a location of the first received encrypted
reference signal that is in second information and that is to
be received by the terminal device.

The first indication information may be downlink control
information (downlink control information, DCI). The first
indication information may include a first encrypted refer-
ence signal index. The first encrypted reference signal index
indicates the location of the first received encrypted refer-
ence signal that is in the second information and that is to be
received by the terminal device. The first received encrypted
reference information is included in the second information,
and the operation of receiving, by the terminal device, the
first received encrypted reference signal may be an operation
of receiving the second information. After receiving the
second information, the terminal device may obtain the first
received encrypted reference signal from the second infor-
mation based on the first indication information. The termi-
nal device may store a correspondence between an index and
a location of an encrypted reference signal, and may deter-
mine, by using the correspondence, a location of an
encrypted reference signal indicated by any encrypted ref-
erence signal index. For example, the first indication infor-
mation received by the terminal device includes an
encrypted reference signal index 1, and the terminal device obtains a signal that is in a first location and in the second
information to obtain the first received encrypted reference
signal. For another example, the first indication information
received by the terminal device includes an encrypted ref-
erence signal index 2, and the terminal device obtains a
signal that is in a second location and in the second infor-
mation, to obtain the first received encrypted reference
signal.

In this implementation, the first indication information
indicates the location of the first received encrypted refer-
ence signal that is in the second information and that is to be
received by the terminal device, and the terminal device can
accurately obtain, based on the first indication information,
the location of the first received encrypted reference signal
that is in the second information and that is to be received.

In a possible implementation, the first indication infor-
mation further includes at least one of the following: a first
encrypted reference signal type, a first encrypted reference
signal length, a first encrypted activation indication, and a
first security mode indication, where the first encrypted
reference signal type is a type of the first received encrypted
reference signal, the first encrypted reference signal length
indicates a length of the first received encrypted reference
signal, the first encrypted activation indication indicates the
access network device to send an unencrypted reference
signal or an encrypted parameter signal, and the first security
mode indication indicates an encryption manner of the first
received encrypted reference signal.

In this implementation, the first indication information
may carry information that can further define the reference
signal to be sent by the access network device, so that the
terminal device can accurately obtain the encrypted refer-
ence signal or the unencrypted reference signal sent by the
access network device.

In a possible implementation, that the terminal device
performs channel estimation by using the first received
encrypted reference signal and the first sent encrypted
reference signal, to obtain the downlink channel state infor-
mation includes: The terminal device performs channel
estimation by using the first received encrypted reference
signal and the first sent encrypted reference signal, to obtain
a downlink channel estimation value; and uses first strength
characteristic information and first phase characteristic
information that are extracted based on the downlink chan-
nel estimation value as the downlink channel state informa-
tion.

The terminal device may perform channel estimation by
using a least square method, a minimum mean square error
method, or the like. In this implementation, the least square
method is used as an example. It is assumed that a frequency
domain response corresponding to a first sent encrypted
reference signal PRS generated by an access network device
(for example, a base station) is X(k), and k is a subcarrier
sequence number. Because the terminal device encrypts the
first reference signal by using the pilot key $K_s$ to obtain the
PRS, X(k) is known to the terminal device. Assuming that a
frequency domain response of an encrypted reference signal
(that is, a first received encrypted reference signal) received
by the terminal device is Y(k), a formula for performing
channel estimation by the terminal device to obtain a down-
link channel estimation value is as follows:

$$H_{down}(k) = \frac{Y(k)}{X(k)} = |H_{down}(k)|e^{j\theta_{down}(k)}$$

where $H_{down}(k)$ represents the downlink channel estimation value.

The terminal device extracts the first strength characteristic information $|H_{down}(k)|$ and the first phase characteristic information $\theta_{down}(k)$ based on the downlink channel estimation value as the downlink channel state information $CSI_{down}$. An extraction formula is as follows:

$$|H_{down}(k)|=\sqrt{real(H_{down}(k))^2 + imag(H_{down}(k))^2}$$

$$\theta_{down}(k)=arctan(imag(H_{down}(k))/real(H_{down}(k)))$$

where $|H_{down}(k)|$ represents the first intensity characteristic information, and $\theta_{down}(k)$ represents the first phase characteristic information.

In this implementation, the strength characteristic information and the phase characteristic information are extracted by using the downlink channel estimation value, so that downlink channel state information that accurately represents a downlink channel state can be obtained.

According to a second aspect, an embodiment of this disclosure provides another authentication method, where the method includes: An access network device receives a second received encrypted reference signal, where the second received encrypted reference signal includes a signal received by the access network device when a second sent encrypted reference signal sent by a terminal device is transmitted through a channel, the second sent encrypted reference signal is obtained by using a pilot key and a second reference signal, and the pilot key is obtained by using a private key of the terminal device and a public key on a network device side, or the pilot key is obtained by using a private key on the network device side and a public key of the terminal device; the access network device performs channel estimation by using the second received encrypted reference signal and the second sent encrypted reference signal, to obtain uplink channel state information; and the access network device sends channel authentication information to a first network device, where the channel authentication information is for verifying whether a message received by the access network device from the terminal device is valid or invalid, and the channel authentication information is obtained by using the uplink channel state information.

The access network device and the terminal device may pre-agree on a used encrypted reference signal, for example, a second sent encrypted reference signal. Specifically, the access network device considers a reference signal in any signal sent by the terminal device as the second sent encrypted reference signal by default. The access network device may obtain, by using a preset interaction policy, the second sent encrypted reference signal sent by the terminal device. Specifically, the terminal device may send one piece of uplink indication information to the access network device, and the uplink indication information indicates the second sent encrypted reference signal. It should be understood that the access network device may learn, in a plurality of manners, that the reference signal in the signal sent by the terminal device is the second sent encrypted reference signal. This is not limited in this disclosure. The channel authentication information is generated by using the uplink channel state information. The channel authentication information may be generated by using the uplink channel state information and downlink channel state information that is from the terminal device, and the downlink channel state information represents a state of a downlink channel between the terminal device and the access network device.

In this embodiment of this disclosure, the access network device performs channel estimation by using the second sent encrypted reference signal and the second received encrypted reference signal, to obtain the uplink channel state information. Then, the channel authentication information is generated by using the uplink channel state information, and the channel authentication information is sent to the first network device, so that the first network device verifies whether the message received by the access network device from the terminal device is valid or invalid, and can defend against a man-in-the-middle attack.

In a possible implementation, that the second sent encrypted reference signal is obtained by using a pilot key and a second reference signal includes: The second sent encrypted reference signal is obtained by encrypting the second reference signal by using the pilot key, where the second sent encrypted reference signal includes at least two same third encrypted sequences, and the third encrypted sequence is obtained by encrypting the second reference signal by using the pilot key; or the second sent encrypted reference signal includes a hash chain, the hash chain includes at least two binary sequences, a first binary sequence in the hash chain is a fourth encrypted sequence, and the fourth encrypted sequence is obtained by encrypting the second reference signal by using the pilot key.

In this implementation, the first sent encrypted reference signal is obtained by encrypting the first reference signal using the pilot key, and the second sent encrypted reference signal occupies few bits. A solution in which the second sent encrypted reference signal includes at least two same third encrypted sequences is highly reliable, and is applicable to a scenario with a low security requirement. A solution in which the second sent encrypted reference signal includes a hash chain has high security, and is applicable to a scenario with a high security requirement.

In a possible implementation, that the second sent encrypted reference signal is obtained by using a pilot key and a second reference signal includes: The second sent encrypted reference signal is obtained by encrypting the second reference signal by using the pilot key, where the pilot key is obtained by performing a one-way hash operation on a shared key, and the shared key is obtained by using the private key on the network device side and the public key of the terminal device.

The access network device may receive the pilot key generated by the first network device. For example, the first network device, for example, a UDM derives the shared key $K_m=derive(K_p^{UE}, K_s^{HN})$ by using the public key $K_p^{UE}$ of the terminal device and the private key $K_s^{HN}$ on the network device side, and derive(•) is a key derivation method; and a one-way hash function operation is performed on the shared key $K_m$ to obtain the pilot key $K_s$, that is, $K_s=hash(K_m)$, and hash (•) is a hash function. The access network device may receive the shared key $K_m$ generated by the first network device, and perform a one-way hash function operation on the shared key $K_m$ to obtain the pilot key $K_s$, that is, $K_s=hash(K_m)$, and hash (•) is a hash function. The access network device may encrypt the first reference signal by using any encryption algorithm and using the pilot key as a key.

In this implementation, the pilot key is obtained by performing a one-way hash operation on the shared key. In this way, a key of a required length can be obtained, and a difficulty of cracking the pilot key can be further increased.

In a possible implementation, before the access network device sends the channel authentication information, the method further includes: The access network device demodulates first information based on the uplink channel state information, to obtain downlink channel state information; and the access network device generates the channel authentication information based on the uplink channel state information and the downlink channel state information.

Demodulation is a process of recovering a message from a modulated signal that carries the message. In various information transmission or processing systems, a transmit end (corresponding to the terminal device) modulates a carrier with a message to be transmitted, to generate a signal carrying the message. A receive end (corresponding to the access network device) needs to recover the transmitted message before the message can be used. This is referred to as demodulation. The first information received by the access network device may carry the downlink channel state information and the second received encrypted reference signal. After completing channel estimation, the access network device may demodulate the first information by using a channel estimation result (namely, uplink channel state information), to obtain downlink channel state information. That the access network device generates the channel authentication information based on the uplink channel state information and the downlink channel state information may be: using a correlation coefficient or consistency between the uplink channel state information and the downlink channel state information as the channel authentication information. The correlation coefficient represents a degree of similarity between the uplink channel state information and the downlink channel state information, and a larger correlation coefficient indicates that the uplink channel state information and the downlink channel state information are more similar. It should be understood that, when the authorized access network device performs data transmission with the authorized terminal device, an uplink channel obtained by performing channel estimation by the authorized access network device is necessarily similar to a downlink channel obtained by performing channel estimation by the authorized terminal device. For example, if the channel authentication information (for example, a correlation coefficient) is greater than a preset threshold, it indicates that the message received by the access network device from the terminal device is valid; otherwise, it indicates that the message received by the access network device from the terminal device is invalid. Therefore, the channel authentication information may be for verifying whether the message received by the access network device from the terminal device is valid or invalid.

In this implementation, the channel authentication information that represents a similarity between the downlink channel estimated by the terminal device and the uplink channel estimated by the access network device is generated based on the uplink channel state information and the downlink channel state information, so that the channel authentication information is for determining whether the message received by the access network device from the terminal device is valid or invalid.

In a possible implementation, the method further includes: The access network device sends second information to the terminal device, where the second information includes a first sent encrypted reference signal, and the first sent encrypted reference signal is obtained by using the pilot key and a first reference signal.

In this implementation, the first sent encrypted reference signal is carried in the second information, so that an attacker cannot perform channel estimation, thereby defending against a man-in-the-middle attack.

In a possible implementation, the method further includes: The access network device generates, when working in a first security mode, the first sent encrypted reference signal including at least two same first encrypted sequences, where the first encrypted sequence is obtained by encrypting the first reference signal using the pilot key; and the access network device generates, when working in a second security mode, the first sent encrypted reference signal including a hash chain, where the hash chain includes at least two binary sequences, a first binary sequence in the hash chain is a second encrypted sequence, the second encrypted sequence is obtained by encrypting the first reference signal using the pilot key, and security of the first security mode is lower than security of the second security mode.

The access network device may work in at least two security modes with different security, for example, the first security mode and the second security mode. When the access network device works in different security modes, different encrypted reference signals may be generated. Correspondingly, the terminal device may also work in at least two security modes with different security, for example, the first security mode and the second security mode. The access network device may freely switch between different security modes, for example, switch from the first security mode to the second security mode or switch from the second security mode to the first security mode. The access network device may indicate, to the terminal device by using the downlink control information, a security mode in which the access network device works.

In this implementation, the access network device generates, when working in the first security mode, the first sent encrypted reference signal that includes at least two same first encrypted sequences, where a hash operation does not need to be performed, and a calculation amount is small, to be applicable to a scenario with high security; and the access network device generates, when working in the second security mode, the first sent encrypted reference signal that includes at least a hash chain, where a plurality of times of hash operations are performed, and security is high, to be applicable to a scenario with low security.

In a possible implementation, before the access network device receives the second received encrypted reference signal, the method further includes: The access network device receives second indication information, where second indication information indicates a location of the second received encrypted reference signal that is in first information and that is to be received by the access network device.

The second indication information may be uplink control information (uplink control information, UCI). The second indication information may include a second encrypted reference signal index. The second encrypted reference signal index indicates the location of the second received encrypted reference signal that is in the first information and that is to be received by the access network device. The second received encrypted reference information is included in the first information, and the operation of receiving, by the access network device, the second received encrypted reference signal may be an operation of receiving the first information. After receiving the first information, the access network device may obtain the second received encrypted reference signal from the first information based on the second indication information. The access network device may store a correspondence between an index and a location of an encrypted reference signal, and may determine, by using the correspondence, a location of an encrypted reference signal indicated by any encrypted reference signal

11 index. For example, the second indication information received by the access network device includes an encrypted reference signal index 3, and the access network device obtains a signal that is in a third location and in the first information, to obtain the second received encrypted reference signal. For another example, the second indication information received by the access network device includes an encrypted reference signal index 4, and the access network device obtains a signal that is in a fourth location and in the first information, to obtain the second received encrypted reference signal.

In this implementation, the access network device can accurately obtain, based on the second indication information, a location of the second received encrypted reference signal that is in first information and that is to be received.

In a possible implementation, the second indication information further includes at least one of the following: a second encrypted reference signal type, a second encrypted reference signal length, a second encrypted activation indication, and a second security mode indication, where the second encrypted reference signal type is a type of the second received encrypted reference signal, the second encrypted reference signal length indicates a length of the second received encrypted reference signal, the second encrypted activation indication indicates the access network device to send an unencrypted reference signal or an encrypted parameter signal, and the second security mode indication indicates an encryption manner of the second received encrypted reference signal.

The second encrypted reference signal type may be a DM-RS, an SRS, or the like. The second encrypted reference signal length indicates a length of the second received encrypted reference signal. For example, if the length of the second encrypted reference signal is K, it indicates that the encrypted reference signal to be sent by the access network device occupies K bits, and K is an integer greater than 1. If the length of the second encrypted reference signal is F, it indicates that the encrypted reference signal to be sent by the access network device occupies F bits, and F is an integer greater than 1. The second security mode indication may indicate an encryption manner of an encrypted reference signal to be sent by the access network device. For example, when the second security mode indication is 1, the encrypted reference signal to be sent by the access network device includes at least two same third encrypted sequences, and the third encrypted sequence is obtained by encrypting the second reference signal by using the pilot key. For another example, when the second security mode indication is 2, the encrypted reference signal to be sent by the access network device includes a hash chain, and the hash chain includes at least two binary sequences. A first binary sequence in the hash chain is a fourth encrypted sequence, and the fourth encrypted sequence is obtained by encrypting the second reference signal by using the pilot key. The second encryption activation indication may indicate whether the terminal device sends an encrypted reference signal or an unencrypted reference signal. In some communication scenarios with a low security requirement, the second encryption activation indication indicates the terminal device to send an unencrypted reference signal. In some communication scenarios with a high security requirement, the second encryption activation indication indicates the terminal device to send an encrypted reference signal.

In this implementation, the second indication information may carry information that can further define the reference signal to be sent by the access network device, so that the terminal device can accurately obtain the encrypted reference signal or the unencrypted reference signal sent by the access network device.

In a possible implementation, that the access network device performs channel estimation by using the second received encrypted reference signal and the second sent encrypted reference signal, to obtain the uplink channel state information includes: The access network device performs channel estimation by using the second received encrypted reference signal and the second sent encrypted reference signal, to obtain an uplink channel estimation value; and uses second strength characteristic information and second phase characteristic information that are extracted based on the uplink channel estimation value as the uplink channel state information.

The access network device may perform channel estimation by using a least square method, a minimum mean square error method, or the like. In this implementation, the least square method is used as an example. It is assumed that a frequency domain response corresponding to a second sent encrypted reference signal PRS generated by a terminal device (for example, a mobile phone) is X'(k), and k is a subcarrier sequence number. Because the access network device encrypts the second reference signal by using the pilot key $K_s$ to obtain the PRS, X'(k) is known to the access network device. Assuming that a frequency domain response of an encrypted reference signal (that is, a second received encrypted reference signal) received by the access network device is Y'(k), a formula for performing channel estimation by the access network device to obtain an uplink channel estimation value is as follows:

$$H_{up}(k) = \frac{Y'(k)}{X'(k)} = |H_{up}(k)|e^{j\theta_{up}(k)}$$

where $H_{up}(k)$ represents the uplink channel estimation value.

The access network device extracts the second strength characteristic information $|H_{up}(k)|$ and the second phase characteristic information $\theta_{up}(k)$ based on the uplink channel estimation value as the uplink channel state information $CSI_{up}$. An extraction formula is as follows:

$$|H_{up}(k)| = \sqrt{real(H_{ip}(k))^2 + imag(H_{ip}(k))^2}$$

$$\theta_{up}(k) = arctan(imag(H_{up}(k))/real(H_{up}(k)))$$

where $|H_{up}(k)|$ represents the second intensity characteristic information, and $\theta_{up}(k)$ represents the second phase characteristic information.

In this implementation, the second strength characteristic information and the second phase characteristic information are extracted by using the uplink channel estimation value, so that uplink channel state information that accurately represents an uplink channel state can be obtained.

According to a third aspect, an embodiment of this disclosure provides another authentication method, where the method includes: A terminal device receives an authentication request, where the authentication request carries a first received encrypted reference signal, the first received encrypted reference signal includes a signal received by the terminal device when a first sent encrypted reference signal sent by an access network device is transmitted through a channel, the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device; the terminal device performs channel estimation by using the first received encrypted reference signal and the first sent encrypted reference signal, to obtain downlink channel state information; and the terminal device sends an authentication response to the access network device, where the authentication response includes the downlink channel state information. The public key on the network device side may be a public key of the access network device, or may be a public key of a non-access stratum network device. The pilot key is a key for encrypting a pilot signal (that is, a reference signal).

The authentication request (authentication request) is signaling sent by the access network device to the terminal device. The authentication response (authentication request) may be understood as signaling fed back to the access network device for the authentication request (authentication request).

In this embodiment of this disclosure, the access network device performs channel estimation by using the second sent encrypted reference signal and the second received encrypted reference signal, to obtain the uplink channel state information; and generates channel authentication information by using the uplink channel state information, to verify whether a message received by the access network device from the terminal device is valid or invalid, that is, defend against a man-in-the-middle attack.

In a possible implementation, that the first sent encrypted reference signal is obtained by using a pilot key and a first reference signal includes: The first sent encrypted reference signal is obtained by encrypting the first reference signal using the pilot key, where the first sent encrypted reference signal includes at least two same first encrypted sequences, and the first encrypted sequence is obtained by encrypting the first reference signal using the pilot key; or the first sent encrypted reference signal includes a hash chain, the hash chain includes at least two binary sequences, a first binary sequence in the hash chain is a second encrypted sequence, and the second encrypted sequence is obtained by encrypting the first reference signal using the pilot key.

In this implementation, the first sent encrypted reference signal is obtained by encrypting the first reference signal using the pilot key, and the first sent encrypted reference signal occupies few bits. A solution in which the first sent encrypted reference signal includes at least two same first encrypted sequences is highly reliable, and is applicable to a scenario with a low security requirement. A solution in which the first sent encrypted reference signal includes a hash chain has high security, and is applicable to a scenario with a high security requirement.

In a possible implementation, before the terminal device performs channel estimation by using the first received encrypted reference signal and the first sent encrypted reference signal, the method further includes: The terminal device generates, when working in a first security mode, the first sent encrypted reference signal including at least two same first encrypted sequences, where the first encrypted sequence is obtained by encrypting the first reference signal using the pilot key; and the terminal device generates, when working in a second security mode, the first sent encrypted reference signal including a hash chain, where the hash chain includes at least two binary sequences, a first binary sequence in the hash chain is a second encrypted sequence, the second encrypted sequence is obtained by encrypting the first reference signal using the pilot key, and security of the first security mode is lower than security of the second security mode.

In this implementation, the terminal device generates, when working in the first security mode, the first sent encrypted reference signal that includes at least two same first encrypted sequences, where a hash operation does not need to be performed, and a calculation amount is small, to be applicable to a scenario with high security; and the terminal device generates, when working in the second security mode, the first sent encrypted reference signal that includes at least a hash chain, where a plurality of times of hash operations are performed, and security is high, to be applicable to a scenario with low security.

In a possible implementation, that the first sent encrypted reference signal is obtained by using a pilot key and a first reference signal includes: The first sent encrypted reference signal is obtained by encrypting the first reference signal using the pilot key, where the pilot key is obtained by performing a one-way hash operation on a shared key, and the shared key is obtained by using the private key of the terminal device and the public key on the network device side.

In this implementation, the pilot key is obtained by performing a one-way hash operation on the shared key. In this way, a key of a required length can be obtained, and a difficulty of cracking the pilot key can be further increased.

In a possible implementation, the authentication response further includes a second sent encrypted reference signal, and the second sent encrypted reference signal is obtained by using the pilot key and a second reference signal.

In this implementation, the second sent encrypted reference signal is carried in the authentication response, so that an attacker cannot implement channel estimation, thereby defending against a man-in-the-middle attack.

In a possible implementation, before the terminal device receives the authentication request, the method further includes: The terminal device receives first indication information, where the first indication information indicates a location of the first received encrypted reference signal that is in the authentication request and that is to be received by the terminal device.

In this implementation, the first indication information indicates the location of the first received encrypted reference signal that is in the authentication request and that is to be received by the terminal device, and the terminal device can accurately obtain, based on the first indication information, the location of the first received encrypted reference signal that is in the second information and that is to be received.

In a possible implementation, the first indication information further includes at least one of the following: a first encrypted reference signal type, a first encrypted reference signal length, a first encrypted activation indication, and a first security mode indication, where the first encrypted reference signal type is a type of the first received encrypted reference signal, the first encrypted reference signal length indicates a length of the first received encrypted reference signal, the first encrypted activation indication indicates the access network device to send an unencrypted reference signal or an encrypted parameter signal, and the first security mode indication indicates an encryption manner of the first received encrypted reference signal.

In this implementation, the first indication information may carry information that can further define the reference signal to be sent by the access network device, so that the terminal device can accurately obtain the encrypted reference signal or the unencrypted reference signal sent by the access network device.

In a possible implementation, that the terminal device performs channel estimation by using the first received encrypted reference signal and the first sent encrypted reference signal, to obtain the downlink channel state information includes: The terminal device performs channel estimation by using the first received encrypted reference signal and the first sent encrypted reference signal, to obtain a downlink channel estimation value; and uses first strength characteristic information and first phase characteristic information that are extracted based on the downlink channel estimation value as the downlink channel state information.

In this implementation, the strength characteristic information and the phase characteristic information are extracted by using the downlink channel estimation value, so that downlink channel state information that accurately represents a downlink channel state can be obtained.

In a possible implementation, before the terminal device receives the authentication request, the method further includes: The terminal device encrypts (for example, symmetrically encrypts) a subscription permanent identifier SUPI by using the shared key, to obtain a subscription concealed identifier SUCI; and the terminal device sends a registration request, where the registration request includes the SUCI and the public key of the terminal device.

In this implementation, the SUPI is encrypted by using the shared key, so that a risk that the SUPI is decrypted by an attacker can be reduced.

According to a fourth aspect, an embodiment of this disclosure provides another authentication method, where the method includes: An access network device receives an authentication response, where the authentication response carries a second received encrypted reference signal, the second received encrypted reference signal includes a signal received by the access network device when a second sent encrypted reference signal sent by a terminal device is transmitted through a channel, the second sent encrypted reference signal is obtained by using a pilot key and a second reference signal, and the pilot key is obtained by using a private key of the terminal device and a public key on a network device side, or the pilot key is obtained by using a private key on the network device side and a public key of the terminal device; the access network device performs channel estimation by using the second received encrypted reference signal and the second sent encrypted reference signal, to obtain uplink channel state information, where the uplink channel state information is for generating channel authentication information; and the access network device sends channel authentication information to a first network device, where the channel authentication information is for verifying whether a message received by the access network device from the terminal device is valid or invalid, and the channel authentication information is obtained by using the uplink channel state information.

That the access network device sends the channel authentication information may be: The access network device sends Nausf_UEAuthentication_Authenticate Request signaling that carries the channel authentication information, where the signaling may further include a response RES*.

In this embodiment of this disclosure, the access network device performs channel estimation by using the second sent encrypted reference signal and the second received encrypted reference signal, to obtain the uplink channel state information. Then, the channel authentication information is generated by using the uplink channel state information, and the channel authentication information is sent to the first network device, so that the first network device verifies whether the message received by the access network device from the terminal device is valid or invalid, and can defend against a man-in-the-middle attack.

In a possible implementation, that the second sent encrypted reference signal is obtained by using a pilot key and a second reference signal includes: The second sent encrypted reference signal is obtained by encrypting the second reference signal by using the pilot key, where the second sent encrypted reference signal includes at least two same third encrypted sequences, and the third encrypted sequence is obtained by encrypting the second reference signal by using the pilot key; or the second sent encrypted reference signal includes a hash chain, the hash chain includes at least two binary sequences, a first binary sequence in the hash chain is a fourth encrypted sequence, and the fourth encrypted sequence is obtained by encrypting the second reference signal by using the pilot key.

In this implementation, the first sent encrypted reference signal is obtained by encrypting the first reference signal using the pilot key, and the second sent encrypted reference signal occupies few bits. A solution in which the second sent encrypted reference signal includes at least two same third encrypted sequences is highly reliable, and is applicable to a scenario with a low security requirement. A solution in which the second sent encrypted reference signal includes a hash chain has high security, and is applicable to a scenario with a high security requirement.

In a possible implementation, that the second sent encrypted reference signal is obtained by using a pilot key and a second reference signal includes: The second sent encrypted reference signal is obtained by encrypting the second reference signal by using the pilot key, where the pilot key is obtained by performing a one-way hash operation on a shared key, and the shared key is obtained by using the private key on the network device side and the public key of the terminal device.

In this implementation, the pilot key is obtained by performing a one-way hash operation on the shared key. In this way, a key of a required length can be obtained, and a difficulty of cracking the pilot key can be further increased.

In a possible implementation, before the access network device sends the channel authentication information, the method further includes: The access network device demodulates the authentication response based on the uplink channel state information, to obtain downlink channel state information; and the access network device generates the channel authentication information based on the uplink channel state information and the downlink channel state information.

In this implementation, the access network device generates, based on the uplink channel state information and the downlink channel state information, the channel authentication information that represents a similarity between the downlink channel estimated by the terminal device and the uplink channel estimated by the access network device, so that the channel authentication information is for determining whether the message received by the access network device from the terminal device is valid or invalid.

In a possible implementation, the method further includes: The access network device sends an authentication request to the terminal device, where the authentication request includes a first sent encrypted reference signal, and the first sent encrypted reference signal is obtained by using the pilot key and a first reference signal.

In this implementation, the first sent encrypted reference signal is carried in the authentication request, so that an attacker cannot perform channel estimation, thereby defending against a man-in-the-middle attack.

In a possible implementation, the method further includes: The access network device generates, when working in a first security mode, the first sent encrypted reference signal including at least two same first encrypted sequences, where the first encrypted sequence is obtained by encrypting the first reference signal using the pilot key; and the access network device generates, when working in a second security mode, the first sent encrypted reference signal including a hash chain, where the hash chain includes at least two binary sequences, a first binary sequence in the hash chain is a second encrypted sequence, the second encrypted sequence is obtained by encrypting the first reference signal using the pilot key, and security of the first security mode is lower than security of the second security mode.

In this implementation, the access network device generates, when working in the first security mode, the first sent encrypted reference signal that includes at least two same first encrypted sequences, where a hash operation does not need to be performed, and a calculation amount is small, to be applicable to a scenario with high security; and the access network device generates, when working in the second security mode, the first sent encrypted reference signal that includes at least a hash chain, where a plurality of times of hash operations are performed, and security is high, to be applicable to a scenario with low security.

In a possible implementation, before the access network device receives the authentication response, the method further includes: The access network device receives second indication information, where the second indication information indicates a location of the second received encrypted reference signal that is in the authentication response and that is to be received by the access network device.

In this implementation, the second indication information indicates the location of the second received encrypted reference signal that is in the authentication response and that is to be received by the access network device, and the access network device can accurately obtain, based on the second indication information, the location of the second received encrypted reference signal that is in the first information and that is to be received.

In a possible implementation, the second indication information further includes at least one of the following: a second encrypted reference signal type, a second encrypted reference signal length, a second encrypted activation indication, and a second security mode indication, where the second encrypted reference signal type is a type of the second received encrypted reference signal, the second encrypted reference signal length indicates a length of the second received encrypted reference signal, the second encrypted activation indication indicates the access network device to send an unencrypted reference signal or an encrypted parameter signal, and the second security mode indication indicates an encryption manner of the second received encrypted reference signal.

In this implementation, the second indication information may carry information that can further define the reference signal to be sent by the access network device, so that the terminal device can accurately obtain the encrypted reference signal or the unencrypted reference signal sent by the access network device.

In a possible implementation, that the access network device performs channel estimation by using the second received encrypted reference signal and the second sent encrypted reference signal, to obtain the uplink channel state information includes: The access network device performs channel estimation by using the second received encrypted reference signal and the second sent encrypted reference signal, to obtain an uplink channel estimation value; and uses second strength characteristic information and second phase characteristic information that are extracted based on the uplink channel estimation value as the uplink channel state information.

In this implementation, the second strength characteristic information and the second phase characteristic information are extracted by using the uplink channel estimation value, so that uplink channel state information that accurately represents an uplink channel state can be obtained.

In a possible implementation, the method further includes: The access network device receives a registration request from the terminal device, where the registration request carries a subscription concealed identifier SUCI and the public key of the terminal device; and the access network device forwards the SUCI and the public key of the terminal device to a second network device, or the access network device generates the shared key by using the public key of the terminal device and the private key on the network device side.

That the access network device forwards the SUCI and the public key of the terminal device to a second network device may be: The access network device forwards the SUCI and the public key of the terminal device to another network device by using Nausf_UEAuthentication_Authenticate Request signaling, for example, a network device that has an authentication server function (authentication server function, AUSF). The access network device forwards the public key of the terminal device to obtain, from another network device, a shared key or a pilot key obtained by using the public key and the private key of the network device. For example, the access network device obtains the shared key or the pilot key from Nausf_UEAuthentication_Authenticate Response signaling. After generating the shared key, the access network device may perform a one-way hash operation on the shared key to obtain the pilot key. It should be understood that the access network device may receive a shared key or a pilot key sent by another network device, or may generate a shared key or a pilot key by itself. The subscription concealed identifier (subscription concealed identifier, SUCI) may be obtained by encrypting (for example, symmetrically encrypting) a subscription permanent identifier (subscription permanent identifier) SUPI by using the shared key.

In this implementation, the public key of the terminal device may be obtained, and then the shared key may be obtained or generated.

According to a fifth aspect, an embodiment of this disclosure provides another authentication method, where the method includes: An access network device sends a first sent encrypted reference signal to a terminal device, where the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device; the access network device receives first information from the terminal device, where the first information includes downlink channel state information, the downlink channel state information is obtained by performing channel estimation by using a first received encrypted reference signal and the first sent encrypted reference signal, and the first received encrypted reference signal includes a signal received by the terminal device when the first sent encrypted reference signal sent by the access network device is transmitted through a channel; and the access network device sends channel authentication information to a first network device, where the channel authentication information is for verifying whether a message received by the access network device from the terminal device is valid or invalid, and the channel authentication information is obtained by using the downlink channel state information.

In this embodiment of this disclosure, the access network device sends the first sent encrypted reference signal to the terminal device, so that only the authorized terminal device can obtain the downlink channel state information through channel estimation. Then, the channel authentication information obtained by using the downlink channel state information is sent to the first network device, so that the first network device verifies whether the message received by the access network device from the terminal device is valid or invalid, and can defend against a man-in-the-middle attack.

In a possible implementation, after the access network device receives the first information from the terminal device, the method further includes: The access network device performs channel estimation by using second received encrypted reference signal and second sent encrypted reference signal, to obtain uplink channel state information, where the second sent encrypted reference signal is obtained by using the pilot key and a second reference signal, the second received encrypted reference signal includes a signal received by the access network device when the second sent encrypted reference signal sent by the terminal device is transmitted through a channel, and the second sent encrypted reference signal is included in the first information; and the access network device generates the channel authentication information based on the uplink channel state information and the downlink channel state information.

In this implementation, the access network device generates, based on the uplink channel state information and the downlink channel state information, the channel authentication information that represents a similarity between the downlink channel estimated by the terminal device and the uplink channel estimated by the access network device, so that the channel authentication information is for determining whether the message received by the access network device from the terminal device is valid or invalid.

According to a sixth aspect, an embodiment of this disclosure provides another authentication method, where the method includes: A terminal device receives a first received encrypted reference signal, where the first received encrypted reference signal includes a signal received by the terminal device when a first sent encrypted reference signal sent by an access network device is transmitted through a channel, the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device; the terminal device sends first information to the access network device, where the first information includes a second sent encrypted reference signal and downlink channel state information, the second sent encrypted reference signal is obtained by using the pilot key and a second reference signal, and the downlink channel state information is obtained by using the first received encrypted reference signal.

In this embodiment of this disclosure, the terminal device sends the downlink channel state information to the access network device, to prove that the terminal device is an authorized terminal device. In addition, the second sent encrypted reference signal is sent to the access network device, so that the access network device performs channel estimation by using the second sent encrypted reference signal, and performs demodulation to obtain the downlink channel state information.

In a possible implementation, the method further includes: before the terminal device sends the first information to the access network device, the method further includes: The terminal device performs channel estimation by using the first received encrypted reference signal and the first sent encrypted reference signal, to obtain the downlink channel state information.

In this implementation, channel estimation is performed by using the first received encrypted reference signal and the first sent encrypted reference signal, to obtain the downlink channel state information of the terminal device capable of proving that the terminal device is an authorized terminal device. Because the attacker cannot obtain the first sent encrypted reference signal, the attacker cannot obtain, through channel estimation, the downlink channel state information that can accurately represent the channel between the access network device and the terminal device. Therefore, the terminal device sends the downlink channel state information to the access network device, to effectively defend against a man-in-the-middle attack.

According to a seventh aspect, an embodiment of this disclosure provides another authentication method, where the method includes: A first network device receives channel authentication information, where the channel authentication information represents a correlation between an uplink channel estimated by an access network device and a downlink channel estimated by a terminal device; and the first network device verifies, based on the channel authentication information, whether a message received by the access network device from the terminal device is valid or invalid.

The first network device may be an access network device, or may be a network device having a UDM. In other words, the first network device may be the access network device in the first aspect to the sixth aspect, or may be an independent network device, that is, be not the access network device in the first aspect to the sixth aspect. That a first network device receives channel authentication information may be: The first network device receives Nudm_UEAuthentication_ResultConfirmation Request signaling, where the signaling carries the channel authentication information. The Nudm_UEAuthentication_ResultConfirmation Request signaling may further include an SUPI, an authentication timestamp, an authentication type, and a visiting network name. The channel authentication information may include an authentication parameter. That the first network device verifies, based on the channel authentication information, whether a message received by the access network device from the terminal device is valid or invalid may be: The access network device determines, when the authentication parameter is greater than an authentication threshold, that the message received by the access network device from the terminal device is valid; and the access network device determines, when the authentication parameter is not greater than the authentication threshold, that the message received by the access network device from the terminal device is invalid.

In this embodiment of this disclosure, whether the message received by the access network device from the terminal device is valid or invalid is verified based on the channel authentication information, to defend against a man-in-the-middle attack.

In a possible implementation, the method further includes: The first network device generates a shared key by using a public key of the terminal device and a private key on a network device side; and the first network device sends the shared key or a pilot key, where the pilot key is obtained by performing a one-way hash operation on the shared key, and the pilot key or the shared key is used by the access network device to generate the channel authentication information.

The first network device is a non-access stratum network device, for example, a network device having a UDM.

In this implementation, the first network device generates the shared key by using the public key of the terminal device and the private key on the network device side, and sends the shared key or the pilot key, so that the access network device encrypts a reference signal by using the pilot key.

According to an eighth aspect, an embodiment of this disclosure provides another authentication method, where the method includes: A second network device sends a public key of a terminal device to a first network device; the second network device receives a shared key or a pilot key sent by the first network device, where the shared key is obtained by using the public key of the terminal device and a private key on a network device side, and the pilot key is obtained by performing a one-way hash operation on the shared key; the second network device generates key information that includes the shared key or the pilot key; and the second network device sends the key information.

The second network device may be the access network device in the first aspect to the fourth aspect, or may be an independent network device that has an AUSF, that is, be not the access network device in the first aspect to the fourth aspect. The first network device is a network device having a UDM.

In this embodiment of this disclosure, the second network device sends the key information, so that the access network device encrypts a reference signal by using pilot information.

In a possible implementation, the method further includes: The second network device receives channel authentication information from the access network device; and the second network device sends the channel authentication information to the first network device, where the channel authentication information is for verifying whether a message received by the access network device from the terminal device is valid or invalid.

That the second network device receives channel authentication information from the access network device may be: The second network device receives Nausf_UEAuthentication_Authenticate Request signaling from the access network device, where the signaling includes the channel authentication information. That the second network device sends the channel authentication information to the first network device may be: The second network device sends Nudm_UEAuthentication_ResultConfirmation Request signaling to the first network device, where the signaling includes the channel authentication information.

In this implementation, the second network device forwards the channel authentication information, so that the first network device verifies whether the message received by the access network device from the terminal device is valid or invalid.

In a possible implementation, the method further includes: The second network device receives the public key of the terminal device; and the second network device sends the public key of the terminal device to the first network device.

That the second network device receives the public key of the terminal device may be: The second network device receives Nausf_UEAuthentication_Authenticate Request signaling, where the signaling includes the public key of the terminal device. That the second network device sends the public key of the terminal device to the first network device may be: The second network device sends Nudm_UEAuthentication_Get Request signaling to the first network device, where the signaling includes the public key of the terminal device.

In this manner, the second network device forwards, to the first network device, the public key from the terminal device, so that the first network device generates the pilot key.

According to a ninth aspect, an embodiment of this disclosure provides a communication apparatus, including: a transceiver module, configured to receive a first received encrypted reference signal, where the first received encrypted reference signal includes a signal received by a terminal device when a first sent encrypted reference signal sent by an access network device is transmitted through a channel, the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device; and a processing module, configured to perform channel estimation by using the first received encrypted reference signal and the first sent encrypted reference signal, to obtain downlink channel state information, where the transceiver module is further configured to send first information to the access network device, where the first information includes the downlink channel state information.

In this embodiment of this disclosure, the terminal device performs channel estimation by using the first sent encrypted reference signal and the first received encrypted reference signal, and sends downlink channel state information obtained by performing channel estimation, to prove that the terminal device is an authorized terminal device. Because the attacker cannot obtain the first sent encrypted reference signal, the attacker cannot obtain, through channel estimation, the downlink channel state information that can accurately represent the channel between the access network device and the terminal device. Therefore, the terminal device sends the downlink channel state information to the access network device, to effectively defend against a man-in-the-middle attack.

In a possible implementation, that the first sent encrypted reference signal is obtained by using a pilot key and a first reference signal includes: The first sent encrypted reference signal is obtained by encrypting the first reference signal using the pilot key, where the first sent encrypted reference signal includes at least two same first encrypted sequences, and the first encrypted sequence is obtained by encrypting the first reference signal using the pilot key; or the first sent encrypted reference signal includes a hash chain, the hash chain includes at least two binary sequences, a first binary sequence in the hash chain is a second encrypted sequence, and the second encrypted sequence is obtained by encrypting the first reference signal using the pilot key.

In this implementation, the first sent encrypted reference signal is obtained by encrypting the first reference signal using the pilot key, and the first sent encrypted reference signal occupies few bits. A solution in which the first sent encrypted reference signal includes at least two same first encrypted sequences is highly reliable, and is applicable to a scenario with a low security requirement. A solution in which the first sent encrypted reference signal includes a hash chain has high security, and is applicable to a scenario with a high security requirement.

In a possible implementation, the processing module is further configured to: generate, when the terminal device works in a first security mode, the first sent encrypted reference signal including at least two same first encrypted sequences, where the first encrypted sequence is obtained by encrypting the first reference signal using the pilot key; and generate, when the terminal device works in a second security mode, the first sent encrypted reference signal including a hash chain, where the hash chain includes at least two binary sequences, a first binary sequence in the hash chain is a second encrypted sequence, the second encrypted sequence is obtained by encrypting the first reference signal using the pilot key, and security of the first security mode is lower than security of the second security mode.

In this implementation, the terminal device generates, when working in the first security mode, the first sent encrypted reference signal that includes at least two same first encrypted sequences, where a hash operation does not need to be performed, and a calculation amount is small, to be applicable to a scenario with high security; and the terminal device generates, when working in the second security mode, the first sent encrypted reference signal that includes at least a hash chain, where a plurality of times of hash operations are performed, and security is high, to be applicable to a scenario with low security.

In a possible implementation, that the first sent encrypted reference signal is obtained by using a pilot key and a first reference signal includes: The first sent encrypted reference signal is obtained by encrypting the first reference signal using the pilot key, where the pilot key is obtained by performing a one-way hash operation on a shared key, and the shared key is obtained by using the private key of the terminal device and the public key on the network device side.

In this implementation, the pilot key is obtained by performing a one-way hash operation on the shared key. In this way, a key of a required length can be obtained, and a difficulty of cracking the pilot key can be further increased.

In a possible implementation, the first information further includes a second sent encrypted reference signal, and the second sent encrypted reference signal is obtained by using the pilot key and a second reference signal.

The second sent encrypted reference signal is used by the access network device to perform channel estimation on an uplink channel between the access network device and the terminal device.

In a possible implementation, the transceiver module is further configured to receive first indication information, where the first indication information indicates a location of the first received encrypted reference signal that is in second information and that is to be received by the terminal device.

In this implementation, the terminal device can accurately obtain, based on the first indication information, a location of the first received encrypted reference signal that is in second information and that is to be received.

In a possible implementation, the first indication information further includes at least one of the following: a first encrypted reference signal type, a first encrypted reference signal length, a first encrypted activation indication, and a first security mode indication, where the first encrypted reference signal type is a type of the first received encrypted reference signal, the first encrypted reference signal length indicates a length of the first received encrypted reference signal, the first encrypted activation indication indicates the access network device to send an unencrypted reference signal or an encrypted parameter signal, and the first security mode indication indicates an encryption manner of the first received encrypted reference signal.

In this implementation, the first indication information may carry information that can further define the reference signal to be sent by the access network device, so that the terminal device can accurately obtain the encrypted reference signal or the unencrypted reference signal sent by the access network device.

In a possible implementation, the processing module is specifically configured to: perform channel estimation by using the first received encrypted reference signal and the first sent encrypted reference signal, to obtain a downlink channel estimation value; and use first strength characteristic information and first phase characteristic information that are extracted based on the downlink channel estimation value as the downlink channel state information.

In this implementation, the strength characteristic information and the phase characteristic information are extracted by using the downlink channel estimation value, so that downlink channel state information that accurately represents a downlink channel state can be obtained.

According to a tenth aspect, an embodiment of this disclosure provides another communication apparatus, including: a transceiver module, configured to receive a second received encrypted reference signal, where the second received encrypted reference signal includes a signal received by an access network device when a second sent encrypted reference signal sent by a terminal device is transmitted through a channel, the second sent encrypted reference signal is obtained by using a pilot key and a second reference signal, and the pilot key is obtained by using a private key of the terminal device and a public key on a network device side, or the pilot key is obtained by using a private key on the network device side and a public key of the terminal device; and a processing module, configured to perform channel estimation by using the second received encrypted reference signal and the second sent encrypted reference signal, to obtain uplink channel state information, where the transceiver module is further configured to send channel authentication information to a first network device, where the channel authentication information is for verifying whether a message received by the access network device from the terminal device is valid or invalid, and the channel authentication information is obtained by using the uplink channel state information.

In this embodiment of this disclosure, the access network device performs channel estimation by using the second sent encrypted reference signal and the second received encrypted reference signal, to obtain the uplink channel state information. Then, the channel authentication information is generated by using the uplink channel state information, and the channel authentication information is sent to the first network device, so that the first network device verifies whether the message received by the access network device from the terminal device is valid or invalid, and can defend against a man-in-the-middle attack.

In a possible implementation, that the second sent encrypted reference signal is obtained by using a pilot key and a second reference signal includes: The second sent encrypted reference signal is obtained by encrypting the second reference signal by using the pilot key, where the second sent encrypted reference signal includes at least two same third encrypted sequences, and the third encrypted sequence is obtained by encrypting the second reference signal by using the pilot key; or the second sent encrypted reference signal includes a hash chain, the hash chain includes at least two binary sequences, a first binary sequence in the hash chain is a fourth encrypted sequence, and the fourth encrypted sequence is obtained by encrypting the second reference signal by using the pilot key.

In this implementation, the first sent encrypted reference signal is obtained by encrypting the first reference signal using the pilot key, and the second sent encrypted reference signal occupies few bits. A solution in which the second sent encrypted reference signal includes at least two same third encrypted sequences is highly reliable, and is applicable to a scenario with a low security requirement. A solution in which the second sent encrypted reference signal includes a hash chain has high security, and is applicable to a scenario with a high security requirement.

In a possible implementation, that the second sent encrypted reference signal is obtained by using a pilot key and a second reference signal includes: The second sent encrypted reference signal is obtained by encrypting the second reference signal by using the pilot key, where the pilot key is obtained by performing a one-way hash operation on a shared key, and the shared key is obtained by using the private key on the network device side and the public key of the terminal device.

In this implementation, the pilot key is obtained by performing a one-way hash operation on the shared key. In this way, a key of a required length can be obtained, and a difficulty of cracking the pilot key can be further increased.

In a possible implementation, the processing module is further configured to demodulate first information based on the uplink channel state information, to obtain downlink channel state information; and generate the channel authentication information based on the uplink channel state information and the downlink channel state information.

In this implementation, the channel authentication information that represents a similarity between the downlink channel estimated by the terminal device and the uplink channel estimated by the access network device is generated based on the uplink channel state information and the downlink channel state information, so that the channel authentication information is for determining whether the message received by the access network device from the terminal device is valid or invalid.

In a possible implementation, the transceiver module is further configured to send second information to the terminal device, where the second information includes a first sent encrypted reference signal, and the first sent encrypted reference signal is obtained by using the pilot key and a first reference signal.

In this implementation, the first sent encrypted reference signal is carried in the second information, so that an attacker cannot perform channel estimation, thereby defending against a man-in-the-middle attack.

In a possible implementation, the processing module is further configured to: generate, when the access network device works in a first security mode, the first sent encrypted reference signal including at least two same first encrypted sequences, where the first encrypted sequence is obtained by encrypting the first reference signal using the pilot key; and generate, when the access network device works in a second security mode, the first sent encrypted reference signal including a hash chain, where the hash chain includes at least two binary sequences, a first binary sequence in the hash chain is a second encrypted sequence, the second encrypted sequence is obtained by encrypting the first reference signal using the pilot key, and security of the first security mode is lower than security of the second security mode.

In this implementation, the access network device generates, when working in the first security mode, the first sent encrypted reference signal that includes at least two same first encrypted sequences, where a hash operation does not need to be performed, and a calculation amount is small, to be applicable to a scenario with high security. The access network device generates, when working in the second security mode, the first sent encrypted reference signal that includes at least a hash chain, where a plurality of times of hash operations are performed, and security is high, to be applicable to a scenario with low security.

In a possible implementation, the transceiver module is further configured to receive second indication information, where the second indication information indicates a location of the second received encrypted reference signal that is in first information and that is to be received by the access network device.

In this implementation, the access network device can accurately obtain, based on the second indication information, a location of the second received encrypted reference signal that is in first information and that is to be received.

In a possible implementation, the second indication information further includes at least one of the following: a second encrypted reference signal type, a second encrypted reference signal length, a second encrypted activation indication, and a second security mode indication, where the second encrypted reference signal type is a type of the second received encrypted reference signal, the second encrypted reference signal length indicates a length of the second received encrypted reference signal, the second encrypted activation indication indicates the access network device to send an unencrypted reference signal or an encrypted parameter signal, and the second security mode indication indicates an encryption manner of the second received encrypted reference signal.

In this implementation, the second indication information may carry information that can further define the reference signal to be sent by the access network device, so that the terminal device can accurately obtain the encrypted reference signal or the unencrypted reference signal sent by the access network device.

In a possible implementation, the processing module is specifically configured to: perform channel estimation by using the second received encrypted reference signal and the second sent encrypted reference signal, to obtain an uplink channel estimation value; and use second strength characteristic information and second phase characteristic information that are extracted based on the uplink channel estimation value as the uplink channel state information.

In this implementation, the second strength characteristic information and the second phase characteristic information are extracted by using the uplink channel estimation value, so that uplink channel state information that accurately represents an uplink channel state can be obtained.

According to an eleventh aspect, an embodiment of this disclosure provides another communication apparatus, including: a transceiver module, configured to receive an authentication request, where the authentication request carries a first received encrypted reference signal, the first received encrypted reference signal includes a signal received by the terminal device when a first sent encrypted reference signal sent by an access network device is transmitted through a channel, the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device; and a processing module, configured to perform channel estimation by using the first received encrypted reference signal and the first sent encrypted reference signal, to obtain downlink channel state information, where the transceiver module is further configured to send an authentication response to the access network device, where the authentication response includes the downlink channel state information.

In this embodiment of this disclosure, the access network device performs channel estimation by using the second sent encrypted reference signal and the second received encrypted reference signal, to obtain the uplink channel state information; and generates channel authentication information by using the uplink channel state information, to verify whether a message received by the access network device from the terminal device is valid or invalid, that is, defend against a man-in-the-middle attack.

In a possible implementation, that the first sent encrypted reference signal is obtained by using a pilot key and a first reference signal includes: The first sent encrypted reference signal is obtained by encrypting the first reference signal using the pilot key, where the first sent encrypted reference signal includes at least two same first encrypted sequences, and the first encrypted sequence is obtained by encrypting the first reference signal using the pilot key; or the first sent encrypted reference signal includes a hash chain, the hash chain includes at least two binary sequences, a first binary sequence in the hash chain is a second encrypted sequence, and the second encrypted sequence is obtained by encrypting the first reference signal using the pilot key.

In this implementation, the first sent encrypted reference signal is obtained by encrypting the first reference signal using the pilot key, and the first sent encrypted reference signal occupies few bits. A solution in which the first sent encrypted reference signal includes at least two same first encrypted sequences is highly reliable, and is applicable to a scenario with a low security requirement. A solution in which the first sent encrypted reference signal includes a hash chain has high security, and is applicable to a scenario with a high security requirement.

In a possible implementation, the processing module is further configured to: generate, when the terminal device works in a first security mode, the first sent encrypted reference signal including at least two same first encrypted sequences, where the first encrypted sequence is obtained by encrypting the first reference signal using the pilot key; and the terminal device generates, when working in a second security mode, the first sent encrypted reference signal including a hash chain, where the hash chain includes at least two binary sequences, a first binary sequence in the hash chain is a second encrypted sequence, the second encrypted sequence is obtained by encrypting the first reference signal using the pilot key, and security of the first security mode is lower than security of the second security mode.

In this implementation, the terminal device generates, when working in the first security mode, the first sent encrypted reference signal that includes at least two same first encrypted sequences, where a hash operation does not need to be performed, and a calculation amount is small, to be applicable to a scenario with high security; and the terminal device generates, when working in the second security mode, the first sent encrypted reference signal that includes at least a hash chain, where a plurality of times of hash operations are performed, and security is high, to be applicable to a scenario with low security.

In a possible implementation, the first sent encrypted reference signal is obtained by encrypting the first reference signal using the pilot key, where the pilot key is obtained by performing a one-way hash operation on a shared key, and the shared key is obtained by using the private key of the terminal device and the public key on the network device side.

In this implementation, the pilot key is obtained by performing a one-way hash operation on the shared key. In this way, a key of a required length can be obtained, and a difficulty of cracking the pilot key can be further increased.

In a possible implementation, the authentication response further includes a second sent encrypted reference signal, and the second sent encrypted reference signal is obtained by using the pilot key and a second reference signal.

In this implementation, the second sent encrypted reference signal is carried in the authentication response, so that an attacker cannot implement channel estimation, thereby defending against a man-in-the-middle attack.

In a possible implementation, the transceiver module is further configured to receive first indication information, where the first indication information indicates a location of the first received encrypted reference signal that is in the authentication request and that is to be received by the terminal device.

In this implementation, the first indication information indicates the location of the first received encrypted reference signal that is in the authentication request and that is to be received by the terminal device, and the terminal device can accurately obtain, based on the first indication information, the location of the first received encrypted reference signal that is in the second information and that is to be received.

In a possible implementation, the first indication information further includes at least one of the following: a first encrypted reference signal type, a first encrypted reference signal length, a first encrypted activation indication, and a first security mode indication, where the first encrypted reference signal type is a type of the first received encrypted reference signal, the first encrypted reference signal length indicates a length of the first received encrypted reference signal, the first encrypted activation indication indicates the access network device to send an unencrypted reference signal or an encrypted parameter signal, and the first security mode indication indicates an encryption manner of the first received encrypted reference signal.

In this implementation, the first indication information may carry information that can further define the reference signal to be sent by the access network device, so that the terminal device can accurately obtain the encrypted reference signal or the unencrypted reference signal sent by the access network device.

In a possible implementation, the processing module is specifically configured to: perform channel estimation by using the first received encrypted reference signal and the first sent encrypted reference signal, to obtain a downlink channel estimation value; and use first strength characteristic information and first phase characteristic information that are extracted based on the downlink channel estimation value as the downlink channel state information.

In this implementation, the strength characteristic information and the phase characteristic information are extracted by using the downlink channel estimation value, so that downlink channel state information that accurately represents a downlink channel state can be obtained.

In a possible implementation, the processing module is further configured to encrypt (for example, symmetrically encrypt) a subscription permanent identifier SUPI by using the shared key, to obtain a subscription concealed identifier SUCI; and the transceiver module is further configured to send a registration request, where the registration request includes the SUCI and the public key of the terminal device.

In this implementation, the SUPI is encrypted by using the shared key, so that a risk that the SUPI is decrypted by an attacker can be reduced.

According to a twelfth aspect, an embodiment of this disclosure provides another communication apparatus, including: a transceiver module, configured to receive an authentication response, where the authentication response carries a second received encrypted reference signal, the second received encrypted reference signal includes a signal received by the access network device when a second sent encrypted reference signal sent by a terminal device is transmitted through a channel, the second sent encrypted reference signal is obtained by using a pilot key and a second reference signal, and the pilot key is obtained by using a private key of the terminal device and a public key on a network device side, or the pilot key is obtained by using a private key on the network device side and a public key of the terminal device; and a processing module, configured to perform channel estimation by using the second received encrypted reference signal and the second sent encrypted reference signal, to obtain uplink channel state information, where the transceiver module is further configured to send channel authentication information to a first network device, where the channel authentication information is for verifying whether a message received by the access network device from the terminal device is valid or invalid, and the channel authentication information is obtained by using the uplink channel state information.

In this embodiment of this disclosure, the access network device performs channel estimation by using the second sent encrypted reference signal and the second received encrypted reference signal, to obtain the uplink channel state information. Then, the channel authentication information is generated by using the uplink channel state information, and the channel authentication information is sent to the first network device, so that the first network device verifies whether the message received by the access network device from the terminal device is valid or invalid, and can defend against a man-in-the-middle attack.

In a possible implementation, that the second sent encrypted reference signal is obtained by using a pilot key and a second reference signal includes: The second sent encrypted reference signal is obtained by encrypting the second reference signal by using the pilot key, where the second sent encrypted reference signal includes at least two same third encrypted sequences, and the third encrypted sequence is obtained by encrypting the second reference signal by using the pilot key; or the second sent encrypted reference signal includes a hash chain, the hash chain includes at least two binary sequences, a first binary sequence in the hash chain is a fourth encrypted sequence, and the fourth encrypted sequence is obtained by encrypting the second reference signal by using the pilot key.

In this implementation, the first sent encrypted reference signal is obtained by encrypting the first reference signal using the pilot key, and the second sent encrypted reference signal occupies few bits. A solution in which the second sent encrypted reference signal includes at least two same third encrypted sequences is highly reliable, and is applicable to a scenario with a low security requirement. A solution in which the second sent encrypted reference signal includes a hash chain has high security, and is applicable to a scenario with a high security requirement.

In a possible implementation, that the second sent encrypted reference signal is obtained by using a pilot key and a second reference signal includes: The second sent encrypted reference signal is obtained by encrypting the second reference signal by using the pilot key, where the pilot key is obtained by performing a one-way hash operation on a shared key, and the shared key is obtained by using the private key on the network device side and the public key of the terminal device.

In this implementation, the pilot key is obtained by performing a one-way hash operation on the shared key. In this way, a key of a required length can be obtained, and a difficulty of cracking the pilot key can be further increased.

In a possible implementation, the processing module is further configured to demodulate the authentication response based on the uplink channel state information, to obtain downlink channel state information; and generate the channel authentication information based on the uplink channel state information and the downlink channel state information.

In this implementation, the access network device generates, based on the uplink channel state information and the downlink channel state information, the channel authentication information that represents a similarity between the downlink channel estimated by the terminal device and the uplink channel estimated by the access network device, so that the channel authentication information is for determining whether the message received by the access network device from the terminal device is valid or invalid.

In a possible implementation, the transceiver module is further configured to send an authentication request to the terminal device, where the authentication request includes a first sent encrypted reference signal, and the first sent encrypted reference signal is obtained by using the pilot key and a first reference signal.

In this implementation, the first sent encrypted reference signal is carried in the authentication request, so that an attacker cannot perform channel estimation, thereby defending against a man-in-the-middle attack.

In a possible implementation, the processing module is further configured to: generate, when the access network device works in a first security mode, the first sent encrypted reference signal including at least two same first encrypted sequences, where the first encrypted sequence is obtained by encrypting the first reference signal using the pilot key; and generate, when the access network device works in a second security mode, the first sent encrypted reference signal including a hash chain, where the hash chain includes at least two binary sequences, a first binary sequence in the hash chain is a second encrypted sequence, the second encrypted sequence is obtained by encrypting the first reference signal using the pilot key, and security of the first security mode is lower than security of the second security mode.

In this implementation, the access network device generates, when working in the first security mode, the first sent encrypted reference signal that includes at least two same first encrypted sequences, where a hash operation does not need to be performed, and a calculation amount is small, to be applicable to a scenario with high security; and the access network device generates, when working in the second security mode, the first sent encrypted reference signal that includes at least a hash chain, where a plurality of times of hash operations are performed, and security is high, to be applicable to a scenario with low security.

In a possible implementation, the transceiver module is further configured to receive second indication information, where the second indication information indicates a location of the second received encrypted reference signal that is in the authentication response and that is to be received by the access network device.

In this implementation, the second indication information indicates the location of the second received encrypted reference signal that is in the authentication response and that is to be received by the access network device, and the access network device can accurately obtain, based on the second indication information, the location of the second received encrypted reference signal that is in the first information and that is to be received.

In a possible implementation, the second indication information further includes at least one of the following: a second encrypted reference signal type, a second encrypted reference signal length, a second encrypted activation indication, and a second security mode indication, where the second encrypted reference signal type is a type of the second received encrypted reference signal, the second encrypted reference signal length indicates a length of the second received encrypted reference signal, the second encrypted activation indication indicates the access network device to send an unencrypted reference signal or an encrypted parameter signal, and the second security mode indication indicates an encryption manner of the second received encrypted reference signal.

In this implementation, the second indication information may carry information that can further define the reference signal to be sent by the access network device, so that the terminal device can accurately obtain the encrypted reference signal or the unencrypted reference signal sent by the access network device.

In a possible implementation, the processing module is specifically configured to: perform channel estimation by using the second received encrypted reference signal and the second sent encrypted reference signal, to obtain an uplink channel estimation value; and use second strength characteristic information and second phase characteristic information that are extracted based on the uplink channel estimation value as the uplink channel state information.

In this implementation, the second strength characteristic information and the second phase characteristic information are extracted by using the uplink channel estimation value, so that uplink channel state information that accurately represents an uplink channel state can be obtained.

In a possible implementation, the transceiver module is further configured to receive a registration request from the terminal device, where the registration request carries a subscription concealed identifier SUCI and the public key of the terminal device; and forward the SUCI and the public key of the terminal device to a second network device, or the processing module is further configured to generate the shared key by using the public key of the terminal device and the private key on the network device side.

In this implementation, the public key of the terminal device may be obtained, and then the shared key may be obtained or generated.

According to a thirteenth aspect, an embodiment of this disclosure provides another communication apparatus, including: a transceiver module, configured to send a first sent encrypted reference signal to a terminal device, where the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device; the transceiver module is further configured to receive first information from the terminal device, where the first information includes downlink channel state information, the downlink channel state information is obtained by performing channel estimation by using a first received encrypted reference signal and the first sent encrypted reference signal, and the first received encrypted reference signal includes a signal received by the terminal device when the first sent encrypted reference signal sent by an access network device is transmitted through a channel; and a processing module, configured to generate channel authentication information, where the channel authentication information is for verifying whether a message received by the access network device from the terminal device is valid or invalid, and the channel authentication information is obtained by using the downlink channel state information, where the transceiver module is further configured to send the channel authentication information to a first network device.

In this embodiment of this disclosure, the terminal device performs channel estimation by using the first sent encrypted reference signal and the first received encrypted reference signal, and sends downlink channel state information obtained by performing channel estimation, to prove that the terminal device is an authorized terminal device. Because the attacker cannot obtain the first sent encrypted reference signal, the attacker cannot obtain, through channel estimation, the downlink channel state information that can accurately represent the channel between the access network device and the terminal device. Therefore, the terminal device sends the downlink channel state information to the access network device, to effectively defend against a man-in-the-middle attack.

In a possible implementation, the processing module is further configured to perform channel estimation by using second received encrypted reference signal and second sent encrypted reference signal, to obtain uplink channel state information, where the second sent encrypted reference signal is obtained by using the pilot key and a second reference signal, the second received encrypted reference signal includes a signal received by the access network device when the second sent encrypted reference signal sent by the terminal device is transmitted through a channel, and the second sent encrypted reference signal is included in the first information; and generate the channel authentication information based on the uplink channel state information and the downlink channel state information.

In this implementation, the second sent encrypted reference signal is carried in the first information, so that an attacker cannot implement channel estimation, thereby defending against a man-in-the-middle attack.

According to a fourteenth aspect, an embodiment of this disclosure provides another communication apparatus, including: a transceiver module, configured to receive a first received encrypted reference signal, where the first received encrypted reference signal includes a signal received by a terminal device when a first sent encrypted reference signal sent by an access network device is transmitted through a channel, the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device; and a processing module, configured to generate first information, where the first information includes a second sent encrypted reference signal and downlink channel state information, the second sent encrypted reference signal is obtained by using the pilot key and a second reference signal, and the downlink channel state information is obtained by using the first received encrypted reference signal, where the transceiver module is further configured to send the first information to the access network device.

In this embodiment of this disclosure, the access network device sends the first sent encrypted reference signal to the terminal device, so that only the authorized terminal device can obtain the downlink channel state information through channel estimation. Then, the channel authentication information obtained by using the downlink channel state information is sent to the first network device, so that the first network device verifies whether the message received by the access network device from the terminal device is valid or invalid, and can defend against a man-in-the-middle attack.

In a possible implementation, the processing module is further configured to perform channel estimation by using the first received encrypted reference signal and the first sent encrypted reference signal, to obtain the downlink channel state information.

In this implementation, the access network device generates, based on the uplink channel state information and the downlink channel state information, the channel authentication information that represents a similarity between the downlink channel estimated by the terminal device and the uplink channel estimated by the access network device, so that the channel authentication information is for determining whether the message received by the access network device from the terminal device is valid or invalid.

According to a fifteenth aspect, an embodiment of this disclosure provides another communication apparatus, including: a transceiver module, configured to receive channel authentication information, where the channel authentication information represents a correlation between an uplink channel estimated by an access network device and a downlink channel estimated by a terminal device; and a processing module, configured to verify, based on the channel authentication information, whether a message received by the access network device from the terminal device is valid or invalid.

In this embodiment of this disclosure, whether the message received by the access network device from the terminal device is valid or invalid is verified based on the channel authentication information, to defend against a man-in-the-middle attack.

In a possible implementation, the processing module is further configured to generate the shared key by using the public key of the terminal device and the private key on the network device side; and the transceiver module is further configured to send the shared key or a pilot key, where the pilot key is obtained by performing a one-way hash operation on the shared key by the processing module, and the pilot key or the shared key is used by the access network device to generate the channel authentication information.

In this implementation, the shared key is generated, and the shared key or the pilot key is sent, so that the access network device may encrypt a reference signal by using the pilot key.

According to a sixteenth aspect, an embodiment of this disclosure provides another communication apparatus, including: a transceiver module, configured to send a public key of a terminal device to a first network device, where the transceiver module is further configured to receive a shared key or a pilot key sent by the first network device, where the shared key is obtained by using the public key of the terminal device and a private key on a network device side, and the pilot key is obtained by performing a one-way hash operation on the shared key; and a processing module, configured to generate key information that includes the shared key or the pilot key, where the transceiver module is further configured to send the key information.

In this embodiment of this disclosure, a second network device sends the key information, so that an access network device encrypts a reference signal by using pilot information.

In a possible implementation, the transceiver module is further configured to: receive channel authentication information from the access network device; and send the channel authentication information to the first network device, where the channel authentication information is for verifying whether a message received by the access network device from the terminal device is valid or invalid.

In this implementation, the second network device forwards the channel authentication information, so that the first network device verifies whether the message received by the access network device from the terminal device is valid or invalid.

In a possible implementation, the transceiver module is further configured to: receive the public key of the terminal device; and send the public key of the terminal device to the first network device.

In this manner, the second network device forwards, to the first network device, the public key from the terminal device, so that the first network device generates the pilot key.

According to a seventeenth aspect, this disclosure provides a communication apparatus. The communication apparatus includes a processor, and the processor may be configured to execute computer-executable instructions stored in a memory, so that the method shown in the first aspect or any possible implementation of the first aspect is performed, the method shown in the second aspect or any possible implementation of the second aspect is performed, the method shown in the third aspect or any possible implementation of the third aspect is performed, the method shown in the fourth aspect or any possible implementation of the fourth aspect is performed, the method shown in the fifth aspect or any possible implementation of the fifth aspect is performed, the method shown in the sixth aspect or any possible implementation of the sixth aspect is performed, the method shown in the seventh aspect or any possible implementation of the seventh aspect is performed, or the method shown in the eighth aspect or any possible implementation of the eighth aspect is performed.

In this embodiment of this disclosure, for a specific description of the processor, refer to the description of the first aspect. Details are not described herein again.

In this embodiment of this disclosure, in a process of performing the foregoing method, a process of sending information in the foregoing method may be understood as a process of outputting information based on an instruction of the processor. When the information is output, the processor outputs the information to a transceiver, so that the transceiver transmits the information. After the information is output by the processor, the information may further require other processing, and then reaches the transceiver. Similarly, when the processor receives input information, the transceiver receives the information, and inputs the information into the processor. Still further, after the transceiver receives the information, the information may require additional processing, and then is input into the processor.

An operation such as sending and/or receiving involved in the processor may be generally understood as an instruction output based on the processor if there is no special description, or if the operation does not conflict with an actual function or internal logic of the operation in a related description.

In an implementation process, the processor may be a processor specially configured to perform these methods, or may be a processor, for example, a general-purpose processor that executes computer instructions in a memory to perform these methods. For example, the processor may be further configured to execute a program stored in the memory. When the program is executed, the communication apparatus is enabled to perform the method shown in the first aspect or any possible implementation of the first aspect.

In a possible implementation, the memory is located outside the communication apparatus.

In a possible implementation, the memory is located inside the communication apparatus.

In this embodiment of this disclosure, the processor and the memory may alternatively be integrated into one component. In other words, the processor and the memory may alternatively be integrated together.

In a possible implementation, the communication apparatus further includes a transceiver. The transceiver is configured to receive a packet, send a packet, or the like.

According to an eighteenth aspect, this disclosure provides a communication apparatus, where the communication apparatus includes a processing circuit and an interface circuit, and the interface circuit is configured to obtain data or output data; and the processing circuit is configured to perform the corresponding method shown in the first aspect or any possible implementation of the first aspect, the processing circuit is configured to perform the corresponding method shown in the second aspect or any possible implementation of the second aspect, the processing circuit is configured to perform the corresponding method shown in the third aspect or any possible implementation of the third aspect, the processing circuit is configured to perform the corresponding method shown in the fourth aspect or any possible implementation of the fourth aspect, the processing circuit is configured to perform the corresponding method shown in the fifth aspect or any possible implementation of the fifth aspect, the processing circuit is configured to perform the corresponding method shown in the sixth aspect or any possible implementation of the sixth aspect, the processing circuit is configured to perform the corresponding method shown in the seventh aspect or any possible implementation of the seventh aspect, or the processing circuit is configured to perform the corresponding method shown in the eighth aspect or any possible implementation of the eighth aspect.

According to a nineteenth aspect, this disclosure provides a computer-readable storage medium. The computer-readable storage medium is configured to store a computer program. When the computer program runs on a computer, the method shown in the first aspect or any possible implementation of the first aspect is performed, the method shown in the second aspect or any possible implementation of the second aspect is performed, the method shown in the third aspect or any possible implementation of the third aspect is performed, the method shown in the fourth aspect or any possible implementation of the fourth aspect is performed, the method shown in the fifth aspect or any possible implementation of the fifth aspect is performed, the method shown in the sixth aspect or any possible implementation of the sixth aspect is performed, the method shown in the seventh aspect or any possible implementation of the seventh aspect is performed, or the method shown in the eighth aspect or any possible implementation of the eighth aspect is performed.

According to a twentieth aspect, this disclosure provides a computer program product. The computer program product includes a computer program or computer code. When the computer program or computer code runs on a computer, the method shown in the first aspect or any possible implementation of the first aspect is performed, the method shown in the second aspect or any possible implementation of the second aspect is performed, the method shown in the third aspect or any possible implementation of the third aspect is performed, the method shown in the fourth aspect or any possible implementation of the fourth aspect is performed, the method shown in the fifth aspect or any possible implementation of the fifth aspect is performed, the method shown in the sixth aspect or any possible implementation of the sixth aspect is performed, the method shown in the seventh aspect or any possible implementation of the seventh aspect is performed, or the method shown in the eighth aspect or any possible implementation of the eighth aspect is performed.

BRIEF DESCRIPTION OF DRAWINGS

To describe technical solutions in embodiments of this disclosure or in the background more clearly, the following describes accompanying drawings used for describing embodiments of this disclosure or the background.

FIG. 3 is a schematic diagram of an authentication solution;

FIG. 4 is a schematic diagram of a location spoofing attack in a same visiting network;

FIG. 5 is a schematic diagram of location spoofing attacks in different networks;

DESCRIPTION OF EMBODIMENTS

Figure 1:
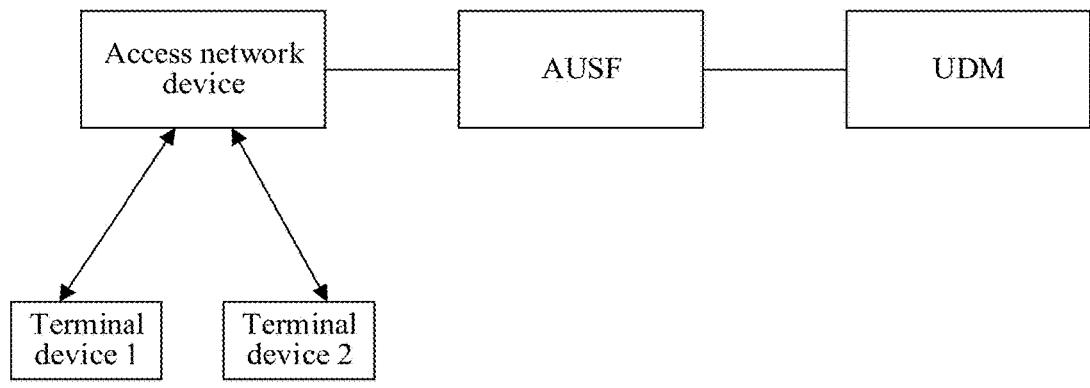
FIG. 1 is a schematic diagram of a 5G network architecture according to this disclosure.

To make the objectives, technical solutions, and advantages of this disclosure clearer, the following further describes this disclosure in detail with reference to the accompanying drawings.

The terms "first", "second", and the like in the specification, claims, and accompanying drawings of this disclosure are merely used to distinguish different objects, but are not used to describe a specific order. In addition, terms such as "including" and "having" and any other variants thereof are intended to cover a non-exclusive inclusion. For example, a process, a method, a system, a product, or a device that includes a series of steps or units is not limited to the listed steps or units, but optionally further includes steps or units that are not listed, or optionally further includes other steps or units inherent to these processes, methods, products, or devices.

"Embodiments" mentioned herein mean that specific features, structures, or characteristics described in conjunction with the embodiments may be included in at least one embodiment of this disclosure. The phrase appearing at various locations in this specification does not necessarily refer to a same embodiment, and is not an independent or alternative embodiment mutually exclusive to another embodiment. It can be understood explicitly and implicitly by those skilled in the art that the embodiments described herein may be combined with other embodiments.

In this disclosure, "at least one (item)" refers to one or more, "a plurality of" refers to two or more, "at least two (items)" refers to two or three or more, and "and/or" is used to describe an association relationship between associated objects, and indicates that three relationships may exist, for example, "A and/or B" may indicate: Only A exists, only B exists, and both A and B exist. A and B may be singular or plural. The character "/" generally indicates that the associated objects are in an "OR" relationship. "At least one of the following items" or a similar expression thereof refers to any combination of these items. For example, at least one of a, b, or c may represent: a, b, c, "a and b", "a and c", "b and c", or "a and b and c".

The following describes a network architecture in this disclosure in detail.

The technical solutions provided in this disclosure may be applied to various communication systems, for example, a long term evolution (long term evolution, LTE) system, an LTE frequency division duplex (FDD) system, an LTE time division duplex (time division duplex, TDD), a universal mobile telecommunication system (universal mobile telecommunication system, UMTS), a worldwide interoperability for microwave access (worldwide interoperability for microwave access, WiMAX) communication system, a 5th generation (5th generation, 5G) communication system or a new radio (new radio, NR), and other communication systems in the future, such as 6G. The following describes the technical solutions provided in this disclosure by using a 5G communication system as an example.

FIG. 1 is a schematic diagram of a 5G network architecture according to this disclosure. As shown in FIG. 1, the 5G network architecture includes: an access network device, an authentication server function (authentication server function, AUSF), a unified data management (unified data management, UDM) function, and one or more terminal devices (only a terminal device 1 and a terminal device 2 are shown in FIG. 1).

The UDM network element mainly manages user data, for example, manages subscription information, including obtaining subscription information from a unified data repository function (Unified Data Repository, UDR) network element and providing the subscription information to other network elements; generating a 3rd generation partnership project (3rd generation partnership project, 3GPP) authentication credential for a user equipment (user equipment, UE); and registering and maintaining a network element that currently serves the UE.

The AUSF is configured to perform security authentication on the UE when the UE accesses a network.

The terminal device may also be referred to as a user equipment. The terminal device in this disclosure may be a device with a wireless transceiver function, and may communicate with one or more core network (core network, CN) devices (or may also be referred to as a core device, for example, a gNB) via an access network device (or may also be referred to as an access device) in a radio access network (radio access network, RAN). Optionally, the terminal device may also be referred to as an access terminal, a terminal, a subscriber unit, a subscriber station, a mobile station, a remote station, a remote terminal, a mobile device, a user terminal, a wireless network device, a user agent, a user apparatus, or the like. Optionally, the terminal device may be deployed on land, including indoors or outdoors, handheld, or vehicle-mounted; may alternatively be deployed on the water surface (such as a ship); or may alternatively be deployed in the air (for example, on an aircraft, a balloon, a satellite, and the like). Optionally, the terminal device may be a handheld device with a wireless communication function, an in-vehicle device, a wearable device, a terminal in the Internet of Things or Internet of Vehicles, a terminal in any form in a 5G network or a future network, or the like. This is not limited in this disclosure.

The access network device may be a device that can communicate with the terminal device. The access network device may be any device with a wireless transceiver function. The access network device may be a base station, an access point, or a transmission reception point (transmission reception point, TRP), or may be a device that is in an access network and that communicates with the terminal device on an air interface by using one or more cells (cell), or the like. This is not limited in this disclosure. For example, the base station may be an evolved NodeB (evolved NodeB, eNB, or eNodeB) in LTE, a relay station, an access point, a next generation base station (next generation, gNB) in a 5G network, or the like. It may be understood that the base station may alternatively be a base station or the like in a future evolved public land mobile network (public land mobile network, PLMN). Optionally, the access network device may alternatively be an access node, a wireless relay node, a wireless backhaul node, or the like in a wireless local area network (wireless fidelity, Wi-Fi) system. Optionally, the access network device may alternatively be a radio controller in a cloud radio access network (cloud radio access network, CRAN) scenario.

As described in the background, the currently used authentication method cannot defend against the man-in-the-middle attacks very well. As a result, it is necessary to study a solution that can defend against the man-in-the-middle attacks better. The following first describes a man-in-the-middle attack mode and describes two specific man-in-the-middle attacks with reference to the accompanying drawings.

In a man-in-the-middle attack model, an attacker acts as a malicious relay, mainly including a rogue base station (corresponding to an access network device) and rogue user equipment (corresponding to a terminal device) and having a capability of intercepting and sending a radio signal of a specific frequency. The two specific man-in-the-middle attacks are: a transparent forwarding attack and a user location spoofing attack.

Figure 2A:
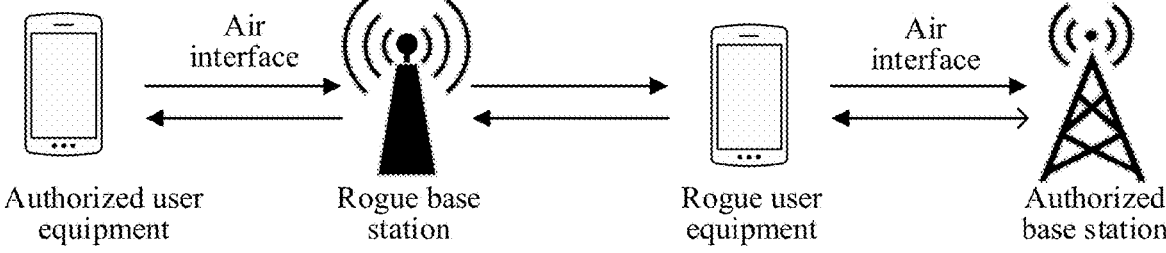
FIG. 2A is a schematic diagram of a man-in-the-middle transparent forwarding attack according to an embodiment of this disclosure.

FIG. 2A is a schematic diagram of a man-in-the-middle transparent forwarding attack according to an embodiment of this disclosure. As shown in FIG. 2A, the rogue base station and the rogue user equipment transparently forward authentication signaling between an authorized user equipment (that is, the authorized user equipment) and an authorized base station (that is, the authorized base station). The rogue base station successfully passes authentication of the authorized user equipment. After the authorized user equipment successfully accesses the rogue base station, the rogue base station can choose to discard some uplink or downlink messages to cause a DoS of the user, leak user privacy, and tamper with a DNS message to direct the user to a malicious website or the like.

Figure 2B:
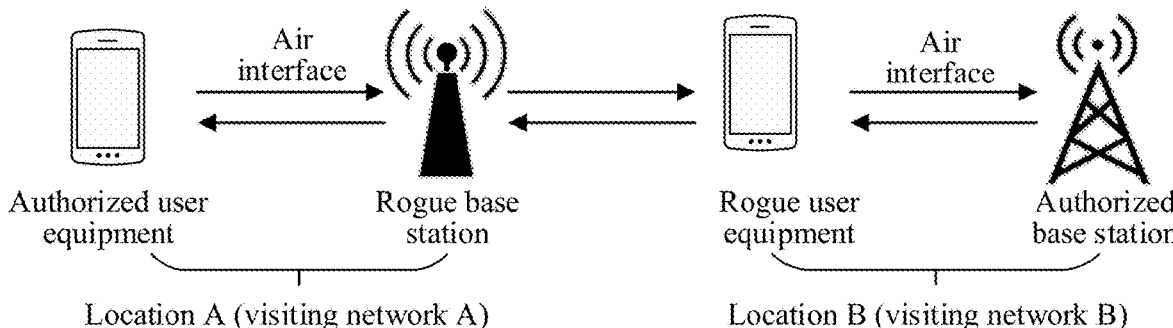
FIG. 2B is a schematic diagram of a location spoofing attack according to an embodiment of this disclosure.

FIG. 2B is a schematic diagram of a location spoofing attack according to an embodiment of this disclosure. As shown in FIG. 2B, a rogue base station and rogue user equipment are respectively in different geographical locations. The rogue base station is in a location A, and the rogue user equipment is in a location B. A visiting network covered by the geographical location A is different from that covered by the geographical location B. An authorized user equipment of the visiting network A successfully accesses a visiting network B through a man-in-the-middle, and an operator (corresponding to an authorized base station) considers that the user equipment is in the location B.

As a prerequisite of a man-in-the-middle attack, a communication link needs to be established between the rogue base station and the authorized user equipment. Correspondingly, a communication link also needs to be established between the rogue user equipment and the authorized base station. The following describes a process in which the rogue user equipment establishes an RRC connection to the authorized base station and a process in which the rogue base station establishes an RRC connection to the authorized user equipment, and describes how the rogue base station and the rogue user equipment access a communication system of the authorized user equipment and the authorized base station with reference to the accompanying drawings.

The rogue user equipment first intercepts a synchronization signal periodically broadcast by the authorized base station, to obtain system information. The system information includes parameters required for processes such as cell access, camping, and reselection of the user equipment. System information of a cell is the same for all user equipments. Therefore, the system information does not involve higher layer encryption, and is sent in plain text. Due to openness of standards, the rogue user equipment may also decode all system information of the cell. Specifically, the system information includes a master information block (master information block, MIB) and a system information block (system information block, SIB). The MIB includes a "parameter" field, indicating whether a current cell allows intervention, and the SIB includes parameters related to a random access process. The rogue user equipment initiates a random access request to the authorized base station based on the SIB, and establishes an RRC connection to the authorized base station.

The rogue base station tampers with the "parameter" field in the MIB through the system information intercepted by the rogue user equipment, to cause the tampered-with "parameter" field to indicate that a status of a current authorized cell is "disabled", and the authorized user equipment considers that the current authorized cell is rejected for access, and excludes the cell from a candidate range of cell selection and reselection. In addition, the rogue base station sets a frequency and a proper transmit power of the rogue base station based on cell selection related information included in the system information, such as a frequency priority, to induce the authorized user equipment to hand over to the rogue base station, and establish an RRC connection to the authorized user equipment.

After the rogue base station and the rogue user equipment establish stable communication links (that is, RRC connections) to the authorized user equipment and the authorized base station respectively, the rogue base station and the rogue user equipment transparently forward real authentication information between the authorized user equipment and the authorized base station to facilitate authentication. Finally, the rogue base station and the rogue user equipment successfully access the communication system.

The following describes some solutions used to defend against man-in-the-middle attacks.
Physical-Layer Authentication Solution:

When the rogue base station and the rogue user equipment use a transparent forwarding attack manner, a principle of the physical-layer authentication solution is based on a difference between different radio link channel environments. FIG. 3 is a schematic diagram of a physical-layer authentication solution. As shown in FIG. 3, a channel between an authorized user equipment and a man-in-the-middle (namely, a rogue base station), that is, a channel 1, and a channel between a man-in-the-middle (namely, rogue user equipment) and an authorized base station, that is, a channel 2 have a location decorrelation. Main steps of the physical-layer authentication solution are generalized as follows:

(1) The authorized user equipment performs channel estimation by using a reference signal disclosed at a bottom layer, and embodies a channel estimation result in authentication signaling.

(2) The authorized base station performs channel estimation by using the reference signal disclosed at the bottom layer.

(3) The authorized base station determines, based on the channel estimation result sent by the user equipment and a local channel estimation result, whether a man-in-the-middle attack exists.

In step (3), when a man-in-the-middle attack exists, the channel 1 and the channel 2 do not correlate. When no man-in-the-middle attack exists, the channel estimation results of the authorized user and the base station have a correlation. As shown in FIG. 3, an attacker performs transparent forwarding/location spoofing. Based on the physical-layer authentication solution, the authorized user equipment estimates the channel 1, to obtain characteristic information $CSI_{down1}$ of a downlink channel between the rogue base station and the authorized user. The authorized base station estimates the channel 2, to obtain characteristic information $CSI_{up2}$ of an uplink channel between the rogue user equipment and the authorized base station. In the physical-layer authentication solution, because the channel 1 and the channel 2 have the location decorrelation, that is, $CSI_{down1}$ and $CSI_{up2}$ do not correlate, a correlation between the characteristic information of the uplink channel and the characteristic information of the downlink channel is lower than a preset threshold. Therefore, it is considered that a signaling source is unauthorized, and a man-in-the-middle attack exists. However, the physical-layer authentication solution cannot defend against a channel manipulation attack, that is, a channel manipulation attack carried out by an attacker based on a transparent forwarding/location spoofing attack. As shown in FIG. 3, based on the physical-layer authentication solution, the authorized user equipment estimates the channel 1 by using the pilot disclosed at the bottom layer, to obtain the state information $CSI_{down1}$ of the downlink channel between the rogue base station and the authorized user equipment. The authorized base station estimates the channel 2 by using the pilot disclosed at the bottom layer, to obtain the state information $CSI_{up2}$ of the uplink channel between the rogue user equipment and the authorized base station. In addition, because the disclosed pilot is also known to the attacker, the rogue base station and the rogue user equipment also perform channel estimation, to obtain state information $CSI_{down2}$ of the channel 1 and state information $CSI_{up1}$ of the channel 2, where $CSI_{down1} \approx CSI_{up1}$, and $CSI_{down2} \approx CSI_{up2}$. The attacker performs channel manipulation based on a transparent forwarding/location attack, so that $\widehat{CSI}_{up2} \approx \widehat{CSI}_{down1}$ after the manipulation, that is, $\widehat{CSI}_{up2}$ and $\widehat{CSI}_{down1}$ have a correlation. Therefore, channel parameter verification succeeds.

Home Domain Enhancement Solution:

The home domain enhancement solution is mainly based on a method for determining an authentication interval of different service networks, and specific steps are as follows:

(1) An AUSF notifies a UDM of time and a result of an authentication process, where the time and the result should include an SUPI, an authentication timestamp, an authentication type, and a visiting network name.

(2) The UDM stores an authentication status of a user. The authentication status should include the SUPI, the authentication timestamp, the authentication type, and the visiting network name.

(3) The UDM replies to an authentication result of a home domain of the AUSF by using Nudm_UEAuthentication_ResultConfirmation Response signaling.

In step 3, the UDM detects location spoofing and completes protection based on a specific method used by the operator. For example, a home network records time of last successful authentication of the user and a corresponding visiting network. When authentication requests from different visiting networks reach the home domain, the home network determines whether the user has plenty of time to arrive at a new visiting network.

Based on the foregoing method, it is assumed that a user registers with a visiting network in a geographical location A, and then registers with a visiting network in a location B with the same SUPI several minutes later. If the location A and the location B are extremely far away, the home network considers that the registration fails even if the Authentication Response is correct.

The home domain enhancement solution mainly has the following disadvantages: 1. A location spoofing attack in a same visiting network cannot be detected. 2. When the authentication interval is long, location spoofing of a visiting network cannot be detected successfully. FIG. 4 is a schematic diagram of a location spoofing attack in a same visiting network. As shown in FIG. 4, an authorized user equipment, an attacker, and an authorized base station are located in a same visiting network, and the attacker launches a transparent forwarding attack. In the home domain enhancement solution, because an authentication request forwarded by the attacker and a previous authentication request are from the same visiting network, the home domain considers the authentication successful. FIG. 5 is a schematic diagram of location spoofing attacks in different networks. As shown in FIG. 5, an authorized user equipment resides on a same visiting network for a long time, and an attacker launches a transparent forwarding/location spoofing attack. In the home domain enhancement solution, because two times of authentication are from different visiting networks, a home domain compares an interval $\Delta T = T_2 - T_1$ between the two times of authentication with a preset threshold $T_{Threshold}$. When $\Delta T > T_{Threshold}$, this solution does not work.

Through research, it is found that a reason for the security problem (that is, the man-in-the-middle attack can be implemented) is that the authorized base station cannot determine a source of signaling in an authentication process. Currently, two-way authentication is usually completed by determining whether a user equipment and a base station are authorized by verifying whether a parameter satisfies a preset matching condition, but how an exchanged signaling flow arrives cannot be detected and determined. Therefore, an attacker does not need to know specific content of interaction information but only needs to transparently forward the interaction information. The authentication process can still pass. Encryption and integrity protection cannot defend against a transparent forwarding attack. This disclosure provides an authentication solution that can effectively defend against a man-in-the-middle attack. A main principle is to determine whether a source of signaling of an access network device (for example, a base station) in an authentication process is authorized, that is, whether the signaling is from an authorized user equipment. An aspect of the authentication solution provided in this disclosure is that the authentication and home domain control processes are improved, and physical-layer channel information as an authentication parameter is integrated in the authentication and home domain control processes. Performing attack detection by comparing a correlation or consistency between uplink channel state information and downlink channel state information can defend against transparent forwarding and location spoofing attacks in man-in-the-middle attacks. Another aspect of the authentication solution provided in this disclosure is that channel estimation is performed by using an encrypted reference signal, to defend against a channel manipulation attack and prevent an attacker from stealing data. Further, this disclosure further provides a solution for transmitting encrypted reference signals of different security levels based on different security modes, to ensure that security requirements of different scenarios are satisfied. The following describes an authentication method provided in this disclosure with reference to the accompanying drawings.

Figure 6:
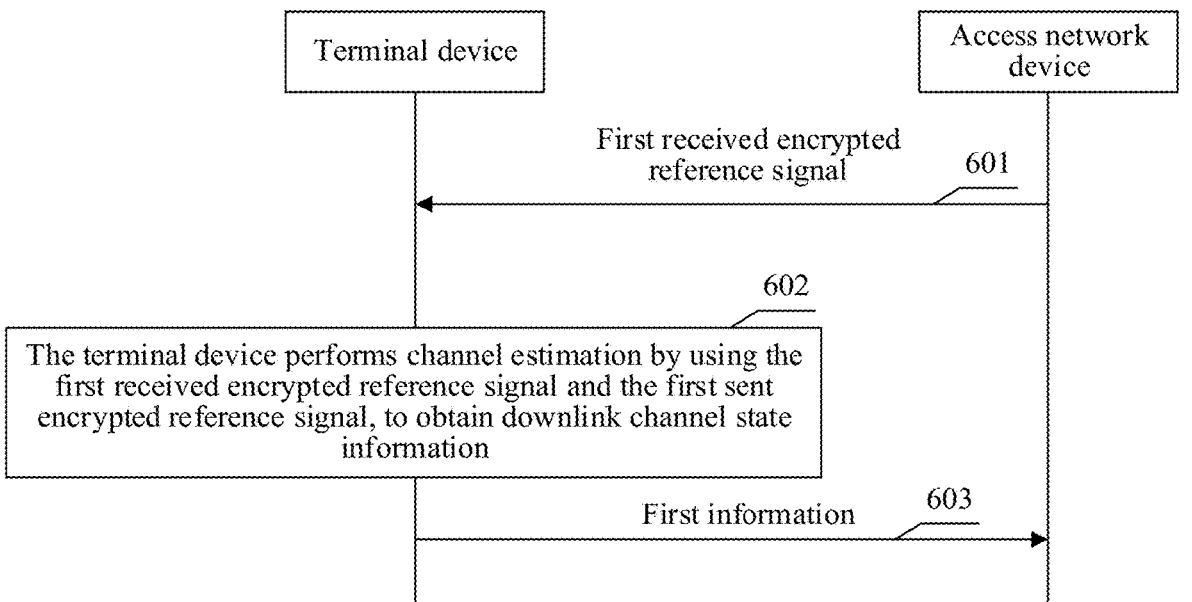
FIG. 6 is a diagram of an interaction process of an authentication method according to an embodiment of this disclosure.

FIG. 6 is a diagram of an interaction process of an authentication method according to an embodiment of this disclosure. As shown in FIG. 6, the interaction procedure of the method includes:

601: A terminal device receives a first received encrypted reference signal from an access network device.

The first received encrypted reference signal includes a signal received by the terminal device when a first sent encrypted reference signal sent by the access network device is transmitted through a channel. The first sent encrypted reference signal is obtained by using a pilot key and a first reference signal. The pilot key is obtained by using a private key of the terminal device and a public key on a network device side. Alternatively, the pilot key is obtained by using a private key on the network device side and a public key of the terminal device That a terminal device receives a first received encrypted reference signal may be: The terminal device receives an authentication request sent by the access network device, where the authentication request carries the first received encrypted reference signal. After receiving the authentication request, the terminal device may obtain the first received encrypted reference signal from the authentication request. In a possible implementation, before receiving the authentication request, the terminal device receives first indication information from the access network device, where the first indication information indicates a location of the first received encrypted reference signal that is in the authentication request and that is to be received by the terminal device. After receiving the authentication request, the terminal device obtains the first received encrypted reference signal from the authentication request based on the first indication information. The first indication information may include a first encrypted reference signal index, and the index indicates a location of the first received encrypted reference signal in the authentication request. The first indication information may further include at least one of the following: a first encrypted reference signal type, a first encrypted reference signal length, a first encrypted activation indication, and a first security mode indication. The first encrypted reference signal type is a type of the first received encrypted reference signal. The first encrypted reference signal length indicates a length of the first received encrypted reference signal. The first encryption activation indication indicates the access network device to send an unencrypted reference signal or an encrypted reference signal. The first security mode indication indicates an encryption manner of the first received encrypted reference signal. The first encrypted reference signal type may be a DM-RS, a CSI-RS, an SRS, or the like. The first encrypted reference signal length indicates a length of the first received encrypted reference signal. For example, if the length of the first encrypted reference signal is K, it indicates that the encrypted reference signal to be sent by the access network device occupies K bits, and K is an integer greater than 1. If the length of the first encrypted reference signal is F, it indicates that the encrypted reference signal to be sent by the access network device occupies F bits, and F is an integer greater than 1. The first security mode indication may indicate an encryption manner used for an encrypted reference signal to be sent by the access network device. For example, when the first security mode indication is 0, the encrypted reference signal to be sent by the access network device includes at least two same first encrypted sequences, and the first encrypted sequence is obtained by encrypting the first reference signal using the pilot key. For another example, when the first security mode indication is 1, the encrypted reference signal to be sent by the access network device includes a hash chain, and the hash chain includes at least two binary sequences. A first binary sequence in the hash chain is a second encrypted sequence, and the second encrypted sequence is obtained by encrypting the first reference signal using the pilot key. The first encryption activation indication may indicate whether the access network device sends an encrypted reference signal or an unencrypted reference signal. In some communication scenarios with a low security requirement, the first encryption activation indication indicates the access network device to send an unencrypted reference signal, for example, a DM-RS. In some communication scenarios with a high security requirement, the first encryption activation indication indicates the access network device to send an encrypted reference signal (for example, the first sent encrypted reference signal).

602: The terminal device performs channel estimation by using the first received encrypted reference signal and the first sent encrypted reference signal, to obtain downlink channel state information.

The downlink channel state information may represent a status that is of a downlink channel and that is obtained by performing channel estimation by the terminal device. The downlink channel state information includes but is not limited to a received signal strength, a channel impulse response, a channel frequency response, a received signal envelope, or the like. A possible implementation of step 602 is as follows: The terminal device performs channel estimation by using the first received encrypted reference signal and the first sent encrypted reference signal, to obtain a downlink channel estimation value; and uses first strength characteristic information and first phase characteristic information that are extracted based on the downlink channel estimation value as the downlink channel state information. The terminal device may perform channel estimation by using a least square method, a minimum mean square error method, or the like. The least square method is used as an example. It is assumed that a frequency domain response corresponding to a first sent encrypted reference signal PRS generated by an access network device (for example, a base station) is $X(k)$, and $k$ is a subcarrier sequence number. Because the terminal device encrypts the first reference signal by using the pilot key $K_s$ to obtain the PRS, $X(k)$ is known to the terminal device. Assuming that a frequency domain response of an encrypted reference signal (that is, a first received encrypted reference signal) received by the terminal device is $Y(k)$, a formula for performing channel estimation by the terminal device to obtain a downlink channel estimation value is as follows:

$$H_{down}(k) = \frac{Y(k)}{X(k)} = |H_{down}(k)|e^{j\theta_{down}(k)} \qquad (1)$$

where $H_{down}(k)$ represents the downlink channel estimation value.

The terminal device extracts the first strength characteristic information $|H_{down}(k)|$ and the first phase characteristic information $\theta_{down}(k)$ based on the downlink channel estimation value as the downlink channel state information $CSI_{down}$. An extraction formula is as follows:

$$|H_{down}(k)|=\sqrt{\text{real}(H_{down}(k))^2+\text{imag}(H_{down}(k))^2} \qquad (2)$$

$$\theta_{down}(k)=\arctan(\text{imag}(H_{down}(k))/\text{real}(H_{down}(k))) \qquad (3)$$

where $|H_{down}(k)|$ represents the first intensity characteristic information, and $\theta_{down}(k)$ represents the first phase characteristic information.

In this implementation, the strength characteristic information and the phase characteristic information are extracted by using the downlink channel estimation value, so that downlink channel state information that accurately represents a downlink channel state can be obtained.

603: The terminal device sends first information to the access network device.

the first information includes the downlink channel state information. That the terminal device sends first information to the access network device may be: The terminal device sends an authentication response to the access network device, where the authentication response includes the downlink channel state information.

In this embodiment of this disclosure, the terminal device performs channel estimation by using the first received encrypted reference signal and the first sent encrypted reference signal, to obtain the downlink channel state information, to effectively defend against man-in-the-middle attacks.

Figure 7:
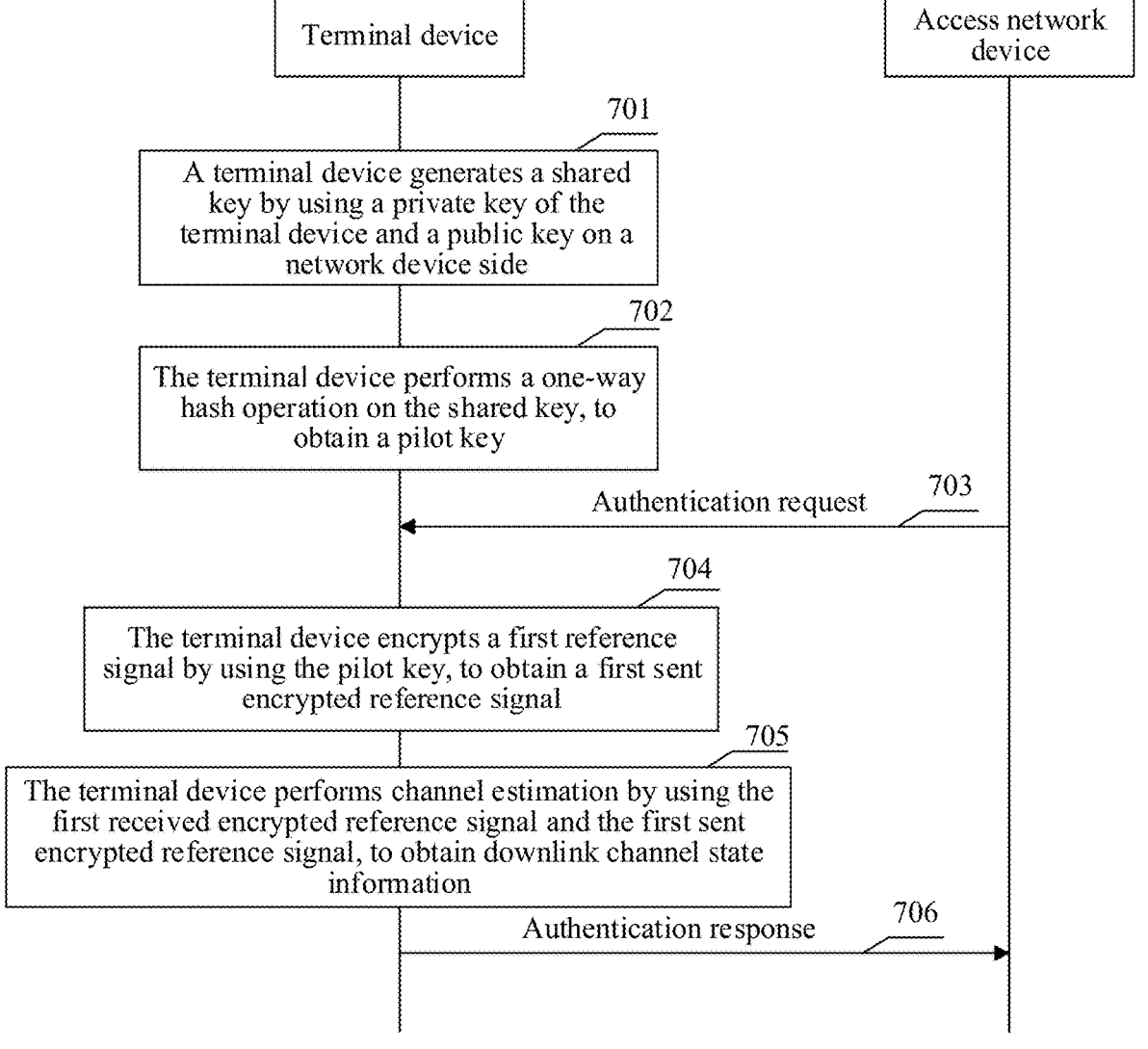
FIG. 7 is a diagram of an interaction process of another authentication method according to an embodiment of this disclosure.

FIG. 7 is a diagram of an interaction process of another authentication method according to an embodiment of this disclosure. The method interaction process in FIG. 7 is a refinement and improvement of the method interaction process in FIG. 6. As shown in FIG. 7, the interaction procedure of the method includes:

701: A terminal device generates a shared key by using a private key of the terminal device and a public key on a network device side.

The shared key $K_m$ may be derived from the public key $K_p^{HN}$ on the network device side and the private key $K_s^{UE}$ of the terminal device (that is, on the terminal device side): $K_m=\text{derive}(K_p^{HN}, K_s^{UE})$, and derive(•) is a key derivation method. The terminal device may derive the shared key by using the private key of the terminal device and the public key on the network device side. It should be understood that the terminal device may use any key derivation method to generate the shared key by using the private key of the terminal device and the public key on the network device side.

After generating the shared key, the terminal device may further perform the following operations: The terminal device symmetrically encrypts an SUPI by using the shared key, to obtain an SUPI; and the terminal device sends a registration request to an access network device, where the registration request carries the SUPI and a public key of the terminal device.

702: The terminal device performs a one-way hash operation on the shared key, to obtain a pilot key.

The terminal device may perform a one-way hash function operation on the shared key $K_m$ to obtain the pilot key $K_s$, that is, $K_s=\text{hash}(K_m)$, and hash (•) is a hash function, and may obtain a pilot key of a required length.

703: The terminal device receives an authentication request.

The authentication request carries a first received encrypted reference signal. A sequence in which the terminal device performs step 703 and step 702 is not limited. In other words, the terminal device may first perform step 702, or may first perform step 703.

704: The terminal device encrypts a first reference signal by using the pilot key, to obtain a first sent encrypted reference signal.

The first sent encrypted reference signal is obtained by encrypting the first reference signal using the pilot key. Alternatively, the first sent encrypted reference signal includes at least two same first encrypted sequences. The first encrypted sequence is obtained by encrypting the first reference signal using the pilot key. Alternatively, the first sent encrypted reference signal includes a hash chain, and the hash chain includes at least two binary sequences. A first binary sequence in the hash chain is a second encrypted sequence. The second encrypted sequence is obtained by encrypting the first reference signal using the pilot key. A process in which the terminal device encrypts the first reference signal by using the pilot key and a format of the first sent encrypted reference signal are described in detail in subsequent accompanying drawings.

705: The terminal device performs channel estimation by using the first received encrypted reference signal and the first sent encrypted reference signal, to obtain downlink channel state information.

An implementation of step 705 may be the same as an implementation of step 602. In some embodiments, the terminal device may further demodulate the authentication request by using the downlink channel state information, to obtain information carried in the authentication request.

706: The terminal device sends an authentication response to the access network device.

The authentication response may include the downlink channel state information and a second sent encrypted reference signal, and the second sent encrypted reference signal is obtained by using the pilot key and a second reference signal. The second reference signal may be a DM-RS, an SRS, or the like.

In this embodiment of this disclosure, the terminal device performs channel estimation by using the encrypted reference signal, to defend against a channel operation attack.

In some embodiments, the terminal device and the access network device may pre-agree on a used encrypted reference signal, for example, a first sent encrypted reference signal. Specifically, the terminal device considers a reference signal in any signal sent by the access network device as the first sent encrypted reference signal by default. For example, the terminal device and the access network device pre-agree that the signal sent by the access network device carries the first sent encrypted reference signal, and the terminal device performs channel estimation by using the first sent encrypted reference signal (known) and a signal received by the terminal device when the first sent encrypted reference signal is transmitted through a channel. In some other embodiments, the access network device may send indication information (for example, first indication information) before sending the encrypted reference signal (for example, the first sent encrypted reference signal). The indication information may be a semi-static configuration instruction, for example, RRC signaling or Media Access Control signaling, or may be dynamic indication signaling, for example, DCI. Similarly, the terminal device may send indication information (for example, second indication information) before sending the encrypted reference signal (for example, the second sent encrypted reference signal). The indication information may be a semi-static configuration instruction, for example, RRC signaling or Media Access Control signaling, or may be dynamic indication signaling, for example, UCI. The following uses DCI as an example to describe a manner in which the access network device indicates, by using indication information, a location of an encrypted reference signal in a to-be-sent signal (for example, an authentication request) of the access network device.

Figure 8:
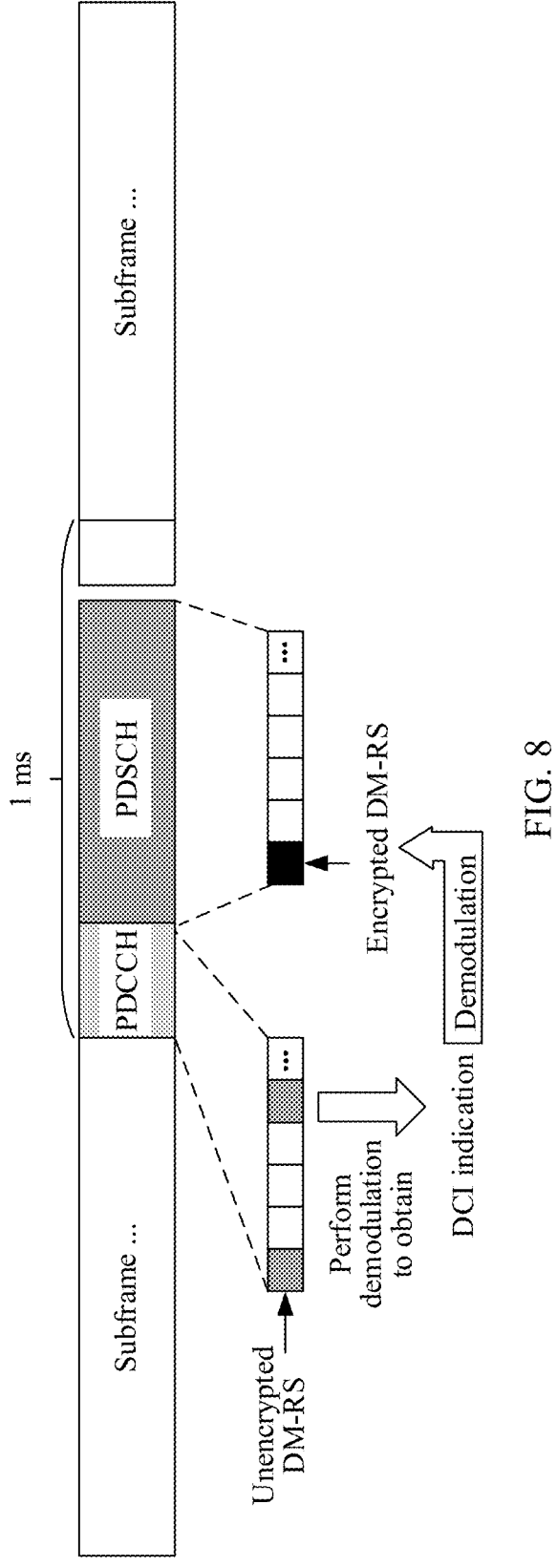
FIG. 8 is a schematic diagram of a signal flow according to an embodiment of this disclosure.

FIG. 8 is a schematic diagram of a signal flow according to an embodiment of this disclosure. FIG. 8 shows a signal flow sent by an access network device. The signal flow corresponds to a plurality of subframes, and each subframe is 1 ms. As shown in FIG. 8, in a same subframe, the access network device first sends DCI (corresponding to first indication information) through a physical downlink control channel (physical downlink control channel, PDCCH), and then sends an authentication request through a physical downlink shared channel (physical downlink shared channel, PDSCH). The DCI sent by the access network device through the PDCCH includes an unencrypted DM-RS, and the authentication request sent by the access network device through the PDSCH includes an encrypted DM-RS. A terminal device may perform channel estimation by using the unencrypted DM-RS in the DCI, and perform demodulation to obtain indication information (that is, a DCI indication in FIG. 8) in the DCI. Then, the terminal device obtains the encrypted DM-RS (corresponding to a first sent encrypted reference signal) in the authentication request based on the indication information in the DCI. Finally, the terminal device performs channel estimation and demodulates the authentication request by using the known encrypted DM-RS. Because both the access network device and the terminal device may learn of a parameter corresponding to an unencrypted demodulation reference signal, after the terminal device obtains the indication information in the DCI, the terminal device may generate an encrypted demodulation reference signal based on the indication information. When an attacker exists, even if the attacker can intercept the parameter corresponding to the unencrypted demodulation reference signal, the attacker cannot know the encrypted demodulation reference signal because the attacker does not know a pilot key. Therefore, the attacker cannot perform channel estimation, and cannot demodulate signals transmitted through the PDSCH for interception either. It should be understood that the DCI is an example of dynamic indication signaling, and the DM-RS is an example of a reference signal. In an actual downlink transmission scenario, the access network device may use any dynamic indication signaling, or may use another reference signal. It should be understood that a solution for indicating an encrypted reference signal in an uplink transmission scenario is the same as a solution for indicating an encrypted reference signal in a downlink transmission scenario. Details are not described herein again.

The foregoing embodiments do not describe a process in which the access network device generates the first sent encrypted reference signal and a process in which the terminal device generates the second sent encrypted reference signal. A process in which the access network device generates the first sent encrypted reference signal and a process in which the terminal device generates the second sent encrypted reference signal are described below with reference to the accompanying drawings.

Figure 9:
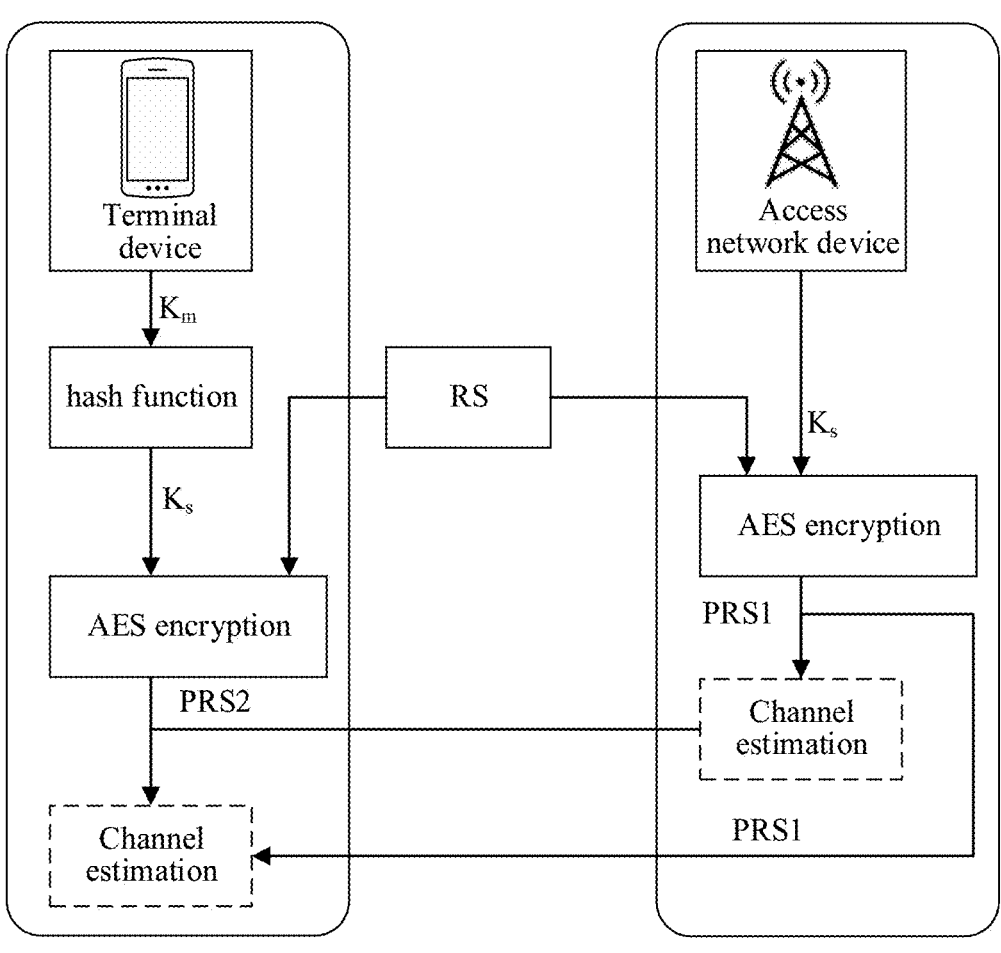
FIG. 9 is a flowchart of generating an encrypted reference signal according to an embodiment of this disclosure.

FIG. 9 is a flowchart of generating an encrypted reference signal according to an embodiment of this disclosure. A left half diagram in FIG. 9 shows a process in which a terminal device generates a second sent encrypted reference signal, and a right half diagram in FIG. 9 shows a process in which an access network device generates a first sent encrypted reference signal. In FIG. 9, $K_m$ represents a shared key, $K_s$ represents a pilot key, PRS2 represents a second sent encrypted reference signal, PRS1 represents a first sent encrypted reference signal, and the access network device and the terminal device know a reference signal used by each other. In some embodiments, reference signals used by the access network device and the terminal device are the same, and manners of encrypting the reference signals are also the same. Therefore, the PRS1 and the PRS2 are the same. In some embodiments, reference signals used by the access network device and the terminal device are different, or manners of encrypting the reference signals are different. Therefore, the PRS1 and the PRS2 are different.

As shown in FIG. 9, the process in which the terminal device generates the second sent encrypted reference signal includes:

(1) The terminal device performs a one-way hash function operation on the shared key $K_m$ to obtain the pilot key $K_s$.

$K_s$=hash($K_m$), and hash(•) is a hash function.

(2) The terminal device encrypts a second reference signal by using the pilot key $K_s$, to obtain the second sent encrypted reference signal.

The terminal device may use any encryption algorithm to encrypt the second reference signal by using the pilot key $K_s$. For example, the second sent encrypted reference signal PRS2=$E_{AES}$(RS2), $E_{AES(\ )}$ is an AES encryption algorithm, and RS2 represents the second reference signal. For example, the unencrypted second reference signal is a Gold pseudo-random sequence, that is, a sequence in a form of binary bits 0 and 1, and therefore the PRS2 encrypted by using the AES should be a new binary sequence.

As shown in FIG. 9, the process in which the access network device generates the first sent encrypted reference signal includes: The access network device encrypts a first reference signal by using the pilot key $K_s$, to obtain the first sent encrypted reference signal PRS1. In a possible implementation, the access network device first generates a shared key by using a private key on a network device side and a public key of the terminal device, and then performs a one-way hash function operation on the shared key to obtain the pilot key $K_s$. In a possible implementation, the access network device receives the pilot key delivered by a UDM. The access network device may encrypt the first reference signal by using any encryption algorithm, for example, an AES encryption algorithm in this embodiment of this disclosure, and the pilot key $K_s$, to generate a first sent encrypted reference signal PRS1=$E_{AES}$(RS1), where $E_{AES(\ )}$ is the AES encryption algorithm, and RS1 represents the first reference signal. For example, the unencrypted RS1 is a Gold pseudo-random sequence, that is, a sequence in a form of binary bits 0 and 1, and therefore the PRS1 encrypted by using the AES should be a new binary sequence.

In this disclosure, the first sent encrypted reference signal (or the second sent encrypted reference information) may be obtained by encrypting any existing reference signal. This disclosure provides two encrypted reference signals in longer formats, to be applicable to communication scenarios with different security requirements. The following describes several possible formats of the first sent encrypted reference signal (or the second sent encrypted reference information).

Format 1

Figure 10A:
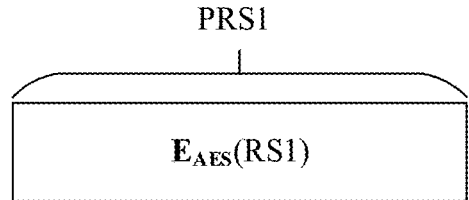
FIG. 10A to FIG. 10C are schematic diagrams of first sent encrypted reference signals according to an embodiment of this disclosure.

The first sent encrypted reference signal is obtained by encrypting the first reference signal using the pilot key. FIG. 10A is a schematic diagram of a first sent encrypted reference signal according to an embodiment of this disclosure. As shown in FIG. 10A, PRS1=$E_{AES}$(RS1), PRS1 represents a first sent encrypted reference signal, RS1 represents a first reference signal (for example, a DM-RS or a CSI-RS), and $E_{AES(\ )}$ is an AES encryption algorithm. The first reference signal may be a binary sequence (for example, a rogue random sequence), that is, a sequence in a form of binary bits 0 and 1, and the first sent encrypted reference signal is a binary sequence.

Format 2

Figure 10B:
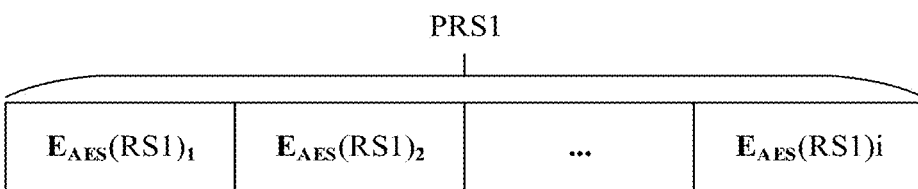

The first sent encrypted reference signal includes at least two same first encrypted sequences, and the first encrypted sequence is obtained by encrypting the first reference signal using the pilot key. The first encrypted sequence may be a binary sequence obtained by encrypting the first reference signal by using an encryption algorithm and using the pilot key as a key. For example, RS1 represents the first reference signal (a binary sequence), PRS1 represents the first encrypted sequence, and PRS1=$E_{AES}$(RS1); and $E_{AES(\ )}$ is the AES encryption algorithm. FIG. 10B is a schematic diagram of another first sent encrypted reference signal according to an embodiment of this disclosure. As shown in FIG. 10B, the PRS1 includes an $E_{AES}$(RS1)$_1$, an $E_{AES}$(RS1)$_2$, . . . , and an $E_{AES}$(RS1)$_1$, the PRS1 represents a first sent encrypted reference signal, $E_{AES}$(RS1)$_1$, $E_{AES}$(RS1)$_2$, . . . , and $E_{AES}$(RS1)$_1$ are all first encrypted sequences, and RS1 represents a first reference signal (a binary sequence). In other words, the first sent encrypted reference signal includes i first encrypted sequences, and i is an integer greater than 1.

Figures 10C, 11:
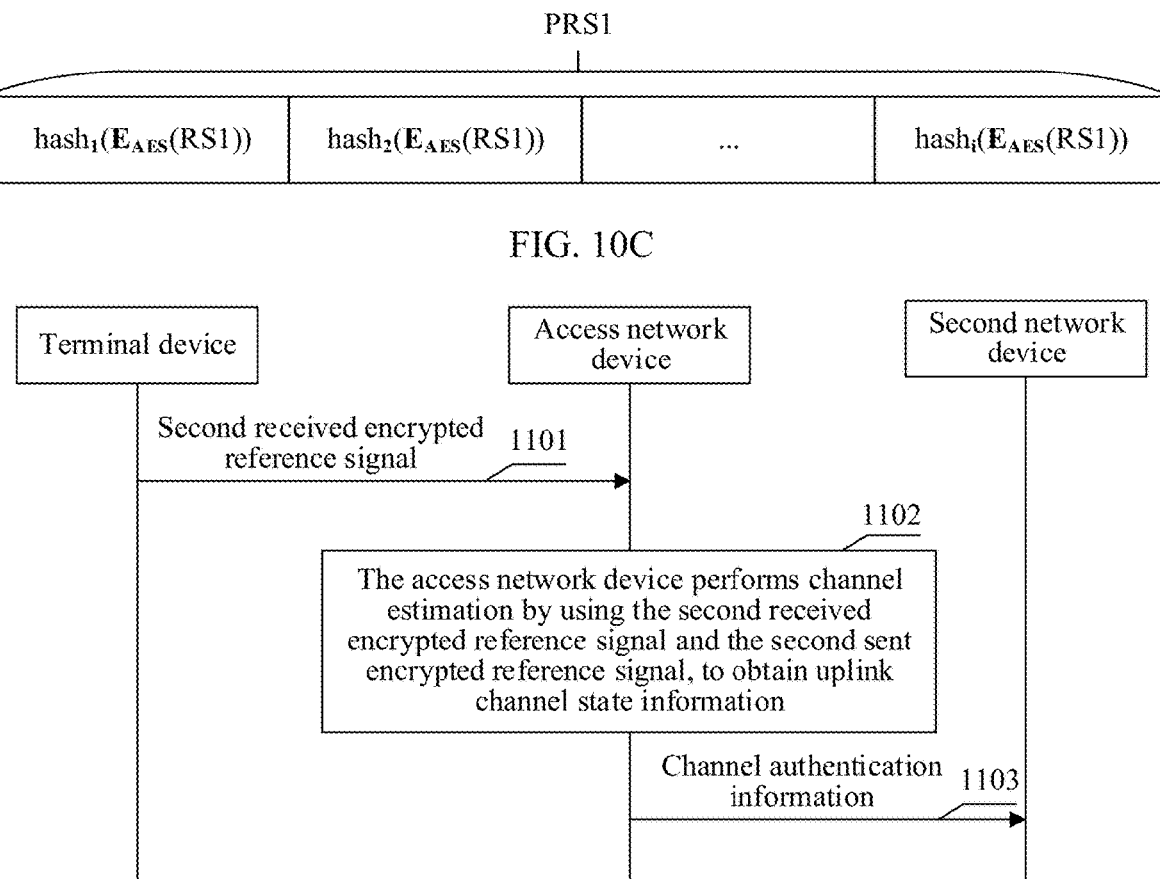
FIG. 11 is a diagram of an interaction process of another authentication method according to an embodiment of this disclosure.

Format 3 the first sent encrypted reference signal includes a hash chain, the hash chain includes at least two binary sequences, a first binary sequence in the hash chain is a second encrypted sequence, and the second encrypted sequence is obtained by encrypting the first reference signal using the pilot key. FIG. 10C is a schematic diagram of another first sent encrypted reference signal according to an embodiment of this disclosure. As shown in FIG. 10C, the PRS1 includes a hash chain: hash$_1$($E_{AES}$(RS1)), hash$_2$($E_{AES}$(RS1)), . . . , and hash$_f$($E_{AES}$(RS1)), hash$_1$($E_{AES}$(RS1)) represent a first binary sequence in the hash chain, hash$_f$($E_{AES}$(RS1)) represents a last binary sequence in the hash chain, f is an integer greater than 1, PRS1 represents a first sent encrypted reference signal, and RS1 represents a first reference signal. A non-first binary sequence in the hash chain may satisfy the following formula:

$$\text{hash}_i(E_{AES}(RS))=\text{hash}_1^{i-1}(E_{AES}(RS)) \tag{4}$$

where hash$_i$($E_{AES}$(RS)) represents an i$^{th}$ binary sequence in the hash chain, hash$_1^{i-1}$($E_{AES}$(RS)) represents a binary sequence obtained by performing (i−1) times of hash operations on a first binary sequence $E_{AES}$(RS) in the hash chain, and i is an integer greater than 1.

By comparing FIG. 10A, FIG. 10B, and FIG. 10C, a length of format 1 is less than a length of format 2 and a length of format 3. It should be understood that a terminal device may occupy fewer bits by using the first sent encrypted reference signal in format 1. Compared with the first sent encrypted reference signal in format 2, the first sent encrypted reference signal in format 3 has higher security. When detecting that a block does not satisfy the hash chain, a receive end (the terminal device or an access network device) considers that a tampering attack exists. It should be understood that a solution (namely, format 2) in which the first sent encrypted reference signal includes at least two same first encrypted sequences is applicable to a scenario with a low security requirement; and a solution (namely, format 3) in which the first sent encrypted reference signal includes a hash chain is applicable to a scenario with a high security requirement.

A format of the second sent encrypted reference signal is similar to or the same as a format of the first sent encrypted reference information. The first sent encrypted reference signal is obtained by using a pilot key and a first reference signal. The second sent encrypted reference signal is obtained by using a pilot key and a second reference signal. It should be understood that if the first reference signal is the same as the second reference signal, the first sent encrypted reference signal is the same as the second sent encrypted reference signal.

In actual application, the terminal device may work in at least two security modes with different security, for example, the first security mode and the second security mode. When the terminal device works in different security modes, sent signals carry encrypted reference signals in different formats. Correspondingly, the access network device may also work in at least two security modes with different security, for example, the first security mode and the second security mode. The terminal device may freely switch between different security modes, for example, switch from the first security mode to the second security mode or switch from the second security mode to the first security mode. The access network device may indicate, to the terminal device by using the downlink control information, a security mode in which the access network device works.

When the terminal device works in different security modes, encrypted reference signals in different formats may be generated. In a possible implementation, before the terminal device performs channel estimation by using the first received encrypted reference signal and the first sent encrypted reference signal, the method further includes: The terminal device generates, when working in a first security mode, the first sent encrypted reference signal including at least two same first encrypted sequences. The first encrypted sequence is obtained by encrypting the first reference signal using the pilot key. The terminal device generates, when working in the second security mode, the first sent encrypted reference signal that includes a hash chain. The hash chain includes at least two binary sequences, and a first binary sequence in the hash chain is a second encrypted sequence. The second encrypted sequence is obtained by encrypting the first reference signal using the pilot key. Security of the first security mode is lower than security of the second security mode.

For example, when being in the first security mode (corresponding to a low-level security mode), the terminal device generates a first sent encrypted reference signal (corresponding to a reference signal sent by the access network device) that includes at least two same first encrypted sequences, and performs channel estimation by using the first sent encrypted reference signal. When switching to the second security mode (corresponding to a highlevel security mode), the terminal device generates a first
sent encrypted reference signal (corresponding to a refer-
ence signal sent by the access network device) that includes
a hash chain, and performs channel estimation by using the
first sent encrypted reference signal (including the hash
chain).

In a possible implementation, before the terminal device
receives the first received encrypted reference signal (cor-
responding to an authentication request), the method further
includes: The terminal device receives first indication information, where the first indication information indicates a
location of the first received encrypted reference signal that
is in the second information (for example, the authentication
request) and that is to be received by the terminal device.
The first indication information may include a first
encrypted activation indication, and the first encryption
activation indication indicates the access network device to
send an unencrypted reference signal or an encrypted param-
eter signal. For example, when the first encrypted activation
indication in the first indication information is 0, the first
encrypted activation indication indicates the access network
device to send an unencrypted reference signal. For another
example, when the first encrypted activation indication in
the first indication information is 1, the first encrypted
activation indication indicates the access network device to
send an encrypted reference signal. The first indication
information may include a first security mode indication,
and the first security mode indication indicates an encryption
manner of the first received encrypted reference signal. For
example, when the first security mode indication in the first
indication information indicates an encryption manner 0, the
terminal device generates the first sent encrypted reference
signal in format 2. For another example, when the first
security mode indication in the first indication information
indicates an encryption manner 1, the terminal device generates the first sent encrypted reference signal in format 3.
The first encryption activation indication and the first secu-
rity mode indication in the first indication information may
be used together. For example, when the first encrypted
activation indication in the first indication information is 0, the first encrypted activation indication indicates the access
network device to send an unencrypted reference signal, and
the terminal device does not consider the first security mode
indication. For another example, when the first encryption
activation indication in the first indication information is 1 and the first security indication is 0, the access network
device sends the encrypted reference signal in format 2. For
another example, when the first encryption activation indi-
cation in the first indication information is 1 and the first
security indication is 1, the access network device sends the
encrypted reference signal in format 3. The first indication
information may further include a first encrypted reference
signal type and/or a first encrypted reference signal length.
The first encrypted reference signal type is a type of the first
received encrypted reference signal. The first encrypted
reference signal length indicates a length of the first received
encrypted reference signal.

When the access network device works in different secu-
rity modes, encrypted reference signals in different formats
may be generated. In a possible implementation, the access
network device generates, when working in a first security
mode, the first sent encrypted reference signal including at
least two same first encrypted sequences. The first encrypted
sequence is obtained by encrypting the first reference signal
using the pilot key. The access network device generates,
when working in the second security mode, the first sent
encrypted reference signal that includes a hash chain. The hash chain includes at least two binary sequences, and a first
binary sequence in the hash chain is a second encrypted
sequence. The second encrypted sequence is obtained by
encrypting the first reference signal using the pilot key.
Security of the first security mode is lower than security of
the second security mode. The access network device may
send first indication information to the terminal device,
where a first security mode indication in the first indication
information indication indicates an encryption manner of the
first received encrypted reference signal.

In actual application, a user or operation and maintenance
personnel can configure, based on an actual requirement, a
security mode in which the access network device works.
For example, when the access network device is applied to
a communication scenario with a high security requirement,
the access network device is configured to work in the
second operation mode. When the access network device is
applied to a communication scenario with a low security
requirement, the access network device is configured to
work in the first operation mode. It should be understood
that the terminal device and the access network device may
transmit encrypted reference signals of different security
levels, to satisfy security requirements of different commu-
nication scenarios.

The foregoing describes a method process performed by
the terminal device in an authentication process, and the
following describes a method process performed by an
access network device in an authentication process.

FIG. 11 is a diagram of an interaction process of another
authentication method according to an embodiment of this
disclosure. As shown in FIG. 11, the interaction procedure of
the method includes:

1101: An access network device receives a second
received encrypted reference signal from a terminal device.

The second received encrypted reference signal includes
a signal received by an access network device when a second
sent encrypted reference signal sent by a terminal device is
transmitted through a channel, the second sent encrypted
reference signal is obtained by using a pilot key and a second
reference signal, and the pilot key is obtained by using a
private key of the terminal device and a public key on a
network device side, or the pilot key is obtained by using a
private key on the network device side and a public key of
the terminal device.

That an access network device receives a second received
encrypted reference signal may be: The access network
device receives an authentication response sent by the
terminal device, where the authentication response carries
the second received encrypted reference signal. The authen-
tication response may further carry downlink channel state
information, and the downlink channel state information
represents a state that is of a downlink channel and that is
obtained by performing channel estimation by the terminal
device. In a possible implementation, before receiving the
second received encrypted reference signal, the access net-
work device receives second indication information, where
the second indication information indicates a location of the
second received encrypted reference signal that is in the
authentication response and that is to be received by the
access network device. After receiving the authentication
response, the access network device obtains the second
received encrypted reference signal from the authentication
response based on the second indication information. The
second indication information may include a second
encrypted reference signal index, and the index indicates a
location of the second received encrypted reference signal in
the authentication response. The second indication information further includes at least one of the following: a second encrypted reference signal type, a second encrypted reference signal length, a second encrypted activation indication, and a second security mode indication. The second encrypted reference signal type is a type of the second received encrypted reference signal. The second encrypted reference signal length indicates a length of the second received encrypted reference signal. The second encryption activation indication indicates the access network device to send an unencrypted reference signal or an encrypted parameter signal. The second security mode indication indicates an encryption manner of the second received encrypted reference signal. The second encrypted reference signal type may be a DM-RS, an SRS, or the like. The second encrypted reference signal length indicates a length of the second received encrypted reference signal. For example, if the length of the second encrypted reference signal is K, it indicates that the encrypted reference signal to be sent by the access network device occupies K bits, and K is an integer greater than 1. If the length of the second encrypted reference signal is F, it indicates that the encrypted reference signal to be sent by the access network device occupies F bits, and F is an integer greater than 1. The second security mode indication may indicate an encryption manner of an encrypted reference signal to be sent by the access network device. For example, when the second security mode indication is 0, the encrypted reference signal to be sent by the access network device includes at least two same third encrypted sequences, and the third encrypted sequence is obtained by encrypting the second reference signal by using the pilot key. For another example, when the second security mode indication is 1, the encrypted reference signal to be sent by the access network device includes a hash chain, and the hash chain includes at least two binary sequences. A first binary sequence in the hash chain is a fourth encrypted sequence, and the fourth encrypted sequence is obtained by encrypting the second reference signal by using the pilot key. The second encryption activation indication may indicate whether the terminal device sends an encrypted reference signal or an unencrypted reference signal. In some communication scenarios with a low security requirement, the second encryption activation indication indicates the terminal device to send an unencrypted reference signal. In some communication scenarios with a high security requirement, the second encryption activation indication indicates the terminal device to send an encrypted reference signal.

1102: The access network device performs channel estimation by using second received encrypted reference signal and second sent encrypted reference signal, to obtain uplink channel state information.

The uplink channel state information may represent a status that is of an uplink channel and that is obtained by performing channel estimation by the access network device. The uplink channel state information includes but is not limited to a received signal strength, a channel impulse response, a channel frequency response, a received signal envelope, or the like. A possible implementation of step 1102 is as follows: The access network device performs channel estimation by using the second received encrypted reference signal and the second sent encrypted reference signal, to obtain an uplink channel estimation value; and uses second strength characteristic information and second phase characteristic information that are extracted based on the uplink channel estimation value as the uplink channel state information. The access network device may perform channel estimation by using a least square method, a minimum mean square error method, or the like. In this implementation, the least square method is used as an example. It is assumed that a frequency domain response corresponding to a second sent encrypted reference signal PRS generated by a terminal device (for example, a mobile phone) is X'(k), and k is a subcarrier sequence number. Because the access network device encrypts the second reference signal by using the pilot key $K_s$ to obtain the PRS, X'(k) is known to the access network device. Assuming that a frequency domain response of an encrypted reference signal (that is, a second received encrypted reference signal) received by the access network device is Y'(k), a formula for performing channel estimation by the access network device to obtain an uplink channel estimation value is as follows:

$$H_{up}(k) = \frac{Y'(k)}{X'(k)} = |H_{up}(k)|e^{j\theta_{up}(k)} \tag{5}$$

where $H_{up}(k)$ represents the uplink channel estimation value.

The access network device extracts the second strength characteristic information $|H_{up}(k)|$ and the second phase characteristic information $\theta_{up}(k)$ based on the uplink channel estimation value as the uplink channel state information $CSI_{up}$. An extraction formula is as follows:

$$|H_{up}(k)|=\sqrt{\text{real}(H_{ip}(k))^2+\text{imag}(H_{ip}(k))^2} \tag{6}$$

$$\theta_{up}(k)=\arctan(\text{imag}(H_{up}(k))/\text{real}(H_{up}(k))) \tag{7}$$

where $|H_{up}(k)|$ represents the second intensity characteristic information, and $\theta_{up}(k)$ represents the second phase characteristic information.

In this implementation, the second strength characteristic information and the second phase characteristic information are extracted by using the uplink channel estimation value, so that uplink channel state information that accurately represents an uplink channel state can be obtained.

1103: The access network device sends channel authentication information to a second network device.

The channel authentication information is for verifying whether the message received by the access network device from the terminal device is valid or invalid.

That the access network device sends channel authentication information to a second network device may be: The access network device sends signaling (for example, Nausf_UEAuthentication_Authenticate Request signaling) that carries the channel authentication information to the second network device (for example, an AUSF), where the signaling may further include a response RES*.

In this embodiment of this disclosure, the access network device performs channel estimation by using the second received encrypted reference signal and the second sent encrypted reference signal, to obtain the uplink channel state information, to effectively defend against man-in-the-middle attacks.

Figure 12:
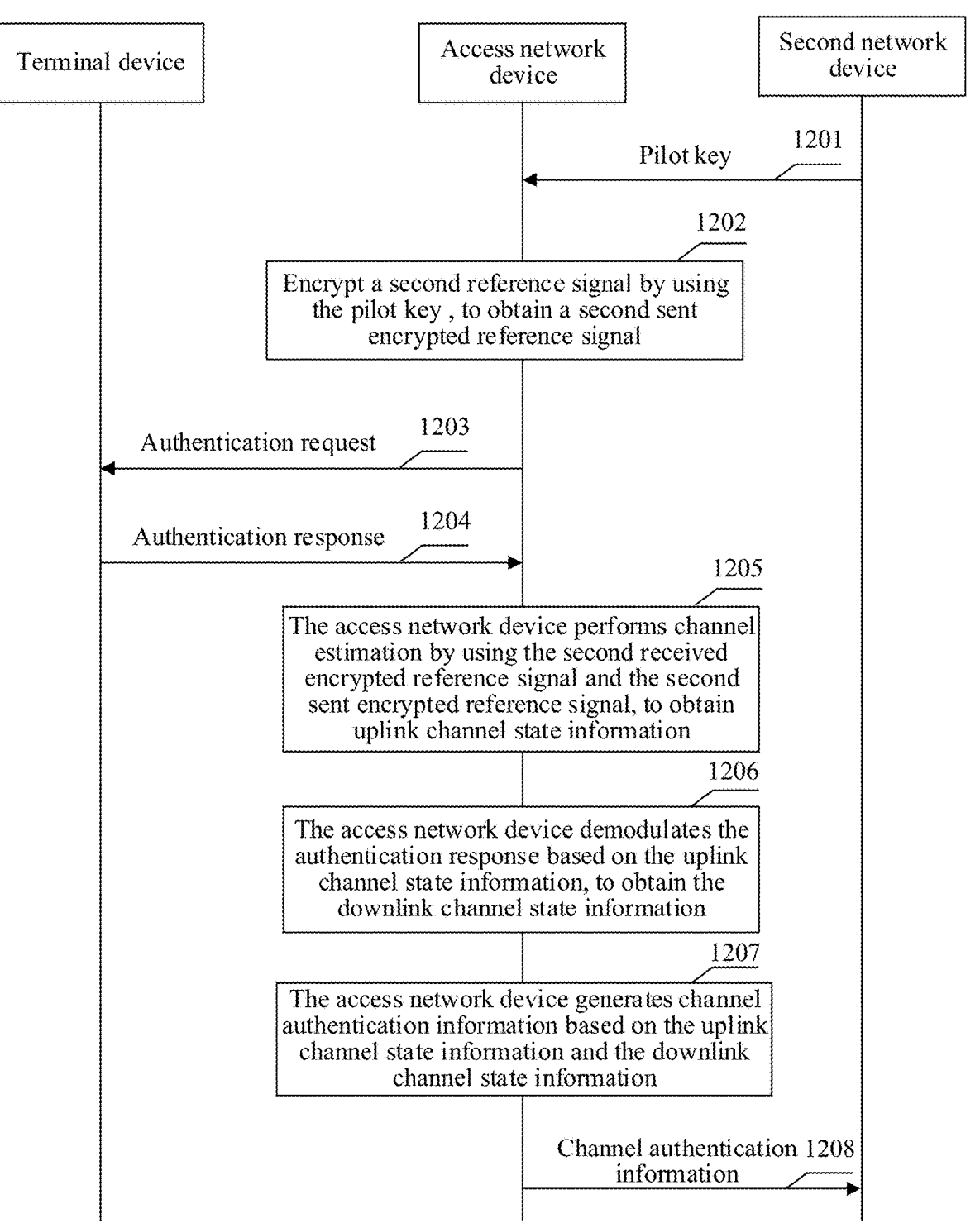
FIG. 12 is a diagram of an interaction process of another authentication method according to an embodiment of this disclosure.

FIG. 12 is a diagram of an interaction process of an authentication method according to an embodiment of this disclosure. The method interaction process in FIG. 12 is a refinement and improvement of the method interaction process in FIG. 11. As shown in FIG. 12, the interaction procedure of the method includes:

1201: An access network device receives a pilot key sent by a second network device.

That an access network device receives a pilot key may be: The access network device receives signaling (for example, Nausf_UEAuthentication_Authenticate Response signaling) sent by the second network device (for example, an AUSF), where the signaling includes the pilot key. Step 1201 may be replaced with: An access network device receives a shared key sent by a second network device; and the access network device performs a one-way hash operation on the shared key, to obtain a pilot key. In this disclosure, the AUSF is a network device that has an AUSF. Step 1201 may be replaced with: An access network device generates a shared key by using a public key of a terminal device and a private key on a network device side; and performs a one-way hash operation on the shared key, to obtain a pilot key. It should be understood that the access network device may receive a shared key or a pilot key sent by another network device, or may generate a shared key or a pilot key by itself. In a possible implementation, before performing step 1201, the access network device may perform the following operations: The access network device receives a registration request from a terminal device, where the registration request carries an SUCI and a public key of the terminal device. The access network device may forward the SUCI and the public key of the terminal device to the AUSF, to receive the pilot key or the shared key.

1202: The access network device encrypts a second reference signal by using the pilot key, to obtain a second sent encrypted reference signal.

An implementation of step 1202 may be similar to an implementation of step 704, and details are not described herein again.

1203: The access network device sends an authentication request to the terminal device.

The authentication request (corresponding to second information) may carry a first sent encrypted reference signal, the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device.

1204: The access network device receives an authentication response sent by the terminal device.

The authentication response (corresponding to first information) carries a second received encrypted reference signal. The authentication response may further carry downlink channel state information.

1205: The access network device performs channel estimation by using the second received encrypted reference signal and the second sent encrypted reference signal, to obtain uplink channel state information.

An implementation of step 1205 may be the same as an implementation of step 1102.

1206: The access network device demodulates the authentication response based on the uplink channel state information, to obtain the downlink channel state information.

1207: The access network device generates channel authentication information based on the uplink channel state information and the downlink channel state information.

That the access network device generates the channel authentication information based on the uplink channel state information and the downlink channel state information may be: using a correlation coefficient or consistency between the uplink channel state information and the downlink channel state information as the channel authentication information. The correlation coefficient represents a degree of similarity between the uplink channel state information and the downlink channel state information, and a larger correlation coefficient indicates that the uplink channel state information and the downlink channel state information are more similar. The access network device generates the channel authentication information by calculating a correlation or consistency between the uplink channel state information and the downlink channel state information; and high-complexity exponential and logarithmic operations are not involved, and there is an advantage of low computational complexity.

1208: The access network device sends the channel authentication information to the second network device.

Step 1208 may be: The access network device sends signaling that carries the channel authentication information, for example, Nausf_UEAuthentication_Authenticate Request signaling to the second network device (for example, an AUSF). The Nausf_UEAuthentication_Authenticate Request signaling may further include a response RES*. It should be understood that, when the authorized access network device performs data transmission with the authorized terminal device, an uplink channel obtained by performing channel estimation by the authorized access network device is necessarily similar to a downlink channel obtained by performing channel estimation by the authorized terminal device. For example, if the channel authentication information (for example, a correlation coefficient) is greater than a preset threshold, it indicates that the message received by the access network device from the terminal device is valid; otherwise, it indicates that the message received by the access network device from the terminal device is invalid. Therefore, the channel authentication information may be for verifying whether the message received by the access network device from the terminal device is valid or invalid. If it is verified that the message received by the access network device from the terminal device is valid, the authentication succeeds; otherwise, the authentication fails. Therefore, man-in-the-middle attacks can be defended against.

In this embodiment of this disclosure, the access network device performs channel estimation by using the second received encrypted reference signal and the second sent encrypted reference signal, to obtain the uplink channel state information, to effectively defend against man-in-the-middle attacks.

In some possible implementations, the authentication solution provided in this disclosure further relates to a first network device (corresponding to a UDM) and a second network device (corresponding to an AUSF). Method processes performed by the first network device and the second network device in an authentication process are separately described below with reference to the accompanying drawings.

Figure 13:
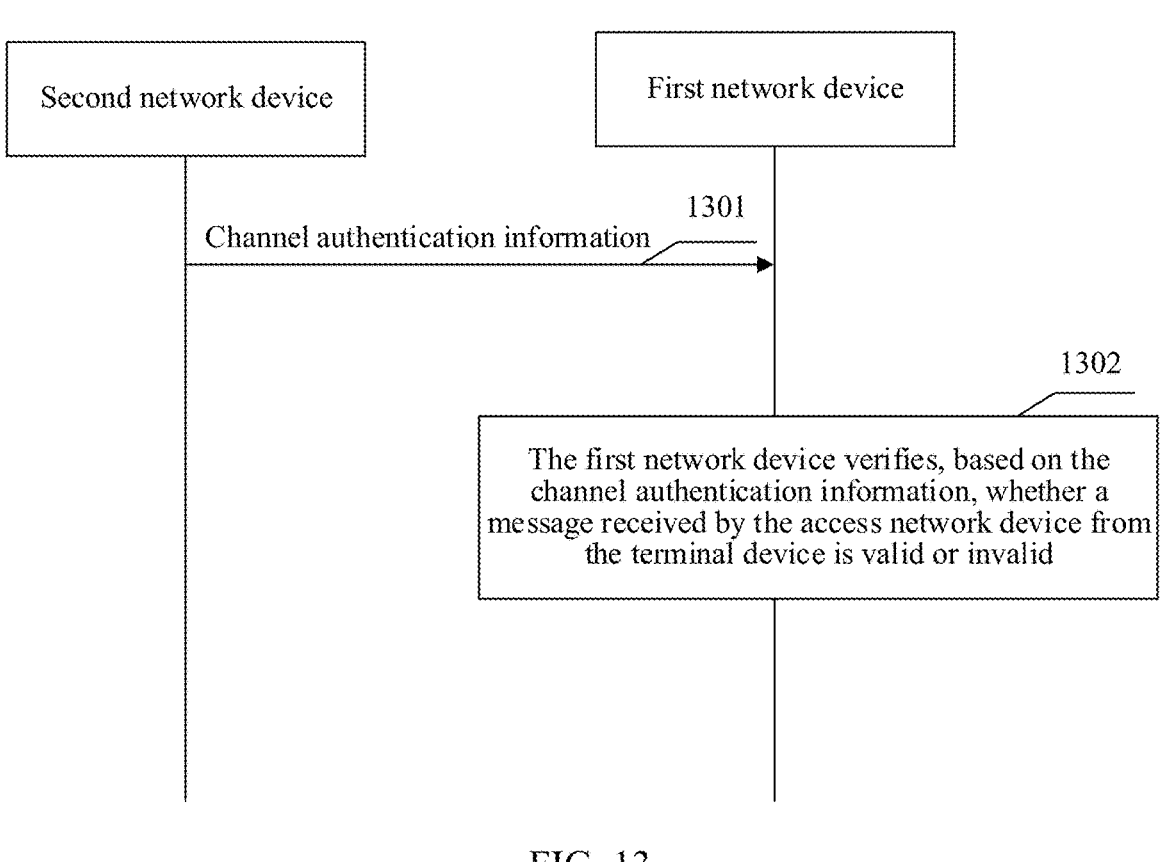
FIG. 13 is a diagram of an interaction process of another authentication method according to an embodiment of this disclosure.

FIG. 13 is a diagram of an interaction process of another authentication method according to an embodiment of this disclosure. As shown in FIG. 13, the interaction procedure of the method includes:

1301: A first network device receives channel authentication information from a second network device.

The channel authentication information represents a correlation between an uplink channel estimated by an access network device and a downlink channel estimated by a terminal device. The first network device may be an access network device, or may be a network device having a UDM. In other words, the first network device may be the foregoing access network device, or may be an independent network device.

That a first network device receives channel authentication information may be: The first network device receives Nudm_UEAuthentication_ResultConfirmation Request signaling, where the signaling carries the channel authentication information. The Nudm_UEAuthentication_ResultConfirmation Request signaling may further include an SUPI, an authentication timestamp, an authentication type, and a visiting network name.

In a possible implementation, before receiving the channel authentication information, the first network device may perform the following operations: The first network device generates a shared key by using a public key of the terminal device and a private key on a network device side; and The first network device sends the shared key or a pilot key to the second network device (for example, an AUSF), where the pilot key is obtained by performing a one-way hash operation on the shared key, and the pilot key or the shared key is used by the access network device to generate the channel authentication information. That the first network device sends the shared key or a pilot key to the second network device may be: The first network device sends Nudm_UE-Authentication_Get Response signaling to the AUSF (corresponding to the second network device), where the signaling carries the shared key or the pilot key. The first network device may store or obtain the private key on the network device side, and obtain the public key of the terminal device from Nudm_UEAuthentication_Get Request signaling from the AUSF.

1302: The first network device verifies, based on the channel authentication information, whether a message received by the access network device from the terminal device is valid or invalid.

The channel authentication information may include an authentication parameter, and an implementation of step 1302 may be: The access network device determines, when the authentication parameter is greater than an authentication threshold, that the message received by the access network device from the terminal device is valid; and the access network device determines, when the authentication parameter is not greater than the authentication threshold, that the message received by the access network device from the terminal device is invalid. The authentication parameter is a real number greater than 0 and not greater than 1. The authentication threshold is a real number greater than 0 and not greater than 1, for example, 0.6, 0.75, 0.8, or 0.9.

In this embodiment of this disclosure, whether the message received by the access network device from the terminal device is valid or invalid is verified based on the channel authentication information, to defend against a man-in-the-middle attack.

Figure 14:
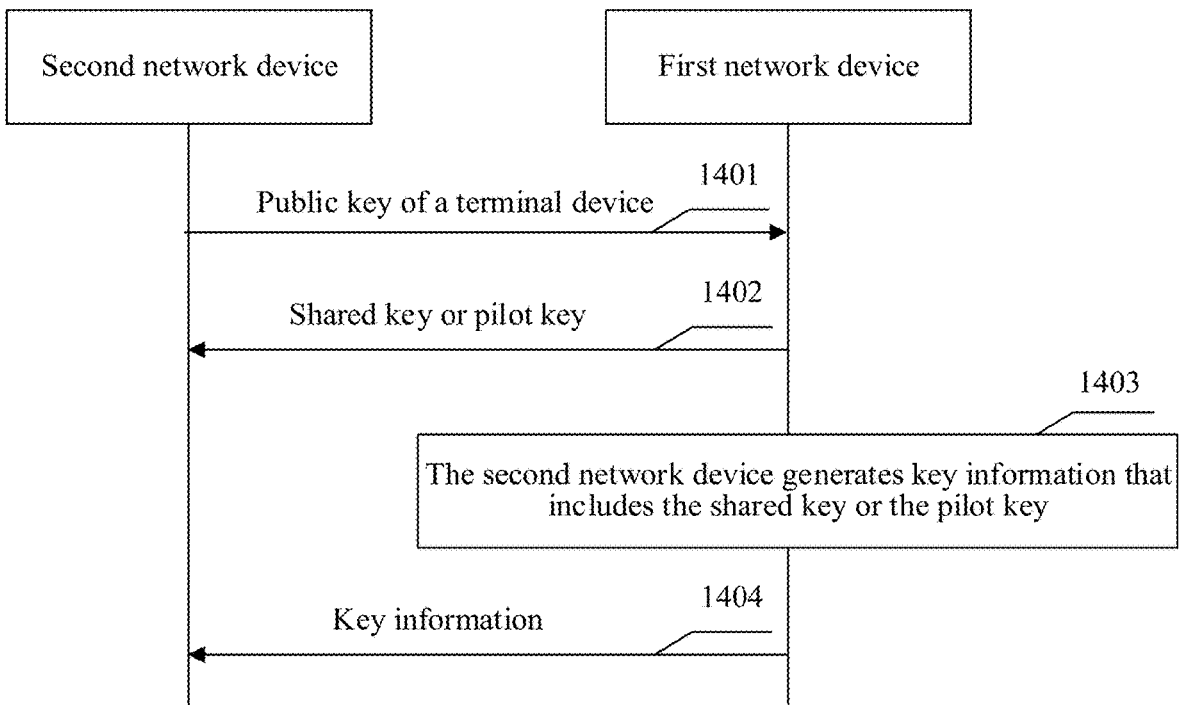
FIG. 14 is a diagram of an interaction process of another authentication method according to an embodiment of this disclosure.

FIG. 14 is a diagram of an interaction process of an authentication method according to an embodiment of this disclosure. As shown in FIG. 14, the interaction procedure of the method includes:

1401: A second network device sends a public key of a terminal device to a first network device.

The second network device may be the foregoing access network device, or may be an independent network device that has an AUSF. That a second network device sends a public key of a terminal device to a first network device may be: The second network device sends Nudm_UEAuthentication_Get Request signaling to the first network device, where the signaling includes the public key of the terminal device.

1402: The second network device receives a shared key or a pilot key sent by the first network device.

The shared key is obtained by using the public key of the terminal device and a private key on a network device side, and the pilot key is obtained by performing a one-way hash operation on the shared key. That the second network device receives a shared key or a pilot key sent by the first network device may be: The second network device receives Nudm-_UEAuthentication_Get Response signaling, where the signaling includes the shared key or the pilot key.

1403: The second network device generates key information that includes the shared key or the pilot key.

the second network device sends the key information.

1404: The second network device sends the key information to the access network device.

That the second network device sends the key information may be: The second network device sends Nausf_UEAuthentication_Authenticate Response signaling to the access network device, where the signaling includes the shared key or the pilot key. In other words, the key information is the Nausf_UEAuthentication_Authenticate Response signaling.

In a possible implementation, the method further includes: The second network device receives channel authentication information from the access network device; and the second network device sends the channel authentication information to the first network device, where the channel authentication information is for verifying whether a message received by the access network device from the terminal device is valid or invalid.

That the second network device receives channel authentication information from the access network device may be: The second network device receives Nausf_UEAuthentication_Authenticate Request signaling from the access network device, where the signaling includes the channel authentication information. That the second network device sends the channel authentication information to the first network device may be: The second network device sends Nudm_UEAuthentication_ResultConfirmation Request signaling to the first network device, where the signaling includes the channel authentication information.

In this embodiment of this disclosure, the second network device sends the key information, so that the access network device encrypts a reference signal by using pilot information.

The foregoing embodiments separately describe method processes performed by the terminal device, the access network device, the first network device, and the second network device in an authentication process. The authentication solution provided in this disclosure may be applied to an authentication part of a plurality of communication protocols. In addition, the method for generating an encrypted reference signal in an authentication process provided in this disclosure may be applied to another physical layer. The authentication method provided in this disclosure may be applied to an authentication process and a home domain control process in NR. The following describes an interaction process between a terminal device, an access network device, a first network device, and a second network device in an authentication process with reference to the accompanying drawings.

Figure 15A:
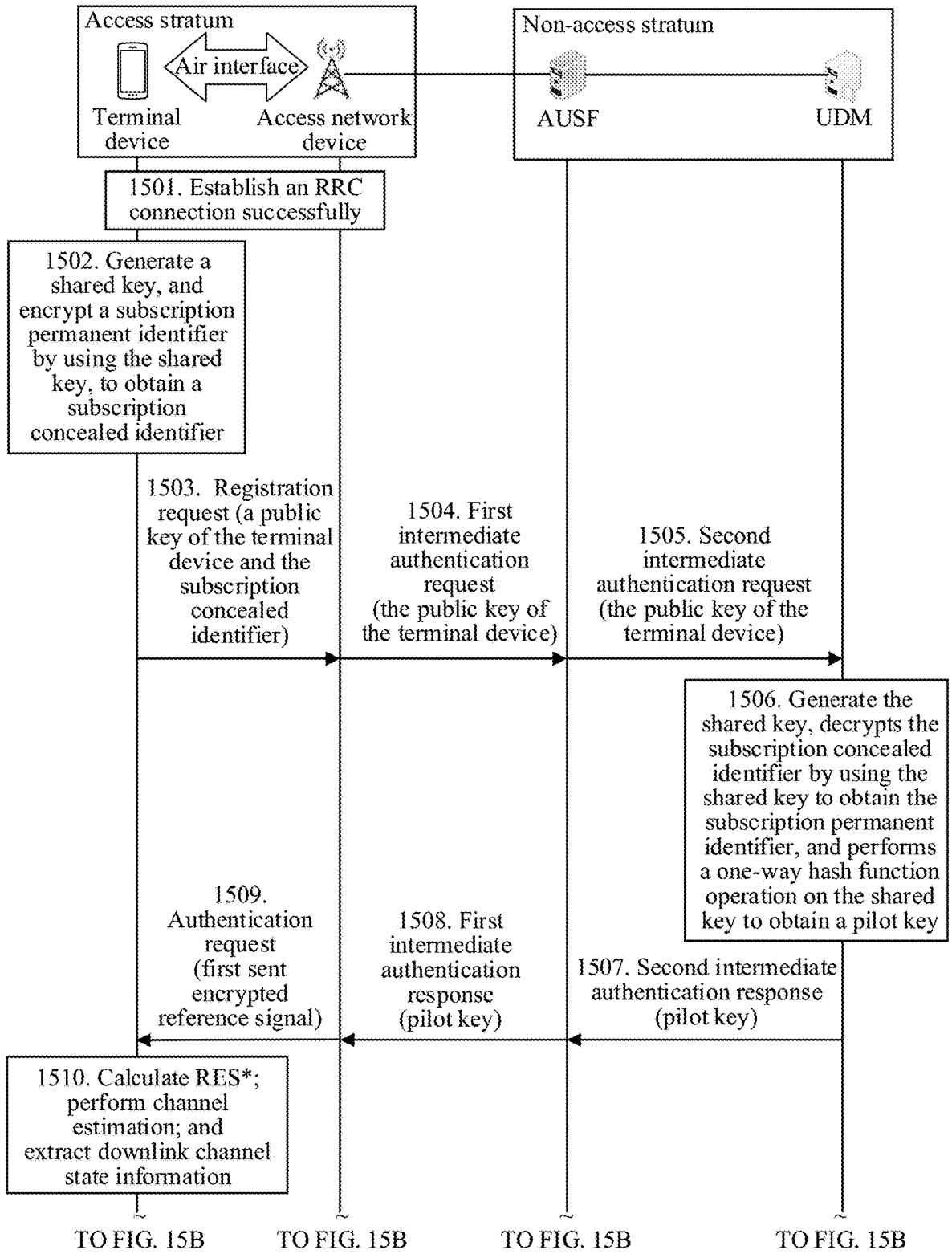
FIG. 15A and FIG. 15B are diagrams of an interaction process of another authentication method according to an embodiment of this disclosure.
Figure 15B:
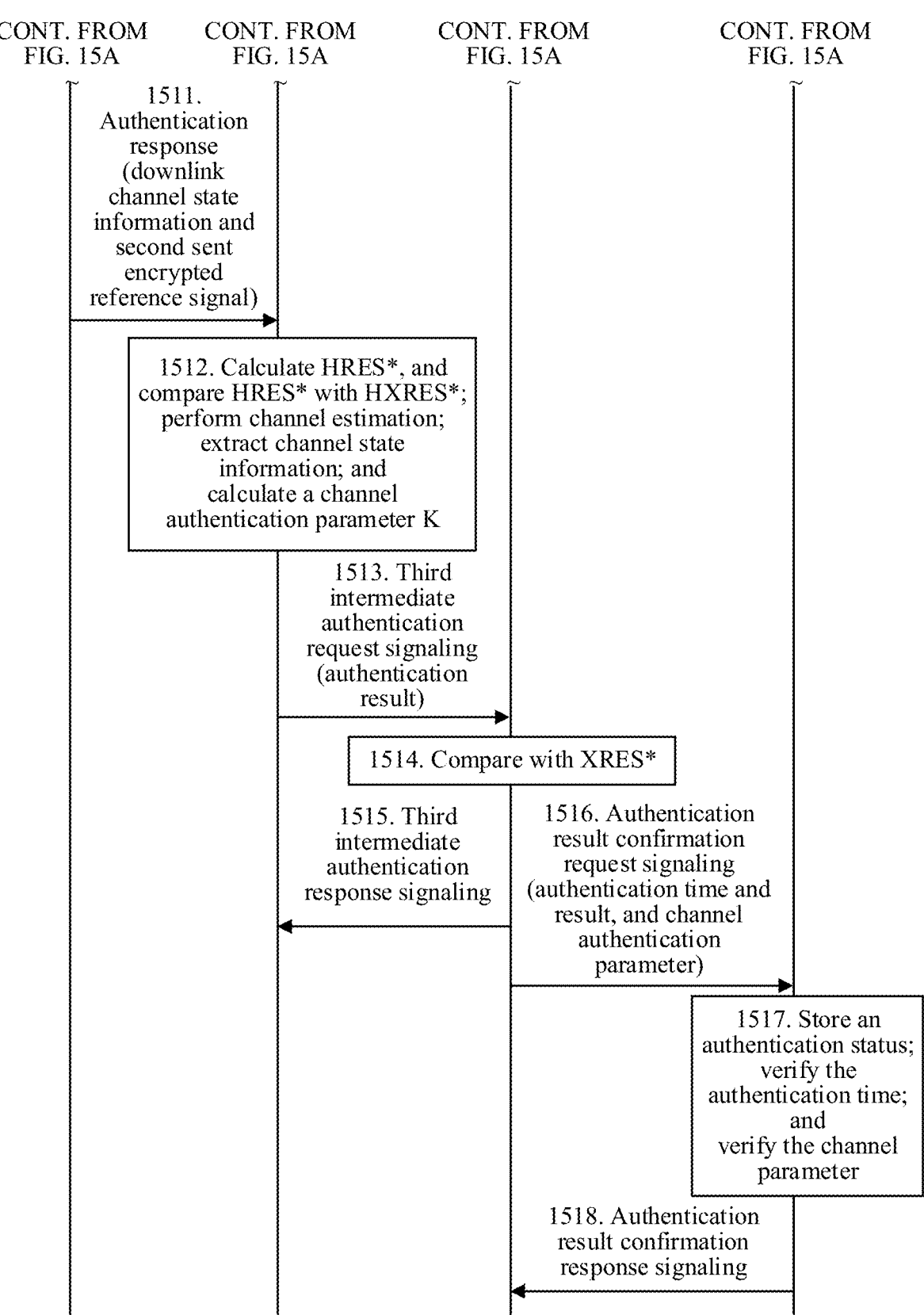

FIG. 15A and FIG. 15B are diagrams of an interaction process of an authentication method according to an embodiment of this disclosure. As shown in FIG. 15A and FIG. 15B, the method may be applied to a communication system that includes a terminal device, an access network device, a UDM, and an AUSF. The method includes:

1501: The terminal device establishes an RRC connection to the access network device.

A possible implementation of step 1501 is as follows: The terminal device establishes downlink time-frequency synchronization with a cell through cell search, obtains a physical-layer cell identifier, then achieves uplink synchronization by performing a random access process, and establishes an RRC connection to the access network device.

1502: The terminal device derives a shared key by using a public key on a network device side and a private key of the terminal device, and encrypts a subscription permanent identifier by using the shared key, to obtain a subscription concealed identifier.

1503: The terminal device sends a registration request to the access network device.

The registration request (registration request) carries the SUCI and a public key of the terminal device.

1504: The access network device stores the subscription concealed identifier, and forwards the subscription concealed identifier to the AUSF through first intermediate authentication request signaling.

The first intermediate authentication request signaling may be Nausf_UEAuthentication_Authenticate Request signaling, and the Nausf_UEAuthentication_Authenticate Request signaling includes the public key of the terminal device and the subscription concealed identifier.

1505: The AUSF sends second intermediate authentication request signaling to the UDM.

The second intermediate authentication request signaling may include the public key of the terminal device and the subscription concealed identifier. For example, the second intermediate authentication request signaling is Nudm_UE-Authentication_Get Request signaling.

1506: The UDM generates the shared key, decrypts the subscription concealed identifier by using the shared key to obtain the subscription permanent identifier, and performs a one-way hash function operation on the shared key to obtain a pilot key.

The UDM may derive the shared key $K_m = derive(K_p^{UE}, K_s^{HN})$ by using the public key $K_p^{UE}$ of the terminal device and the private key $K_s^{HN}$ on the network device side that are received, and derive($\cdot$) is a key derivation method. Then, the UDM decrypts the SUCI by using the shared key to obtain the plain-text SUPI, and performs a one-way hash function operation on the shared key $K_m$ to obtain the pilot key $K_s$, that is, $K_s = hash(K_m)$, and hash ($\cdot$) is a hash function. The one-way hash function is implemented with the MD5, SHA-1, SHA-2, or SHA-3 algorithm.

1507: The UDM sends second intermediate authentication response signaling to the AUSF.

The second intermediate authentication response signaling may be response signaling fed back by the UDM for the second intermediate authentication request signaling, and the second intermediate authentication response signaling may include the pilot key. For example, the second intermediate authentication response signaling is Nudm_UEAuthentication_Get Response signaling.

1508: The AUSF stores an expected response XRES*, calculates a hash expected response HXRES*, and sends first intermediate authentication response signaling to the access network device.

The first intermediate authentication response signaling is response signaling fed back by the AUSF for the first intermediate authentication request, and the first intermediate authentication response signaling may include the pilot key $K_s$. For example, the first intermediate authentication response signaling is Nausf_UEAuthentication_Authenticate Response signaling.

1509: The access network device generates a first sent encrypted reference signal, and sends an authentication request to the terminal device.

The authentication request may include the first sent encrypted reference information, that is, PRS1 in FIG. 15A and FIG. 15B. For example, the authentication request is Authentication Request signaling. The access network device may encrypt first reference information by using the received pilot key, to obtain the first sent encrypted reference signal.

1510: The terminal device parses the authentication request, and calculates a response RES*; and performs channel estimation by using the generated or local first sent encrypted reference signal and a received first received encrypted reference signal, and extracts downlink channel state information.

The terminal device may perform a one-way hash function operation on the shared key $K_m$ derived in step 1502 to obtain the pilot key $K_s$, and then encrypt the first reference signal by using the pilot key $K_s$, to generate the first sent encrypted reference signal. An implementation in which the terminal device performs channel estimation and extracts the downlink channel state information has been described above, and details are not described herein again.

1511: The terminal device sends an authentication response to the access network device.

The authentication response may include a second sent encrypted reference signal (PRS2 in FIG. 15A and FIG. 15B) and the downlink channel state information. For example, the authentication response is Authentication Response signaling.

1512: The access network device parses the received signal, calculates a hash response HRES*, and compares the hash response HRES* with local HXRES*; performs channel estimation by using a second received encrypted reference signal and the local second sent encrypted reference signal, and extracts uplink channel state information; and generates a channel authentication parameter K based on the downlink channel state information and the uplink channel state information.

If the comparison between HRES* and HXRES* is passed, channel estimation is performed by using the second received encrypted reference signal (that is, an encrypted reference signal received by the access network device) and the local second sent encrypted reference signal. The channel authentication parameter K corresponds to the channel authentication information. An implementation in which the access network device determines whether the comparison between HRES* and HXRES* is passed may be the same as that of step 9 (page 44) in Section 6.1.3.2.0 5G AKA in the standard document "3GPP. Security architecture and procedures for 5G systems, TS 33.501, 2020-07.".

1513: The access network device sends an authentication result to the AUSF by using third intermediate authentication request signaling.

The authentication result carried in the third intermediate authentication request signaling may include the response RES* and the channel authentication parameter K. For example, Nausf_UEAuthentication_Authenticate Request signaling.

1514: The AUSF compares the received response RES* with the local expected response XRES*. If the comparison is passed, a next step is performed.

1515: The AUSF sends third intermediate authentication response signaling to the access network device.

The third intermediate authentication response signaling is for replying to the authentication result. For example, the third intermediate authentication response signaling is Nausf_UEAuthentication_Authenticate Response signaling.

1516: The AUSF sends authentication result confirmation request signaling to the UDM.

The authentication result confirmation request signaling is for notifying time and a result of an authentication process, and includes the SUPI, an authentication timestamp, an authentication type, a visiting network name, and the channel authentication parameter K. For example, the authentication result confirmation request signaling is Nudm_UE-Authentication_ResultConfirmation Request signaling.

1517: The UDM stores an authentication status of the terminal device, verifies an authentication time, and verifies the channel authentication parameter.

An implementation of verifying the authentication time may be: The UDM determines, based on time of last successful authentication of a user equipment and a corresponding visiting network, whether the user equipment has plenty of time to arrive at a new visiting network. If it is determined that the user equipment has plenty of time to arrive at the new visiting network, the authentication time passes the verification. A method for verifying the channel authentication parameter K by the UDM may be: The channel authentication parameter K is compared with a locally preset threshold $K_{threshold}$ (that is, an authentication threshold): If the channel authentication parameter K is greater than the preset threshold $K_{threshold}$, it is considered that a signaling source is authorized, no man-in-the-middle attack exists, and the authentication succeeds. If the channel authentication parameter K is less than the preset threshold $K_{threshold}$, it is considered that a signaling source is unauthorized, a man-in-the-middle attack exists, and the authentication fails.

1518: The UDM sends authentication result confirmation response signaling to the AUSF.

The authentication result confirmation response signaling replies to an authentication result of a home domain, and the authentication result indicates whether a user location spoofing attack occurs in the authentication process. For example, the authentication result confirmation response signaling is Nudm_UEAuthentication_ResultConfirmation Response signaling.

In this embodiment of this disclosure, physical-layer channel information is used as an authentication parameter and is integrated in an authentication process and a home domain control process, to be compatible with an existing mobile communication system.

The AUSF and the UDM in FIG. 15A and FIG. 15B are functional network elements. An entity of the AUSF and an entity of the UDM may be different communication apparatuses, an entity of the AUSF and an entity of the UDM may be a same communication apparatus (different from the access network device), or the AUSF, the UDM, and the access network device may be a same communication apparatus.

In this embodiment of this disclosure, a channel estimation result (that is, a channel authentication reference) is embodied in authentication signaling, and a home network (corresponding to the UDM) determines, by using the channel authentication parameter, whether a source of the authentication signaling is authorized, to successfully defend against transparent forwarding and location spoofing attacks. In addition, a reference signal used for channel estimation is protected by using the pilot key, thereby defending against a channel manipulation attack.

Figure 16:
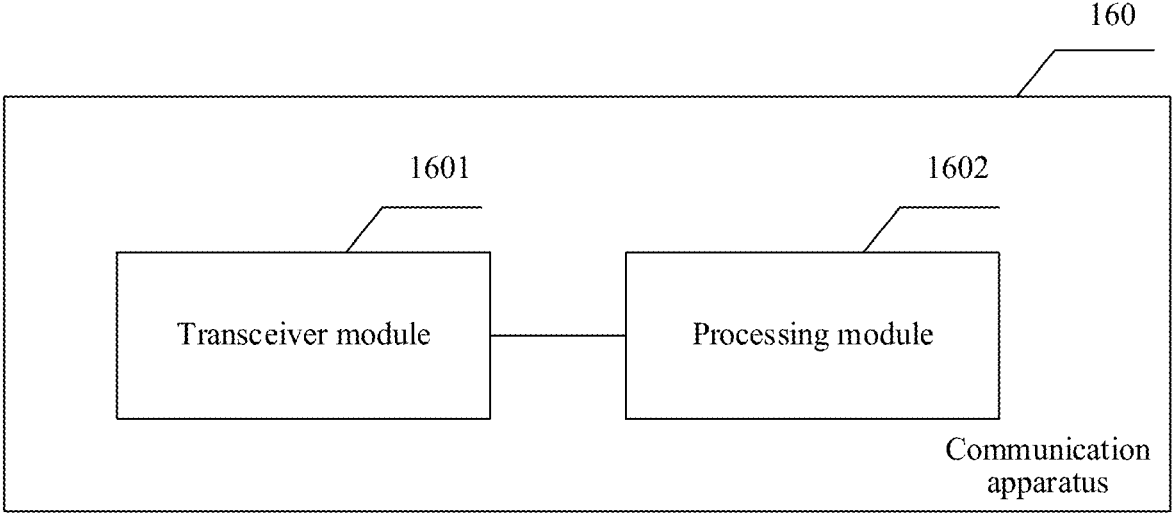
FIG. 16 is a schematic diagram of a structure of a communication apparatus according to an embodiment of this disclosure.

The following describes a schematic diagram of a structure of a communication apparatus for implementing the authentication method in the foregoing embodiments. FIG. 16 is a schematic diagram of a structure of a communication apparatus according to an embodiment of this disclosure. The communication apparatus in FIG. 16 may be the terminal device in the foregoing embodiments. As shown in FIG. 16, the communication apparatus 160 includes:

a transceiver module 1601, configured to receive a first received encrypted reference signal, where the first received encrypted reference signal includes a signal received by a terminal device when a first sent encrypted reference signal sent by an access network device is transmitted through a channel, the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device; and a processing module 1602, configured to perform channel estimation by using the first received encrypted reference signal and the first sent encrypted reference signal, to obtain downlink channel state information, where the transceiver module 1601 is further configured to send first information to the access network device, where the first information includes the downlink channel state information.

In a possible implementation, the processing module 1602 is further configured to: generate, when the terminal device works in a first security mode, the first sent encrypted reference signal including at least two same first encrypted sequences, where the first encrypted sequence is obtained by encrypting the first reference signal using the pilot key; and generate, when the terminal device works in a second security mode, the first sent encrypted reference signal including a hash chain, where the hash chain includes at least two binary sequences, a first binary sequence in the hash chain is a second encrypted sequence, the second encrypted sequence is obtained by encrypting the first reference signal using the pilot key, and security of the first security mode is lower than security of the second security mode.

In a possible implementation, the processing module 1602 is further configured to: generate a shared key by using the private key of the terminal device and the public key on the network device side; perform a one-way hash operation on the shared key, to obtain the pilot key; and encrypt the first reference signal by using the pilot key, to obtain the first sent encrypted reference signal.

In a possible implementation, the transceiver module 1601 is further configured to receive first indication information, where the first indication information indicates a location of the first received encrypted reference signal that is in second information and that is to be received by the terminal device.

In a possible implementation, the processing module 1602 is specifically configured to: perform channel estimation by using the first received encrypted reference signal and the first sent encrypted reference signal, to obtain a downlink channel estimation value; and use first strength characteristic information and first phase characteristic information that are extracted based on the downlink channel estimation value as the downlink channel state information.

In some embodiments, functions of the transceiver module 1601 and the processing module 1602 of the communication apparatus in FIG. 16 are as follows:

The transceiver module 1601 is configured to send a first sent encrypted reference signal to a terminal device, where the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device;

the transceiver module 1601 is further configured to receive first information from the terminal device, where the first information includes downlink channel state information, the downlink channel state information is obtained by performing channel estimation by using a first received encrypted reference signal and the first sent encrypted reference signal, and the first received encrypted reference signal includes a signal received by the terminal device when the first sent encrypted reference signal sent by an access network device is transmitted through a channel; and the processing module 1602 is configured to generate channel authentication information, where the channel authentication information is for verifying whether a message received by the access network device from the terminal device is valid or invalid, and the channel authentication information is obtained by using the downlink channel state information; and the transceiver module 1601 is further configured to send the channel authentication information to a first network device.

In a possible implementation, the processing module 1602 is further configured to perform channel estimation by using second received encrypted reference signal and second sent encrypted reference signal, to obtain uplink channel state information, where the second sent encrypted reference signal is obtained by using the pilot key and a second reference signal, the second received encrypted reference signal includes a signal received by the access network device when the second sent encrypted reference signal sent by the terminal device is transmitted through a channel, and the second sent encrypted reference signal is included in the first information; and generate the channel authentication information based on the uplink channel state information and the downlink channel state information.

Figure 17:
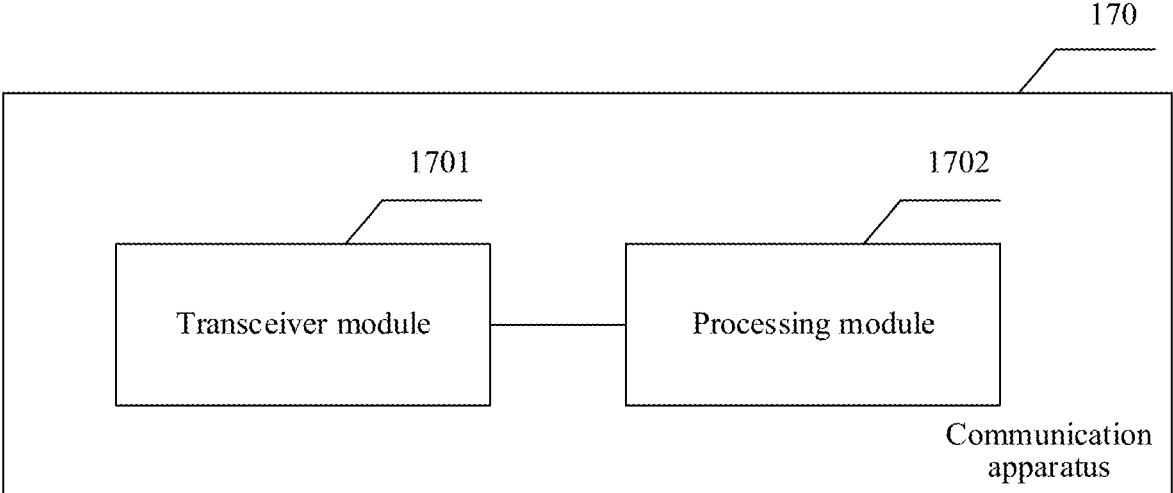
FIG. 17 is a schematic diagram of a structure of another communication apparatus according to an embodiment of this disclosure.

FIG. 17 is a schematic diagram of a structure of another communication apparatus according to an embodiment of this disclosure. The communication apparatus in FIG. 17 may be the access network device in the foregoing embodiments. As shown in FIG. 17, the communication apparatus 170 includes:

a transceiver module 1701, configured to receive a second received encrypted reference signal, where the second received encrypted reference signal includes a signal received by an access network device when a second sent encrypted reference signal sent by a terminal device is transmitted through a channel, the second sent encrypted reference signal is obtained by using a pilot key and a second reference signal, and the pilot key is obtained by using a private key of the terminal device and a public key on a network device side, or the pilot key is obtained by using a private key on the network device side and a public key of the terminal device; and the processing module 1702 is configured to perform channel estimation by using the second received encrypted reference signal and the second sent encrypted reference signal, to obtain uplink channel state information, where the uplink channel state information is for generating channel authentication information; and the transceiver module 1701 is further configured to send the channel authentication information to the first network device, where the channel authentication parameter is for verifying whether a message received by the access network device from the terminal device is valid or invalid.

In a possible implementation, the transceiver module 1701 is further configured to receive the pilot key; or the processing module 1702 is further configured to perform a one-way hash operation on the shared key received by the transceiver module to obtain the pilot key; and the processing module 1702 is further configured to encrypt the second reference signal by using the pilot key, to obtain the second sent encrypted reference signal.

In a possible implementation, the processing module 1702 is specifically configured to: derive the shared key by using the private key of the terminal device and the public key on the network device side; perform a one-way hash operation on the shared key, to obtain the pilot key; and encrypt the second reference signal by using the pilot key, to obtain the second sent encrypted reference signal.

In a possible implementation, the processing module 1702 is further configured to demodulate first information based on the uplink channel state information, to obtain downlink channel state information; and generate the channel authentication information based on the uplink channel state information and the downlink channel state information.

In a possible implementation, the transceiver module 1701 is further configured to send second information to the terminal device, where the second information includes a first sent encrypted reference signal, and the first sent encrypted reference signal is obtained by using the pilot key and a first reference signal.

In a possible implementation, the processing module 1702 is further configured to: generate, when the access network device works in a first security mode, the first sent encrypted reference signal including at least two same first encrypted sequences, where the first encrypted sequence is obtained by encrypting the first reference signal using the pilot key; and generate, when the access network device works in a second security mode, the first sent encrypted reference signal including a hash chain, where the hash chain includes at least two binary sequences, a first binary sequence in the hash chain is a second encrypted sequence, the second encrypted sequence is obtained by encrypting the first reference signal using the pilot key, and security of the first security mode is lower than security of the second security mode.

In a possible implementation, the transceiver module 1701 is further configured to receive second indication information, where the second indication information indicates a location of the second received encrypted reference signal that is in first information and that is to be received by the access network device.

In a possible implementation, the processing module 1702 is specifically configured to: perform channel estimation by using the second received encrypted reference signal and the second sent encrypted reference signal, to obtain an uplink channel estimation value; and use second strength characteristic information and second phase characteristic information that are extracted based on the uplink channel estimation value as the uplink channel state information.

In some embodiments, functions of the transceiver module 1701 and the processing module 1702 of the communication apparatus in FIG. 17 are as follows:

a transceiver module 1701, configured to receive a first received encrypted reference signal, where the first received encrypted reference signal includes a signal received by a terminal device when a first sent encrypted reference signal sent by an access network device is transmitted through a channel, the first sent encrypted reference signal is obtained by using a pilot key and a first reference signal, and the pilot key is obtained by using a private key of the terminal device and a public key on a network device side, or the pilot key is obtained by using a private key on the network device side and a public key of the terminal device; and the processing module 1702 is configured to generate first information, where the first information includes a second sent encrypted reference signal and downlink channel state information, the second sent encrypted reference signal is obtained by using the pilot key and a second reference signal, and the downlink channel state information is obtained by using the first received encrypted reference signal, where the transceiver module 1701 is further configured to send the first information to the access network device.

In a possible implementation, the processing module 1702 is further configured to perform channel estimation by using the first received encrypted reference signal and the first sent encrypted reference signal, to obtain the downlink channel state information.

Figure 18:
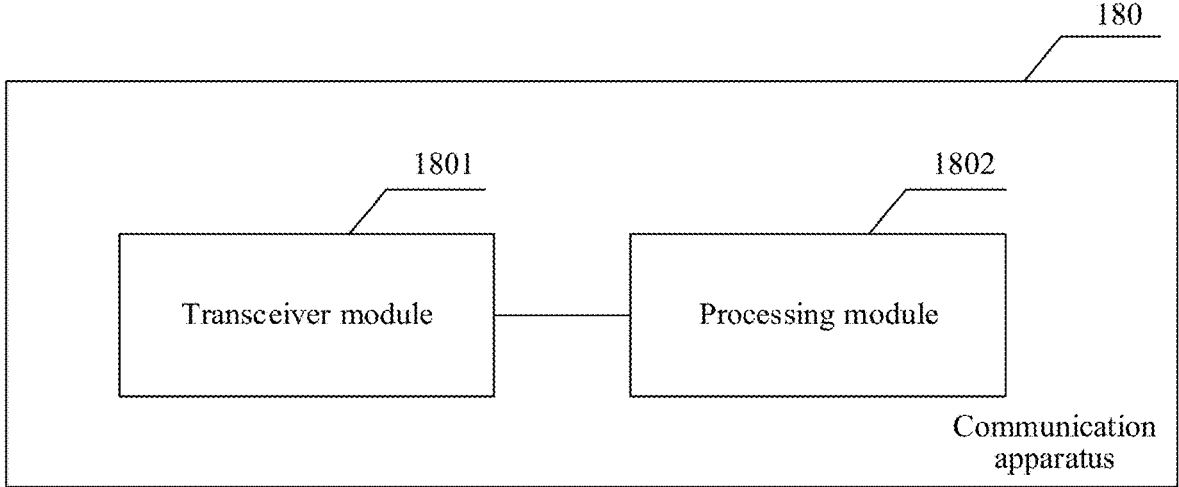
FIG. 18 is a schematic diagram of a structure of another communication apparatus according to an embodiment of this disclosure.

FIG. 18 is a schematic diagram of a structure of another communication apparatus according to an embodiment of this disclosure. The communication apparatus in FIG. 18 may be the first network device in the foregoing embodiments. As shown in FIG. 18, the communication apparatus 180 includes:

a transceiver module 1801, configured to receive channel authentication information, where the channel authentication information represents a correlation between an uplink channel estimated by an access network device and a downlink channel estimated by a terminal device; and a processing module 1802, configured to verify, based on the channel authentication information, whether a message received by the access network device from the terminal device is valid or invalid.

In a possible implementation, the processing module 1802 is further configured to generate the shared key by using the public key of the terminal device and the private key on the network device side; and the transceiver module 1801 is further configured to send the shared key or a pilot key, where the pilot key is obtained by performing a one-way hash operation on the shared key by the processing module, and the pilot key or the shared key is used by the access network device to generate the channel authentication information.

Figure 19:
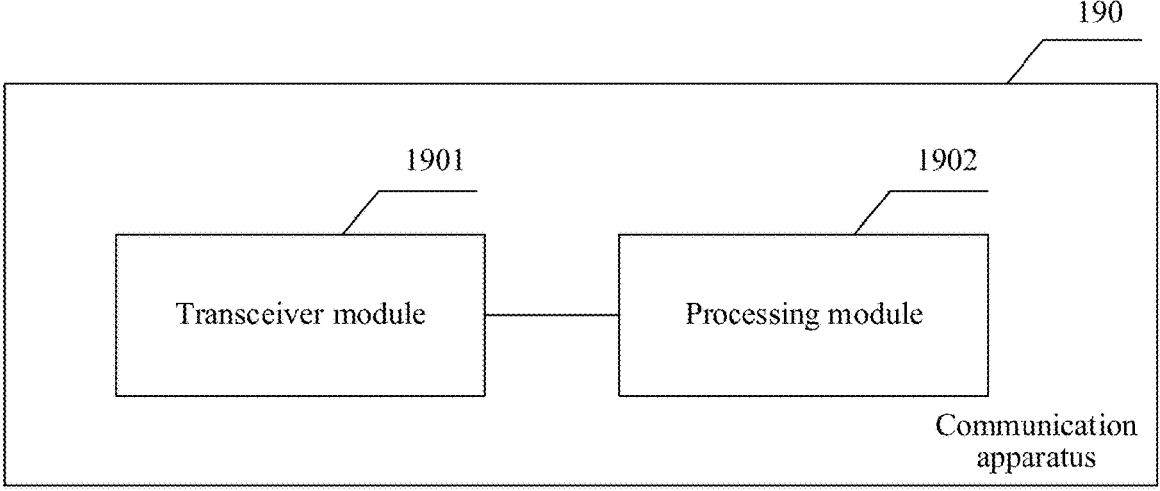
FIG. 19 is a schematic diagram of a structure of another communication apparatus according to an embodiment of this disclosure.

FIG. 19 is a schematic diagram of a structure of another communication apparatus according to an embodiment of this disclosure. The communication apparatus in FIG. 19 may be the second network device in the foregoing embodiments. As shown in FIG. 19, the communication apparatus 190 includes:

a transceiver module 1901, configured to send a public key of a terminal device to a first network device, where the transceiver module is further configured to receive a shared key or a pilot key sent by the first network device, where the shared key is obtained by using the public key of the terminal device and a private key on a network device side, and the pilot key is obtained by performing a one-way hash operation on the shared key; and a processing module 1902, configured to generate key information that includes the shared key or the pilot key, where the transceiver module is further configured to send the key information.

In a possible implementation, the transceiver module 1901 is further configured to: receive channel authentication information from the access network device; and send the channel authentication information to the first network device, where the channel authentication information is for verifying whether a message received by the access network device from the terminal device is valid or invalid.

In a possible implementation, the transceiver module 1901 is further configured to: receive the public key of the terminal device; and send the public key of the terminal device to the first network device.

Figure 20:
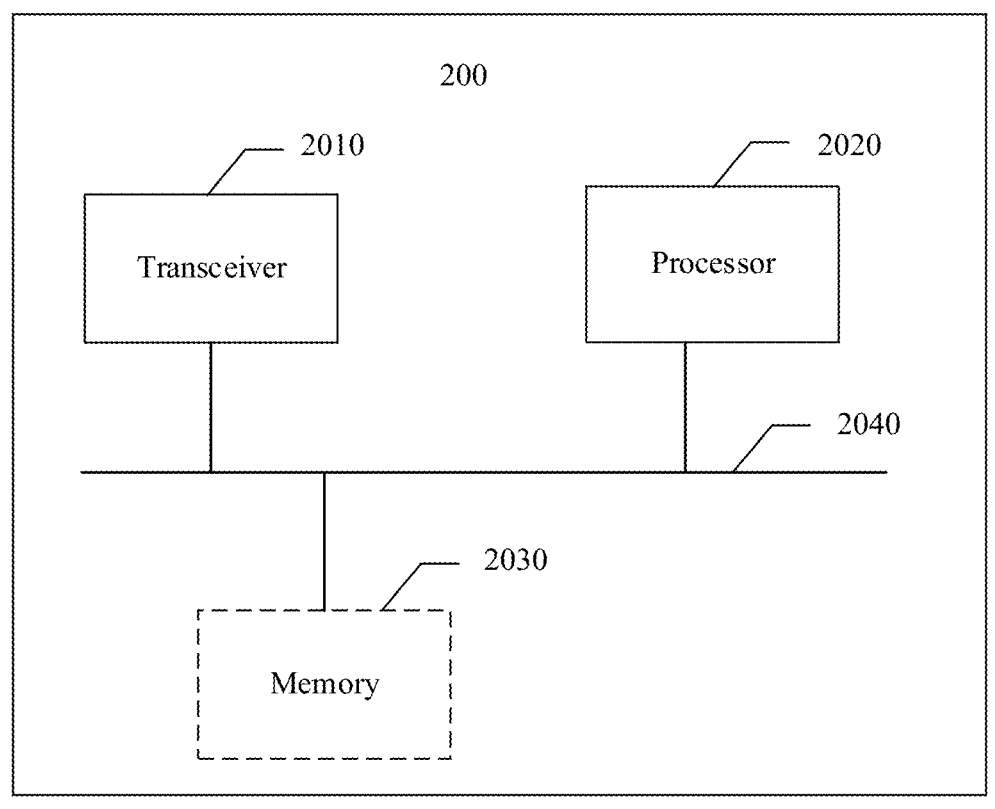
FIG. 20 is a schematic diagram of a structure of another communication apparatus according to an embodiment of this disclosure.

FIG. 20 is a schematic diagram of a structure of another communication apparatus 200 according to an embodiment of this disclosure. The communication apparatus in FIG. 20 may be the foregoing terminal device. The communication apparatus in FIG. 20 may be the foregoing access network device. The communication apparatus in FIG. 20 may be the foregoing first network device. The communication apparatus in FIG. 20 may be the foregoing second network device.

As shown in FIG. 20, the communication apparatus 200 includes at least one processor 2020 and a transceiver 2010.

In some embodiments of this disclosure, the processor 2020 and the transceiver 2010 may be configured to perform a function, an operation, or the like performed by the terminal device.

In some other embodiments of this disclosure, the processor 2020 and the transceiver 2010 may be configured to perform a function, an operation, or the like performed by the access network device.

In some other embodiments of this disclosure, the processor 2020 and the transceiver 2010 may be configured to perform a function, an operation, or the like performed by the first network device.

In some other embodiments of this disclosure, the processor 2020 and the transceiver 2010 may be configured to perform a function, an operation, or the like performed by the second network device. The transceiver 2010 is configured to communicate with another device/apparatus through a transmission medium. The processor 2020 sends and receives data and/or signaling by using the transceiver 2010, and is configured to implement the method in the foregoing method embodiments. The processor 2020 may implement a function of the processing module 1602, and the transceiver 2010 may implement a function of the transceiver module 1601. Alternatively, the processor 2020 may implement a function of the processing module 1702, and the transceiver 2010 may implement a function of the transceiver module 1701. Alternatively, the processor 2020 may implement a function of the processing module 1802, and the transceiver 2010 may implement a function of the transceiver module 1801. Alternatively, the processor 2020 may implement a function of the processing module 1902, and the transceiver 2010 may implement a function of the transceiver module 1901.

Optionally, the communication apparatus 200 may further include at least one memory 2030, configured to store program instructions and/or data. The memory 2030 is coupled to the processor 2020. The coupling in this embodiment of this disclosure may be indirect coupling or a communication connection between apparatuses, units, or modules in an electrical form, a mechanical form, or another form, and is used for information exchange between the apparatuses, the units, or the modules. The processor 2020 may work with the memory 2030. The processor 2020 may execute the program instructions stored in the memory 2030. At least one of the at least one memory may be included in a processor.

A specific connection medium between the transceiver 2010, the processor 2020, and the memory 2030 is not limited in this embodiment of this disclosure. In this embodiment of this disclosure, the memory 2030, the processor 2020, and the transceiver 2010 are connected by using a bus 2040 in FIG. 20. The bus is represented by using a thick line in FIG. 20. A manner of connecting other components is merely an example for description, and is not limited thereto. The bus may be classified into an address bus, a data bus, a control bus, and the like. For ease of representation, only one thick line represents the bus in FIG. 20, but this does not mean that there is only one bus or only one type of bus.

In this embodiment of this disclosure, the processor may be a general-purpose processor, a digital signal processor, an application-specific integrated circuit, a field programmable gate array or another programmable logic device, a discrete gate or transistor logic device, or a discrete hardware component. The processor can implement or execute the methods, steps, and logical block diagrams disclosed in embodiments of this disclosure. The general-purpose processor may be a microprocessor, any conventional processor, or the like. The steps of the methods disclosed with reference to embodiments of this disclosure may be directly performed and completed by a hardware processor, or may be performed and completed by using a combination of hardware and software modules in the processor.

Figure 21:
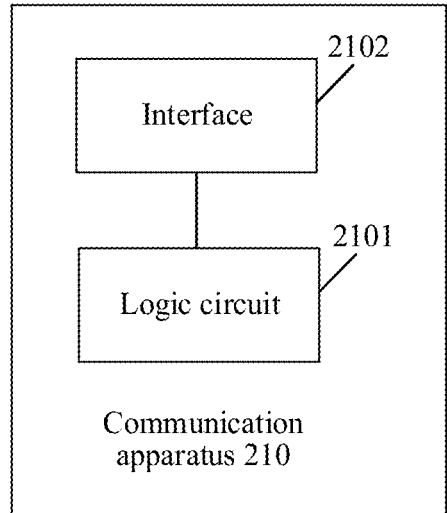
FIG. 21 is a schematic diagram of a structure of a network device according to an embodiment of this disclosure.

FIG. 21 is a schematic diagram of a structure of another communication apparatus 210 according to an embodiment of this disclosure. As shown in FIG. 21, the communication apparatus shown in FIG. 21 includes a logic circuit 2101 and an interface 2102. The processing module in FIG. 16 to FIG. 19 may be implemented by using the logic circuit 2101, and the transceiver module in FIG. 16 to FIG. 19 may be implemented by using the interface 2102. The logic circuit 2101 may be a chip, a processing circuit, an integrated circuit, a system-on-chip (system on chip, SoC), or the like, and the interface 2102 may be a communication interface, an input/output interface, or the like. In this embodiment of this disclosure, the logic circuit may be further coupled to the interface. A specific connection manner of the logic circuit and the interface is not limited in this embodiment of this disclosure.

In some embodiments of this disclosure, the logic circuit and the interface may be configured to perform a function, an operation, or the like performed by the terminal device.

In some other embodiments of this disclosure, the logic circuit and the interface may be configured to perform a function, an operation, or the like performed by the access network device.

In some embodiments of this disclosure, the logic circuit and the interface may be configured to perform a function, an operation, or the like performed by the first network device.

In some embodiments of this disclosure, the logic circuit and the interface may be configured to perform a function, an operation, or the like performed by the second network device.

This disclosure further provides a computer-readable storage medium. The computer-readable storage medium stores computer code. When the computer code runs on a computer, the computer is enabled to perform the method in the foregoing embodiments.

This disclosure further provides a computer program product. The computer program product includes computer code or a computer program. When the computer code or the computer program runs on a computer, the authentication method in the foregoing embodiments is performed.

This disclosure further provides a communication system, including the foregoing terminal device and the foregoing access network device. The communication system may further include the foregoing first network device and the foregoing second network device.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An authentication method, comprising:
   receiving, by a terminal device, a first received encrypted reference signal corresponding to a first sent encrypted reference signal that is generated by an access network device using a pilot key and a first reference signal and is transmitted through a channel;
   performing, by the terminal device, channel estimation by using the first received encrypted reference signal and the first sent encrypted reference signal, to obtain downlink channel state information; and
   sending, by the terminal device to the access network device, first information including the downlink channel state information.

2. The method of claim 1, wherein the first sent encrypted reference signal comprises at least two same first encrypted sequences each obtained by encrypting the first reference signal using the pilot key.

3. The method of claim 1, wherein the first sent encrypted reference signal comprises a hash chain having at least two binary sequences, the at least two binary sequences including an encrypted sequence obtained by encrypting the first reference signal using the pilot key.

4. The method of claim 1, wherein the pilot key is obtained by performing a one-way hash operation on a shared key, wherein the shared key is obtained by using a private key of the terminal device and a public key on a network device side, or the shared key is obtained by using a private key on the network device side and a public key of the terminal device.

5. The method of claim 1, wherein the first information further comprises a second sent encrypted reference signal obtained by using the pilot key and a second reference signal.

6. The method of claim 1, before the performing the channel estimation, the method further comprising:
   generating, by the terminal device, the first sent encrypted reference signal using the pilot key and the first reference signal.

7. An apparatus, comprising:
   a processor, and
   a non-transitory memory storing program instructions that, when executed by the processor, cause the apparatus to perform the operations:
   receiving, from a terminal device, a second received encrypted reference signal corresponding to a second sent encrypted reference signal that is generated by the terminal device using a pilot key and a second reference signal and transmitted through a channel;
   performing channel estimation by using the second received encrypted reference signal and the second sent encrypted reference signal, to obtain uplink channel state information;

generating channel authentication information by using the uplink channel state information, the channel authentication information for verifying whether a message received by the access network device from the terminal device is valid or invalid; and sending the channel authentication information to a first network device.

8. The apparatus of claim 7, wherein the second sent encrypted reference signal comprises at least two same third encrypted sequences each obtained by encrypting the second reference signal by using the pilot key.

9. The apparatus of claim 7, wherein the second sent encrypted reference signal comprises a hash chain having at least two binary sequences including an encrypted sequence obtained by encrypting the second reference signal using the pilot key.

10. The apparatus of claim 7, wherein the pilot key is obtained by performing a one-way hash operation on a shared key, wherein the shared key is obtained by using a private key on a network device side and a public key of the terminal device, or the shared key is obtained by using a public key on the network device side and a private key of the terminal device.

11. The apparatus of claim 7, wherein before the sending the channel authentication information, the program instructions further cause the apparatus to perform the operations:

demodulating, based on the uplink channel state information, first information from the terminal device, to obtain downlink channel state information; and generating channel authentication information based on the uplink channel state information and the downlink channel state information.

12. The apparatus of claim 7, wherein the program instructions further cause the apparatus to perform the operations:

sending, to the terminal device, a first sent encrypted reference signal obtained by using the pilot key and a first reference signal;

receiving, from the terminal device, downlink channel state information that is generated by the terminal device in response to the first sent encrypted reference signal; and generating a channel authentication parameter in accordance with the downlink channel state information and the uplink channel state information, the channel authentication parameter corresponding to the channel authentication information.

13. The apparatus of claim 12, wherein the channel authentication information comprises the channel authentication parameter.

14. The apparatus of claim 7, wherein the program instructions further cause the apparatus to perform the operations: generating the second sent encrypted reference signal using the pilot key and the second reference signal.

15. An apparatus, comprising:

a processor, and a non-transitory memory storing program instructions that, when executed by the processor, cause the apparatus to perform the operations:

receiving, from an access network device, a first received encrypted reference signal corresponding to a first sent encrypted reference signal that is generated by the access network device using a pilot key and a first reference signal and is transmitted through a channel;

performing channel estimation by using the first received encrypted reference signal and the first sent encrypted reference signal, to obtain downlink channel state information; and sending, to the access network device, first information including the downlink channel state information.

16. The apparatus of claim 15, wherein the first sent encrypted reference signal comprises at least two same first encrypted sequences each obtained by encrypting the first reference signal using the pilot key.

17. The apparatus of claim 15, wherein the first sent encrypted reference signal comprises a hash chain having at least two binary sequences, the at least two binary sequences including an encrypted sequence obtained by encrypting the first reference signal using the pilot key.

18. The apparatus of claim 15, wherein the pilot key is obtained by performing a one-way hash operation on a shared key, wherein the shared key is obtained by using a private key of the terminal device and a public key on a network device side, or the shared key is obtained by using a private key on the network device side and a public key of the terminal device.

19. The apparatus of claim 15, wherein the first information further comprises a second sent encrypted reference signal obtained by using the pilot key and a second reference signal.

20. The apparatus of claim 15, wherein the program instructions further cause the apparatus to perform the operations: generating the first sent encrypted reference signal using the pilot key and the first reference signal.

* * * * *